US012012736B2

(12) United States Patent
Ward et al.

(10) Patent No.: US 12,012,736 B2
(45) Date of Patent: Jun. 18, 2024

(54) SYSTEM AND METHOD FOR ENABLING WASTE DISPOSER TO BE COUPLED TO ALTERNATIVE ELECTRIC POWER SOURCES

(71) Applicant: Emerson Electric Co., St. Louis, MO (US)

(72) Inventors: Jeffrey Ward, Kenosha, WI (US); Walter Bennage, Pleasant Prairie, WI (US); Kelly T. Gamble, Waterford, WI (US); Fei Qi, Nanjing (CN); Nicholas J. Hirsch, Wind Lake, WI (US); Grant Waldemer, Milwaukee, WI (US)

(73) Assignee: INSINKERATOR LLC, Benton Harbor, MI (US)

(*) Notice: Subject to any disclaimer, the term of this patent is extended or adjusted under 35 U.S.C. 154(b) by 736 days.

(21) Appl. No.: 17/025,245

(22) Filed: Sep. 18, 2020

(65) Prior Publication Data
US 2021/0087801 A1 Mar. 25, 2021

Related U.S. Application Data

(60) Provisional application No. 62/903,440, filed on Sep. 20, 2019.

(51) Int. Cl.
H01R 13/74 (2006.01)
E03C 1/266 (2006.01)
(Continued)

(52) U.S. Cl.
CPC ........... E03C 1/2665 (2013.01); H01R 13/73 (2013.01); H01R 31/06 (2013.01); H01R 2103/00 (2013.01); H02K 11/33 (2016.01)

(58) Field of Classification Search
CPC ....... E03C 1/2665; E03C 1/266; H01R 13/73; H01R 31/06; H01R 2103/00; H01R 13/5816; H02K 11/33; B02C 18/0092
See application file for complete search history.

(56) References Cited

U.S. PATENT DOCUMENTS 2,244,402 A   6/1941 Powers
2,477,686 A   8/1949 Coss
(Continued)

FOREIGN PATENT DOCUMENTS

CN        2429070        5/2001
CN     101911623 A      12/2010
(Continued)

OTHER PUBLICATIONS

Communication Pursuant to Rules 161(1) and 162 from the European Patent Office for Application No. 20786640.1 dated Apr. 8, 2022 (3 pages).
(Continued)

Primary Examiner — Abdullah A Riyami
Assistant Examiner — Nelson R. Burgos-Guntin
(74) Attorney, Agent, or Firm — Amundsen Davis, LLC

(57) ABSTRACT

Food waste disposer systems and related systems for coupling food waste disposer systems to electrical power sources, and related coupling and configuration methods, are disclosed herein. In at least one example embodiment, a food waste disposer system includes a motor, a switch module, a housing, and an appliance inlet power cord connection structure supported at least indirectly upon the housing, where the connection structure is either connected to or integrally formed with the switch module. Further, the food waste disposer system also includes a power cord including a first end with a first plug and a second end with a second plug, where the first plug is configured to be (Continued)

coupled to the connection structure. Additionally, the food waste disposer includes an adapter or first lead wires that are coupled at least indirectly to the connection structure.

19 Claims, 37 Drawing Sheets

(51) Int. Cl.
*H01R 13/73* (2006.01)
*H01R 31/06* (2006.01)
*H01R 103/00* (2006.01)
*H02K 11/33* (2016.01)

(56) References Cited

U.S. PATENT DOCUMENTS

| | | | |
|---|---|---|---|
| 2,579,400 A | 12/1951 | Schindler | |
| 2,642,232 A | 6/1953 | Drew | |
| 2,657,397 A | 11/1953 | Drew | |
| 2,678,775 A | 5/1954 | Simmons | |
| 2,850,244 A | 9/1958 | James et al. | |
| 2,860,834 A | 11/1958 | Hammes | |
| 2,961,172 A | 11/1960 | Wieczorek | |
| 2,979,274 A | 4/1961 | Tull | |
| 3,090,900 A | 5/1963 | Porter et al. | |
| 3,207,837 A | 9/1965 | Brezosky | |
| 3,423,660 A | 1/1969 | McClure | |
| 3,425,637 A | 2/1969 | Enright et al. | |
| 3,464,638 A | 9/1969 | Enright et al. | |
| 3,504,863 A | 4/1970 | Burkland et al. | |
| 4,473,789 A | 9/1984 | Hildebrandt et al. | |
| 6,071,132 A | 6/2000 | Cook | |
| 6,082,643 A | 7/2000 | Kovacs | |
| 6,200,155 B1 | 3/2001 | Chudkosky et al. | |
| 6,610,942 B1 | 5/2003 | Anderson et al. | |
| 6,719,228 B2 | 4/2004 | Berger et al. | |
| 6,735,791 B1 | 5/2004 | Lordahl et al. | |
| 6,905,360 B2 * | 6/2005 | Berger | H01R 13/741 439/441 |
| 7,021,574 B2 | 4/2006 | Berger et al. | |
| 7,210,949 B2 | 5/2007 | Duncan et al. | |
| 7,264,188 B2 | 9/2007 | Anderson et al. | |
| 7,503,514 B2 | 3/2009 | Berger et al. | |
| 7,744,419 B2 | 6/2010 | Blum et al. | |
| 7,757,981 B2 | 7/2010 | Anderson et al. | |
| 7,936,242 B2 * | 5/2011 | Carpenter | H01H 36/0073 335/207 |
| 8,382,492 B2 | 2/2013 | Hering et al. | |
| 8,794,987 B2 | 8/2014 | Classen et al. | |
| 9,145,666 B2 | 9/2015 | Hammer | |
| 9,642,035 B2 | 5/2017 | Fang et al. | |
| 9,968,940 B2 | 5/2018 | Hartmann et al. | |
| 10,063,411 B2 | 8/2018 | Khotimsky et al. | |
| 10,559,907 B1 | 2/2020 | Baldwin et al. | |
| 10,981,178 B2 | 4/2021 | Britto | |
| 11,441,302 B2 | 9/2022 | Reidel et al. | |
| 11,532,909 B2 | 12/2022 | Weaver et al. | |
| 2004/0053523 A1 * | 3/2004 | Berger | H01R 13/741 439/106 |
| 2004/0077224 A1 | 4/2004 | Marchese | |
| 2004/0178289 A1 | 9/2004 | Jara-Almonte et al. | |
| 2006/0038047 A1 * | 2/2006 | Anderson | E03C 1/262 241/46.013 |
| 2006/0144975 A1 * | 7/2006 | Anderson | E03C 1/2665 241/46.013 |
| 2010/0130042 A1 * | 5/2010 | Gray | H01R 13/5833 439/284 |
| 2014/0070036 A1 * | 3/2014 | Hammer | B02C 25/00 241/32.5 |
| 2015/0115081 A1 | 4/2015 | Gormley et al. | |
| 2015/0380877 A1 | 12/2015 | McRae | |
| 2018/0123895 A1 | 5/2018 | Khasnabish et al. | |
| 2019/0013714 A1 | 1/2019 | DeYoung | |
| 2019/0210036 A1 * | 7/2019 | Chavez | B02C 23/36 |
| 2021/0032853 A1 * | 2/2021 | Reidel | E03C 1/2665 |
| 2021/0087801 A1 * | 3/2021 | Ward | H01R 31/06 |
| 2021/0238834 A1 * | 8/2021 | Ward | H02M 7/217 |
| 2022/0120069 A1 * | 4/2022 | Reidel | B02C 18/0092 |
| 2022/0356687 A1 * | 11/2022 | Lines | E03C 1/2665 |
| 2022/0381016 A1 * | 12/2022 | Dan | E03C 1/057 |

FOREIGN PATENT DOCUMENTS

| | | |
|---|---|---|
| CN | 203206043 | 9/2013 |
| CN | 103503377 | 1/2014 |
| CN | 104728182 A | 6/2015 |
| CN | 204753748 | 11/2015 |
| CN | 205617508 | 10/2016 |
| CN | 205900911 | 1/2017 |
| CN | 106714972 A | 5/2017 |
| CN | 107713770 | 2/2018 |
| CN | 208423310 | 1/2019 |
| CN | 111218964 | 6/2020 |
| CN | 115038847 A | 9/2022 |
| CN | 218894157 | 4/2023 |
| DE | 202016000137 | 3/2016 |
| DE | 102015120283 | 5/2017 |
| DE | 102005040241 | 11/2021 |
| EP | 2701245 | 2/2014 |
| GB | 745978 | 3/1956 |
| GB | 759590 | 10/1956 |
| GB | 1120289 | 7/1968 |
| GB | 2392636 | 3/2004 |
| GB | 2392636 B | 3/2004 |
| JP | 4968711 B2 | 7/2012 |
| KR | 20010069957 | 7/2001 |
| WO | 2007056631 A2 | 5/2007 |
| WO | 2024035836 A1 | 2/2024 |
| WO | 2024035837 A1 | 2/2024 |

OTHER PUBLICATIONS

Response filed on Jul. 28, 2023 to Chinese Office Action dated Mar. 14, 2023 for Chinese Patent Application No. 2020800809950 with English Translation and Claims as amended in Chinese Response (26 pages).

Response filed on Oct. 17, 2022 in the European Patent Office to Communication Pursuant to Rules 161(1) and 162 from the European Patent Office for Application No. 20786640.1 dated Apr. 8, 2022 (16 pages).

Bosch, "New 300/500/800 Bosch Dishwasher Installation—Overview," brochure (Apr. 10, 2013) pp. 1-6, http://askboschbestbuy.com/wp-content/uploads/sites/2/2013/05/Power-Cord-Installation.pdf.

PCT/US2020/051528 International Search Report and Written Opinion of the International Searching Authority dated Dec. 2, 2020 (12 pages).

PCT/US2021/016231 International Search Report and Written Opinion of the International Searching Authority dated Apr. 21, 2021 (14 pages).

Chinese Office Action dated Mar. 15, 2023 for Chinese Patent Application No. 2020800809950 with English Translation.

Second Chinese Office Action dated Aug. 31, 2023 for Chinese Patent Application No. 2020800809950 (23 pages).

Chinese Office Action dated Dec. 7, 2023 for Chinese Patent Application No. 2021800122168 (17 pages with partial translation).

International Search report and Written Opinion for International Application No. PCT/US2023/029927 from WIPO dated Nov. 30, 2023 (15 pages).

International Search report and Written Opinion for International Application No. PCT/US2023/029928 from WIPO dated Nov. 30, 2023 (16 pages).

Mar. 27, 2023 Response to Rule 161 EPC communication dated Sep. 16, 2022 for EU Patent Application No. 21708827.7 (13 pages).

Communication pursuant to Rules 161(1) and 162 EPC for EU Application No. 21708827.7 from the European Patent Office dated Sep. 16, 2022 (3 pages).

(56) References Cited

OTHER PUBLICATIONS

CNIPA Decision of Rejection dated Apr. 17, 2024 for Chinese Patent Application No. 2020800809950 (21 pages).
Apr. 19, 2024 Response to Chinese Office Action (Office Action dated Dec. 7, 2023) for Chinese Patent Application No. 2021800122168 (30 pages).

* cited by examiner

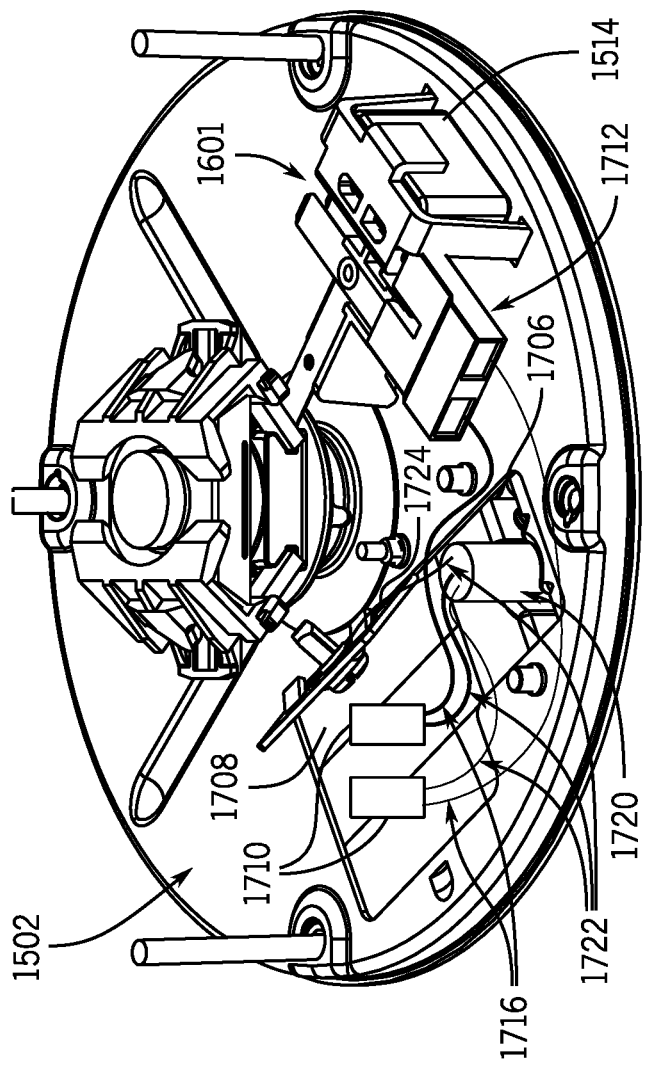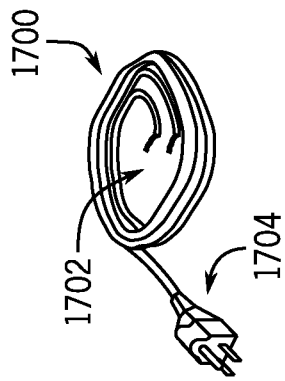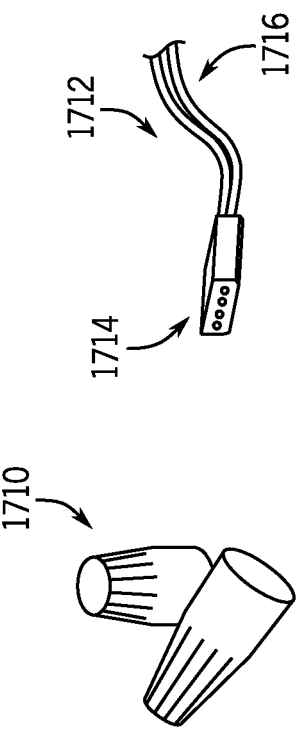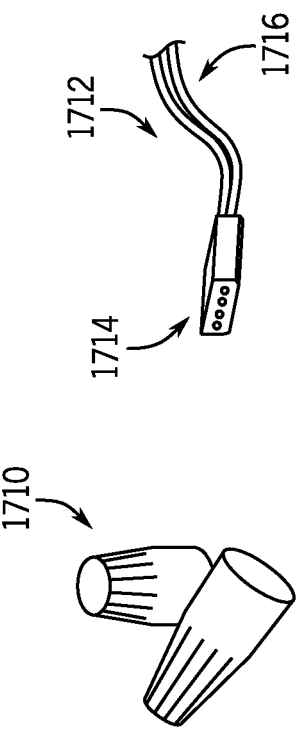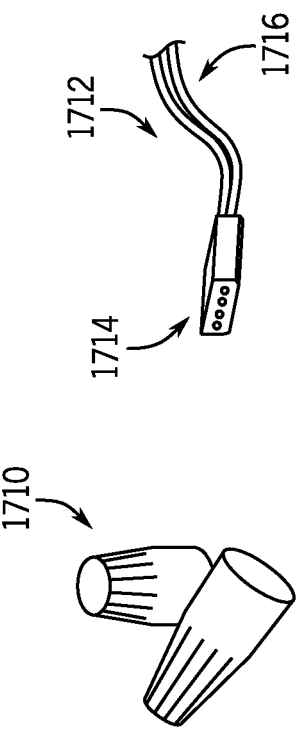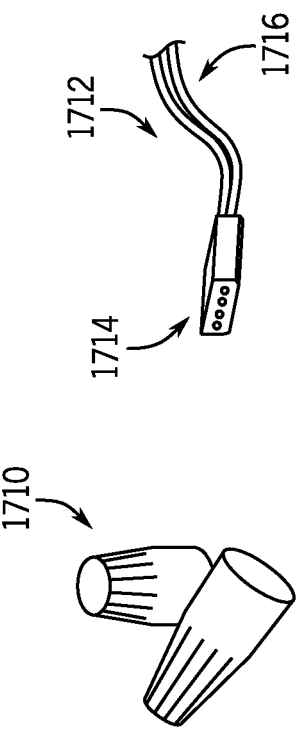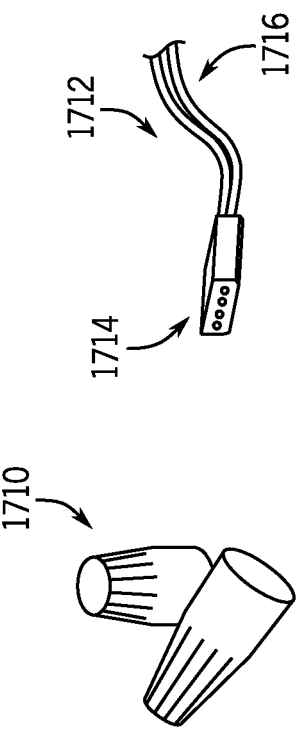

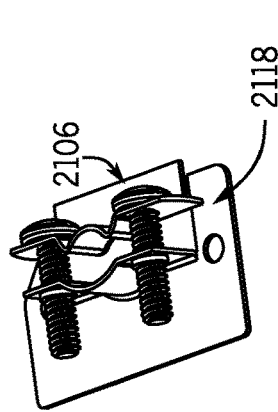
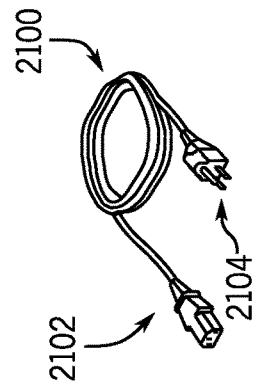
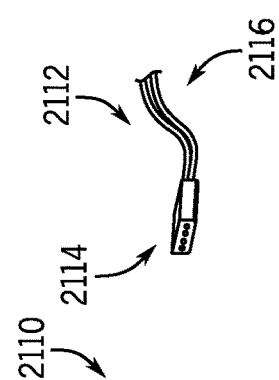
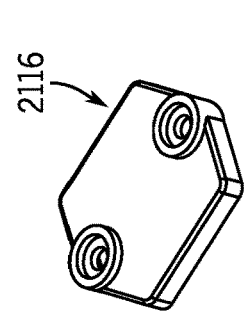
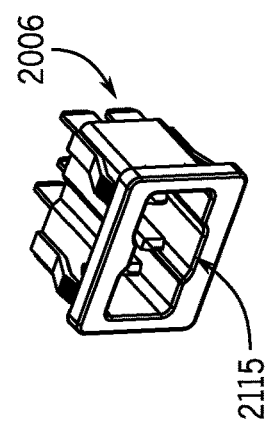
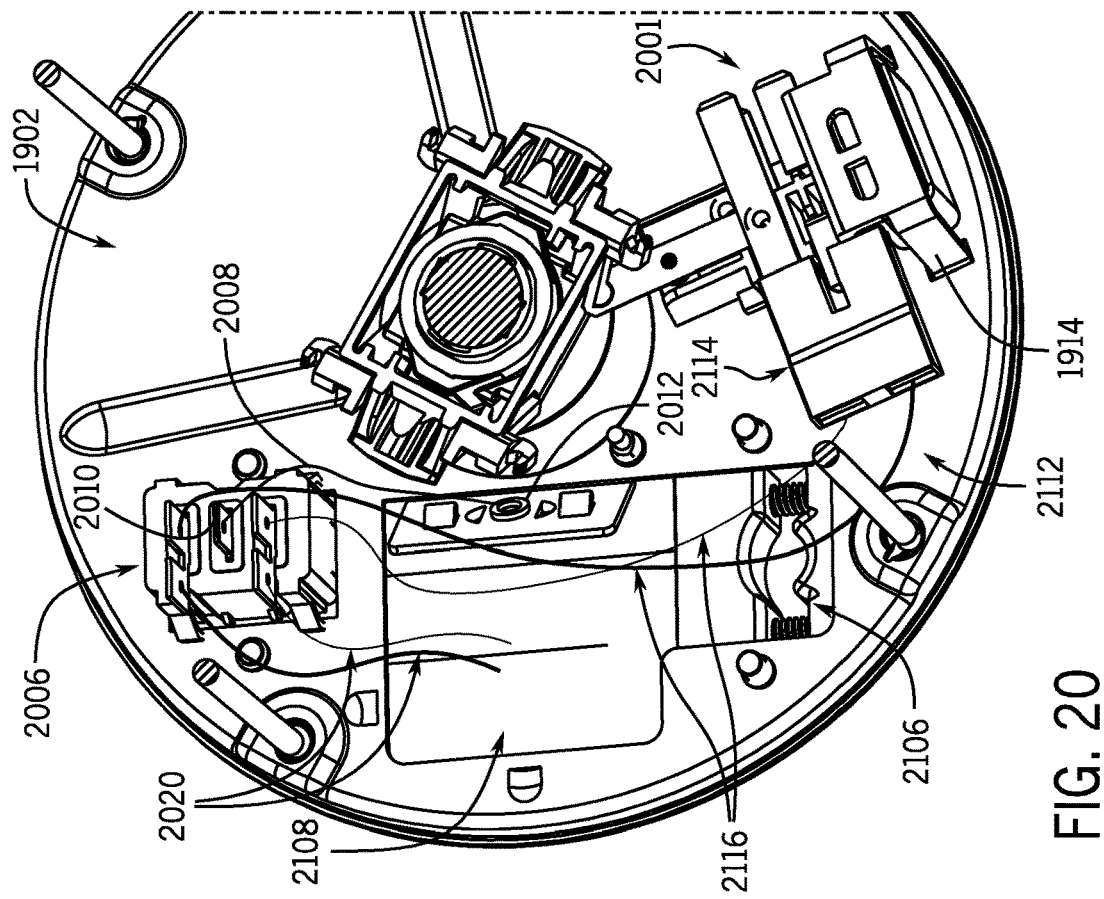

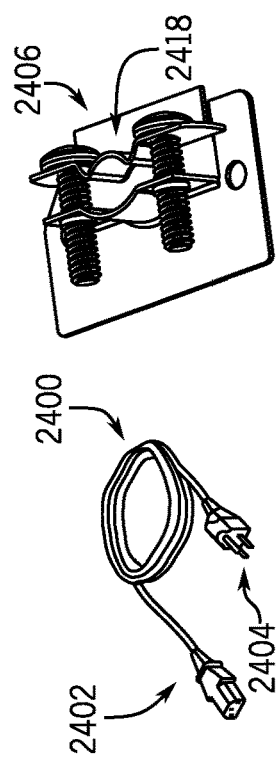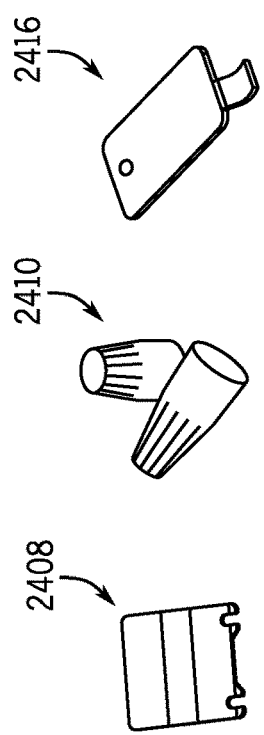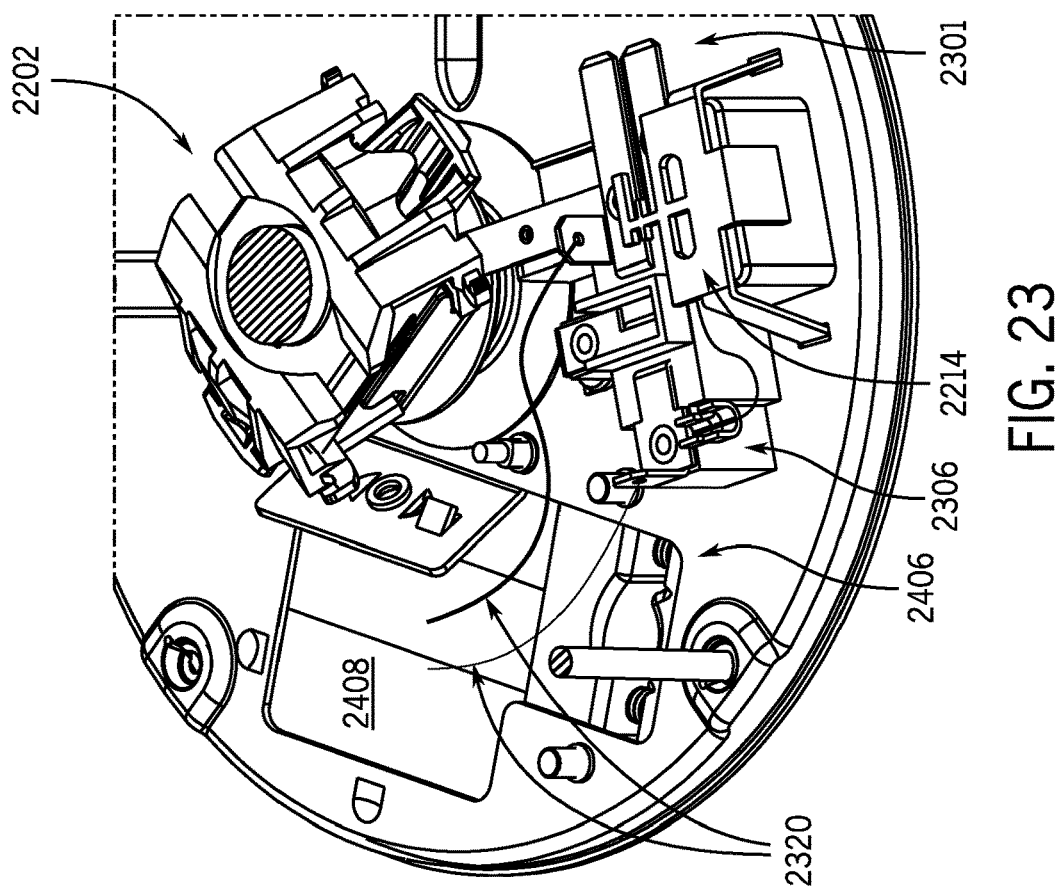

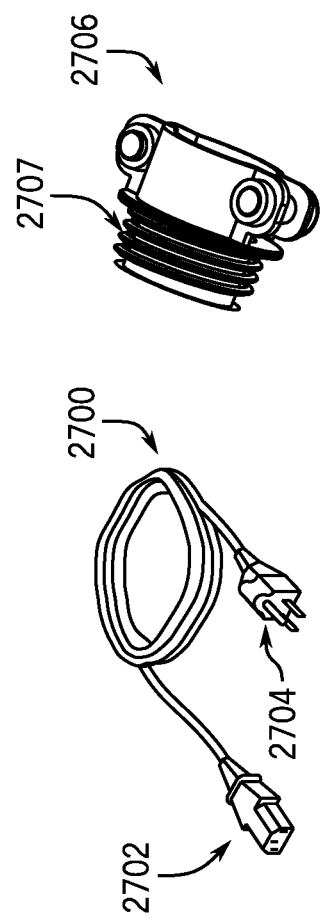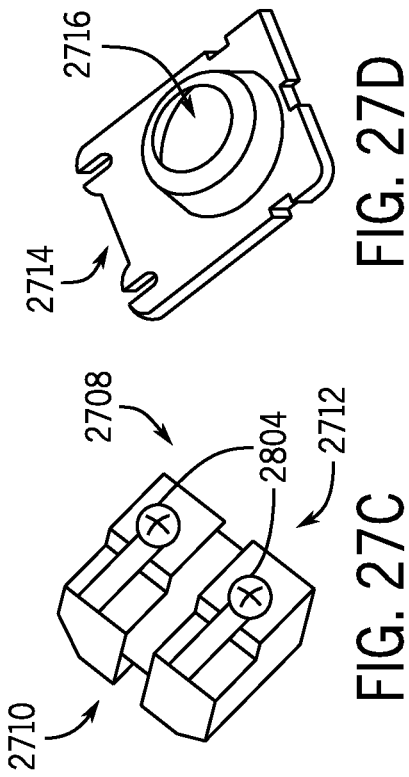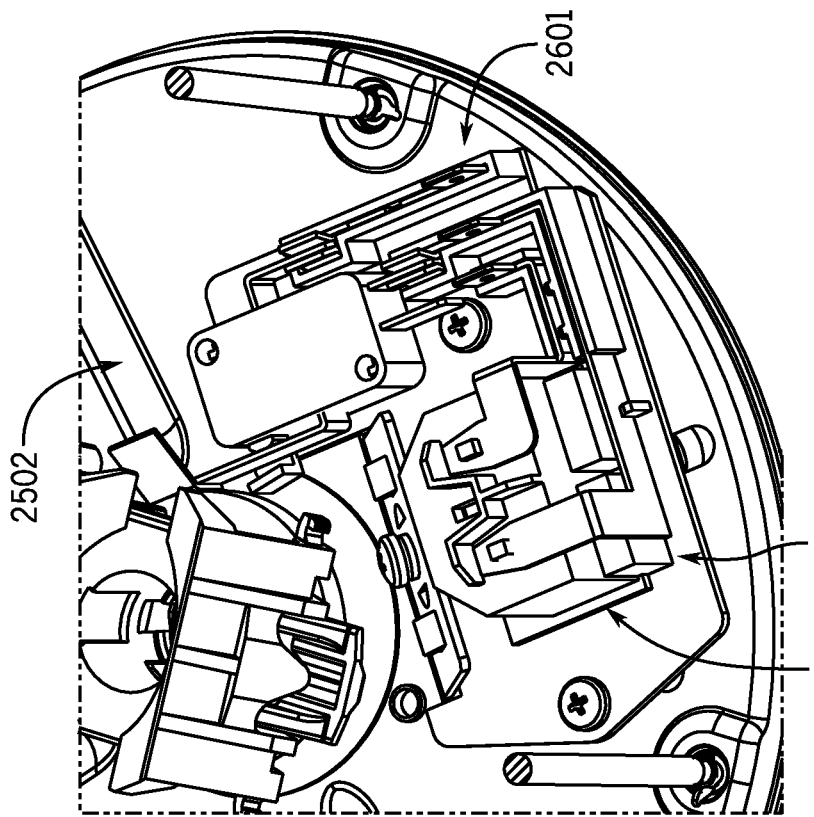

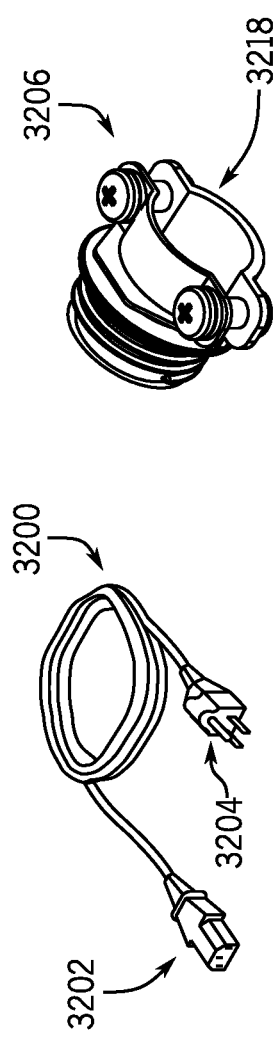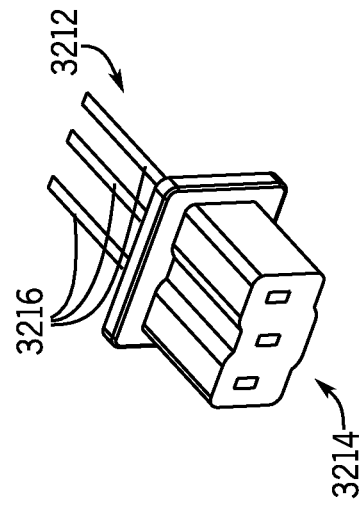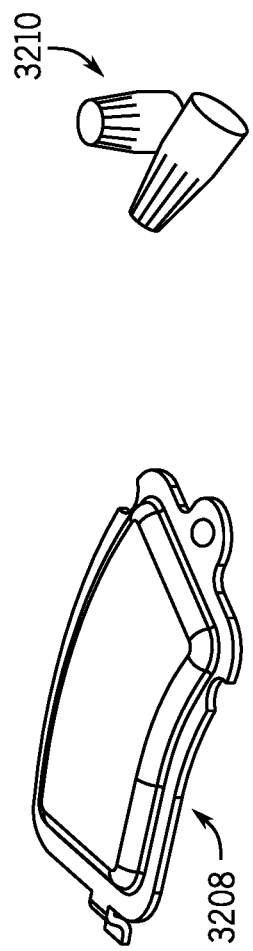

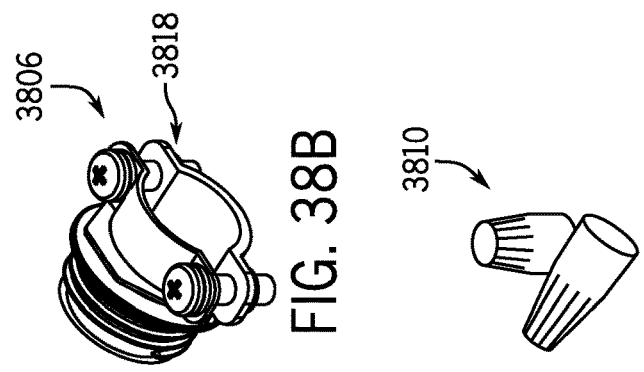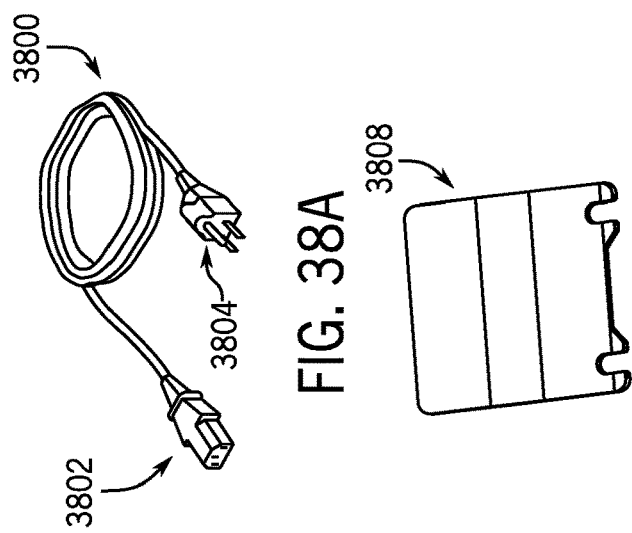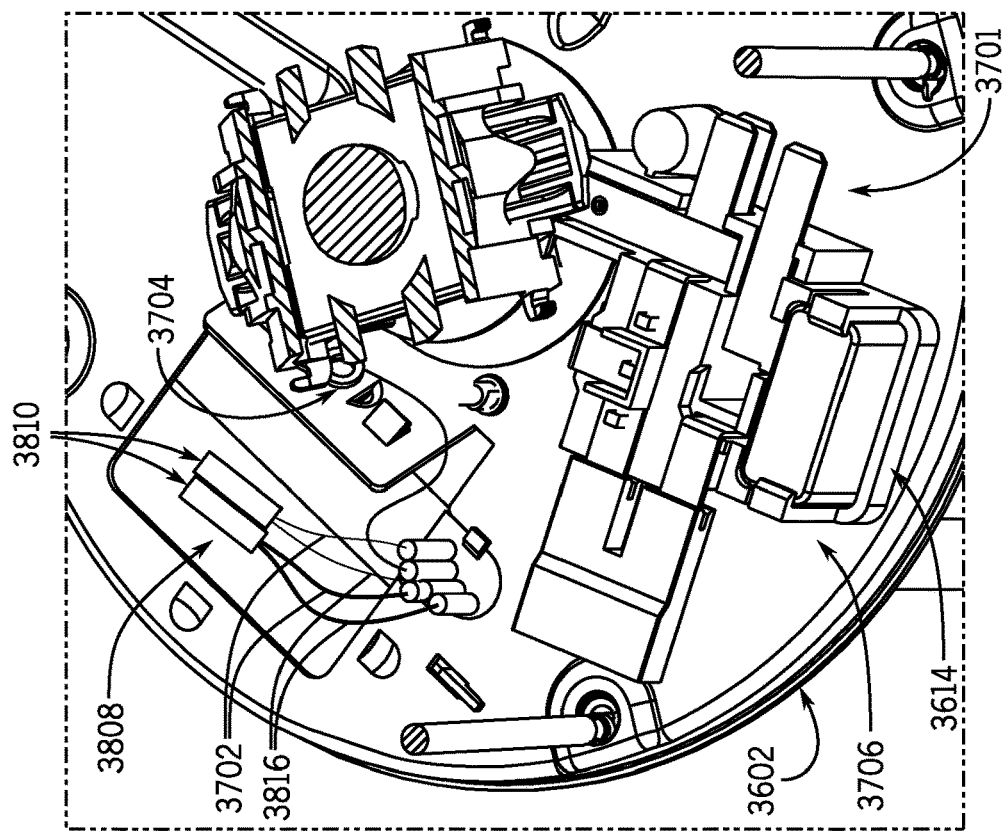

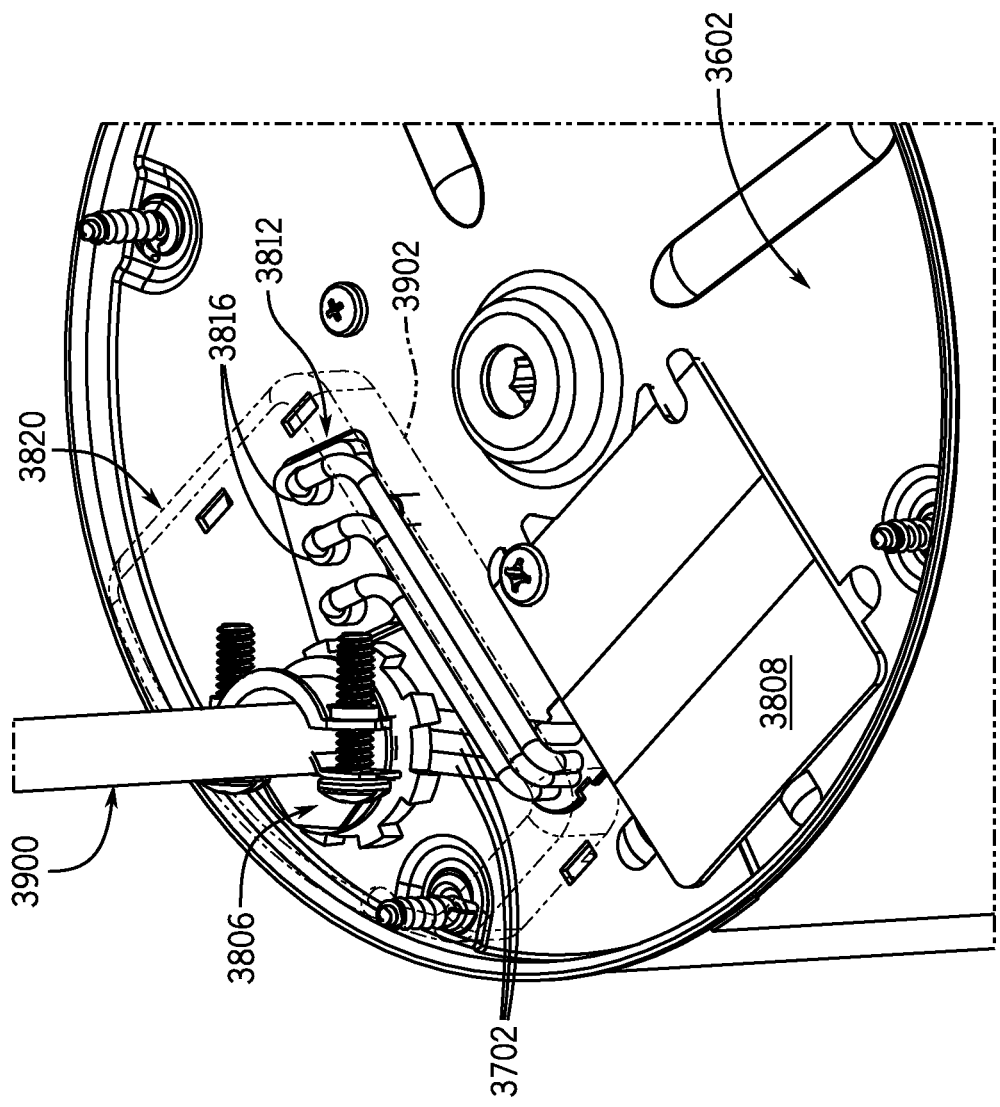
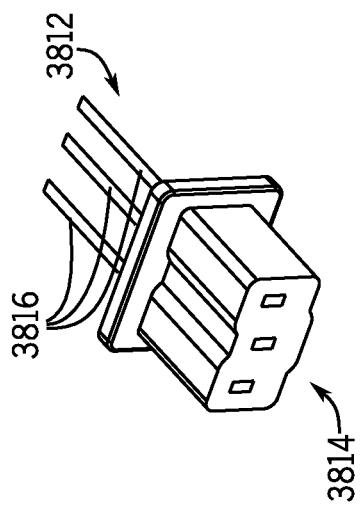
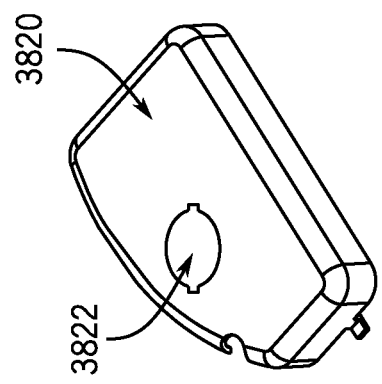
FIG. 39
FIG. 38E
FIG. 38F

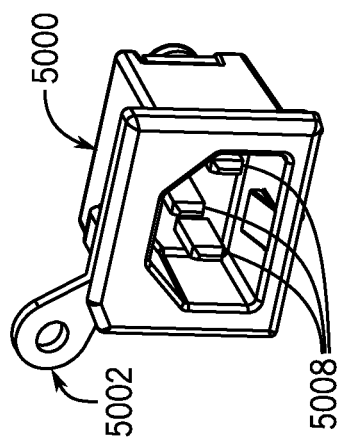
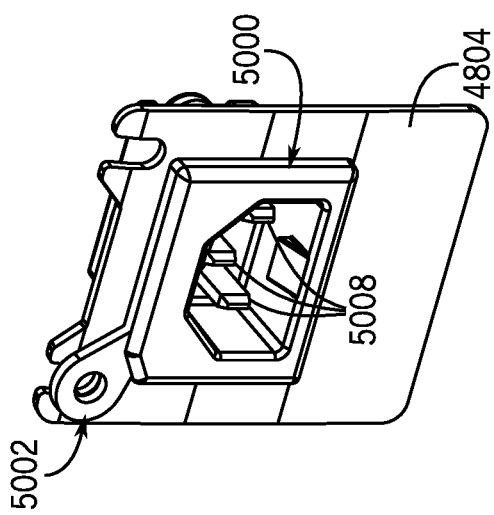
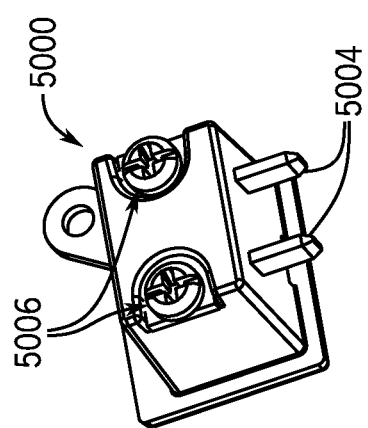
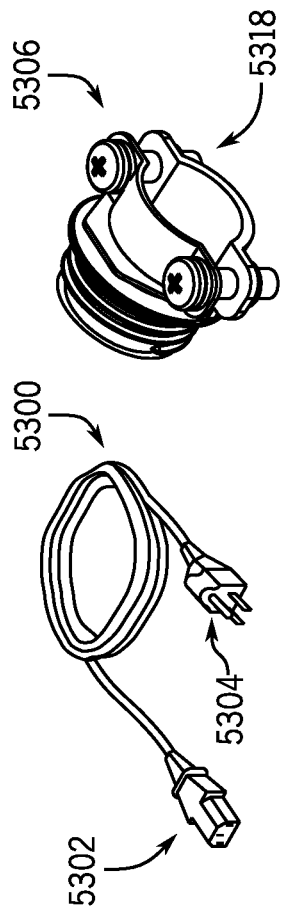
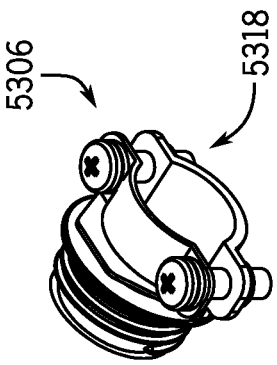

SYSTEM AND METHOD FOR ENABLING WASTE DISPOSER TO BE COUPLED TO ALTERNATIVE ELECTRIC POWER SOURCES

CROSS-REFERENCE TO RELATED APPLICATION

The present application claims the benefit of, and priority to, earlier-filed U.S. provisional patent applcation No. 62/903,440 filed on Sep. 20, 2019 and entitled "SYSTEM AND METHOD FOR ENABLING WASTE DISPOSER TO BE COUPLED TO ALTERNATIVE ELECTRIC POWER SOURCES," and the entire contents of that earlier-filed U.S. provisional patent application are hereby incorporated by reference herein.

FIELD

The present disclosure relates to waste disposers such as food waste disposers and, more particularly, to systems for use in or in conjunction with such waste disposers by which those waste disposers can be coupled to electric power sources, as well as to waste disposers comprising such systems, and to methods of coupling waste disposers to, or configuring waste disposers for coupling to, electrical power sources.

BACKGROUND

Food waste disposers are used to comminute food scraps into particles small enough to pass through household drain plumbing. Referring to FIG. 1 (Prior Art), a perspective bottom view of a conventional food waste disposer 100 is shown. As illustrated, the food waste disposer 100 includes an enclosure 102, a cylindrical stator band 104, and a lower end frame (LEF) 106. It should be appreciated that the food waste disposer 100 can be mounted to and beneath a sink, such as a kitchen sink (not shown). When so mounted, the food waste disposer 100 will typically be in a position that is inverted relative to that shown in FIG. 1, such that the LEF 106 will be at the bottom of the food waste disposer.

In general, the food waste disposer 100 can be understood as including a food conveying section, a motor section, and a grinding section. The food conveying section is generally positioned at a location corresponding to the location of the enclosure 102, at or near the top of the food waste disposer 100. The motor section is generally positioned at a location corresponding to and within the stator band 104, at or near the bottom of the food waste disposer 100. The grinding section is disposed between the food conveying section and the motor section. It should be appreciated that the food conveying section includes an inlet for receiving food waste and fluid (e.g., water), and conveys the food waste to the grinding section. The motor section includes a motor imparting rotational movement to a motor shaft to operate the grinding section.

The type of electrical installation for food waste disposers such as the food waste disposer 100 varies. Most newer homes have a standard electrical power outlet (e.g., a wall outlet) near the disposer, to which the disposer can be coupled so as to receive power. However, most older homes (pre-1970's) have a Romex/BX cable extending from a wall of the home, which can be coupled and terminated directly to the disposer in a hardwired manner. Out of all homes, it is estimated that 60% of homes with a disposer have hardwiring and that the remaining 40% use a power outlet located in the sink cabinet.

Notwithstanding such common implementations of food waste disposers within homes, there are various concerns, problems, or disadvantages associated with each of these implementations. For food waste disposers that are sold with a power cord (e.g., for coupling to a wall outlet), there can arise any of several issues when implementing such disposers. For example, when implementing such a food waste disposer in a home that is equipped with a Romex/BX cable, the installed cord would have to be removed to permit hardwired installation via that cable, or alternatively an electrician or qualified person would have to install an outlet box per electrical code in the sink cabinet. Either of these tasks can be costly and inconvenient. Also, attaching a cord during the disposer assembly process can disrupt manufacturing flow in a factory or make subsequent manufacturing processes more difficult. Because of this, the cording operation is sometimes done as a secondary operation, which is typically less efficient. Further, power cords that are attached to or formed as part of food waste disposers can be damaged during shipping and handling of those disposers.

Additionally, for food waste disposers that are sold without a cord, one or more other issues can arise when implementing such disposers. For example, when implementing such a food waste disposer in a home that has an electrical wall outlet but lacks a Romex/BX cable connection, a power cord would have to be installed with respect to the disposer. This may require the installer to go back to the store given that no cord is provided with the disposer. Additionally, installation errors can lead to warranty issues and undesirable customer experiences. In some cases, installers may mistakenly remove the wire shield, which may allow wires to impinge or come in contact with the rotor and prevent the disposer from working properly. Generally speaking, in contrast to food waste disposers that include power cords (are "pre-corded") and that are implemented in homes with wall outlets, the installation of an uncorded disposer can be difficult for the average homeowner and involve added cost. Also, stores generally do not have enough shelf space to stock the various SKU's of disposers in both uncorded and pre-corded versions.

Additionally, another concern associated with both uncorded and pre-corded food waste disposers relates to the typical under-sink environments within which such disposers are implemented. Often, after a food waste disposer is installed in relation to a sink, there is limited space under the disposer and it can be difficult to access. Therefore, when attaching a power cord or Romex/BX to a food waste disposer such as the food waste disposer 100, this is typically done before the disposer is installed to the sink. Yet this can be especially challenging in homes having Romex/BX cables, since in such an environment there is typically a fixed length of the Romex/BX cable/wire to work with, relative to where the cable enters the sink cabinet, and consequently the disposer must be positioned close enough to make the desired connections.

The difficulties associated with the installation of uncorded food waste disposers in homes having Romex/BX cables can be further exacerbated by the complexity of the processes by which installation is achieved. In this regard, FIG. 2 shows a perspective top view of the LEF 106 of FIG. 1 to illustrate components of the food waste disposer 100 that are particularly involved with or implicated by a conventional installation process of the food waste disposer 100 when installed in relation to a Romex/BX cable. Additionally FIG. 3 shows a flow chart 320 illustrating steps of the conventional installation process, and FIGS. 4A through 4L are further provided that show cutaway bottom perspective views of portions of the LEF 106 at different times during the performing of that conventional installation process that particularly correspond to various ones of the steps of the flow chart 320 of FIG. 4.

More particularly, referring to FIG. 3 and FIG. 4A, it should be recognized that the LEF 106 of the food waste disposer 100 at a start step 300 of the installation process represented by the flow chart 320 includes a terminal cover 400, which is positioned along the underside or bottom surface 418 of the LEF. Upon commencement of the installation process, the first step 301 then is to remove the terminal cover 400, so that a terminal cover opening 402 is formed in the LEF 106 as shown in FIG. 4B. Next, at a step 302 of the flow chart 320, an installer screws a Romex/BX coupler 404 into the LEF 106. The Romex/BX coupler 404 particularly can be inserted into an orifice 406 of the LEF 106 (as visible in FIG. 4B), from the bottom surface 418 of the LEF, so as to be affixed to the LEF 106 as illustrated in FIG. 4C. As illustrated, the Romex/BX coupler 404 includes first and second surface portions 408 and 410, respectively, as well as first and second screws 412 and 414, respectively, where the screws link the two surface portions and can cause those surface portions to become closer to or farther from one another depending upon the positioning of the screws.

Following the step 302, at a step 303 the installer pulls motor wires 416 out through terminal cover opening 402 as illustrated by FIG. 4D. Additionally, at a step 304 as shown in FIG. 4E, the installer feeds the Romex/BX cable 420 (and associated lead wires 422 extending within and from an end of the cable as shown in FIG. 4F) through Romex/BX coupler 404. Further, at a step 305, the installer pulls the lead wires 422 of the Romex/BX cable 420 (particularly ends thereof) out through terminal cover opening 402, as shown in FIG. 4F. Next, at a step 306 illustrated by FIG. 4G, a ground screw 424 of the LEF 106 is loosened (e.g., by turning it counter-clockwise) and, at a step 307 illustrated by FIG. 4H, a ground lead wire 426 of the Romex/BX cable (which can be considered one of the lead wires 422) is connected to the ground screw 424 (this can involve tightening, e.g., clockwise rotation, of the ground screw after the ground wire is positioned under the head of the ground screw).

Additionally, at a step 308 and as illustrated by FIG. 4I, the installer connects a first (in this example, white) lead wire 430 of the lead wires 422 of the Romex/BX cable 420 to a first (in this example, white) motor lead wire 432 of the motor wires 416 by way of a first coupler 434. Also, at a step 309 and as illustrated by FIG. 4J, the installer connects a second (in this example, black) lead wire 436 of the lead wires 422 to a second (in this example, black) motor lead wire 438 of the motor wires 416 by way of a second coupler 440. Then, at a step 310 and as illustrated by FIG. 4K, the installer pushes the wires (e.g., all of the end portions of the lead wires 426, 430, 432, 436, and 438, as well as the first and second couplers 434 and 440) through terminal cover opening 402 into a wiring compartment inside the food waste disposer 100 (e.g., above the bottom surface 418). At this time, the installer then completes the installation process at a step 311, at which the installer secures the Romex/BX coupler 404 to the Romex/BX cable 420 by tightening the screws 412 and 414, and at a step 312, at which the installer re-attaches the terminal cover 400 to the bottom surface 418 of the LEF 106, as illustrated by FIG. 4L.

Accordingly, it would be desirable if an improved system for use in or in conjunction with a food waste disposer or other waste disposer, and/or an improved waste disposer employing such a system, and/or an improved method, could be developed that alleviated or addressed one or more of the above-discussed concerns associated with the installation of conventional waste disposers, and/or alleviated or addressed one or more other concerns or disadvantages, and/or provided one or more advantages by comparison with conventional arrangements.

BRIEF SUMMARY

In at least some example embodiments, the present disclosure relates a food waste disposer system. The food waste disposer system includes a motor and a switch module coupled at least indirectly to the motor and configured to govern a providing of power to the motor. Additionally, the food waste disposer system also includes a housing including a first side housing portion and a bottom housing portion, and an appliance inlet power cord connection structure supported at least indirectly upon the housing, where the appliance inlet power cord connection structure is either connected to or integrally formed with the switch module. Further, the food waste disposer system also includes a power cord including a first end with a first plug and a second end with a second plug, where the first plug is configured to be coupled to the appliance inlet power cord connection structure. Additionally, the food waste disposer includes an adapter or first lead wires that are coupled at least indirectly to the appliance inlet power cord connection structure. In at least some such embodiments, the food waste disposer can be selectively implemented either in a first installation environment including a wall outlet by way of coupling the first plug to the appliance inlet power cord connection structure, or in a second installation environment including a hardwired power cable by coupling additional lead wires of the hardwired power cable either to the first lead wires or by coupling the additional lead wires to the adapter and further coupling the adapter to the appliance inlet power cord connection structure.

Additionally, in at least some further example embodiments, the present disclosure relates to a method of installing a food waste disposer system. The method includes providing the food waste disposer system to an installation environment, where the food waste disposer system includes a housing and a switch module supported at least indirectly upon the housing. The method additionally includes determining whether the installation environment for the food waste disposer includes a wall outlet or a Romex/BX cable. The method also includes coupling, at least indirectly to the switch module, a plurality of first wire leads of either the Romex/BX cable or a power cord suitable for engaging the wall outlet. Further, the food waste disposer system includes one or more system components that, alone or in combination with one or more additional components, enable the food waste disposer system to be installed so as to receive power via the wall outlet when the installation environment is determined to include the wall outlet and, alternatively, via the Romex/BX cable when the installation environment is determined to include the Romex/BX cable.

BRIEF DESCRIPTION OF THE DRAWINGS

Embodiments of food waste disposers (or other waste disposers), and/or systems (or subsystems) employed in or in conjunction with such waste disposers, and/or related methods, are disclosed with reference to the accompanying drawings and are for illustrative purposes only. The waste disposers and related systems and methods encompassed herein are not limited in their applications to the details of construction, arrangements of components, or other aspects or features illustrated in the drawings, but rather such waste disposers and related systems and methods encompassed herein include other embodiments or are capable of being practiced or carried out in other various ways. Like reference numerals are used to indicate like components. In the drawings:

FIG. 16 is a top perspective cutaway view of a portion of a LEF (and associated components) of the food waste disposer of FIG. 15, which also shows system components permitting the disposer to be installed in either of two alternative manners depending upon whether the home includes a Romex/BX cable or a wall outlet;

FIGS. 17A-7E show system components (or accessories) that can be selectively employed in or as part of (or in conjunction with) the food waste disposer of FIGS. 15 and 16 so as to achieve installation of the food waste disposer in either of the two alternative manners depending upon whether the home includes a Romex/BX cable or a wall outlet;

FIG. 20 is a top perspective cutaway view of a portion of a LEF (and associated components) of the food waste disposer of FIG. 19, which also shows system components permitting the disposer to be installed in either of two alternative manners depending upon whether the home includes a Romex/BX cable or a wall outlet;

FIGS. 21A-21G show system components that can be selectively employed in or as part of (or in conjunction with) the food waste disposer of FIGS. 19 and 20 so as to achieve installation of the food waste disposer in either of the two alternative manners depending upon whether the home includes a Romex/BX cable or a wall outlet;

FIG. 23 is a top perspective cutaway view of a portion of a LEF (and associated components) of the food waste disposer of FIG. 22, which also shows system components permitting the disposer to be installed in either of two alternative manners depending upon whether the home includes a Romex/BX cable or a wall outlet;

FIGS. 24A-24E show system components that can be selectively employed in or as part of (or in conjunction with) the food waste disposer of FIGS. 22 and 23 so as to achieve installation of the food waste disposer in either of the two alternative manners depending upon whether the home includes a Romex/BX cable or a wall outlet;

FIG. 26 is a top perspective cutaway view of a portion of a LEF (and associated components) of the food waste disposer of FIG. 25, which also shows system components permitting the disposer to be installed in either of two alternative manners depending upon whether the home includes a Romex/BX cable or a wall outlet;

FIGS. 27A-27D show system components that can be selectively employed in or as part of (or in conjunction with) the food waste disposer of FIGS. 25 and 26 so as to achieve installation of the food waste disposer in either of the two alternative manners depending upon whether the home includes a Romex/BX cable or a wall outlet;

FIGS. 32A-32E show system components that can be selectively employed in or as part of (or in conjunction with) the food waste disposer of FIGS. 30 and 31, so as to achieve installation of the food waste disposer in either of the two alternative manners depending upon whether the home includes a Romex/BX cable or a wall outlet;

FIG. 37 is a top perspective cutaway view of a portion of a LEF (and associated components) of the food waste disposer of FIG. 36, which also shows system components permitting the disposer to be installed in either of two alternative manners depending upon whether the home includes a Romex/BX cable or a wall outlet;

FIGS. 38A-38F show system components that can be selectively employed in or as part of (or in conjunction with) the food waste disposer of FIGS. 36 and 37, so as to achieve installation of the food waste disposer in either of the two alternative manners depending upon whether the home includes a Romex/BX cable or a wall outlet;

FIG. 39 is a bottom perspective cutaway view of portions of a LEF (and associated components) of the food waste disposer of FIGS. 36, 37, and 38A-38F, which also shows system components permitting the disposer to be installed in a home having a Romex/BX cable;

FIG. 50 is a bottom perspective view of portions of the LEF (and associated components) of the food waste disposer of FIGS. 48 and 49, including a terminal cover and appliance inlet module, shown to be separated from the remainder of the LEF;

FIGS. 51 and 52 respectively are bottom and top perspective view of the appliance inlet module of the food waste disposer of FIGS. 48, 49, and 50, shown to be separated from the remainder of the LEF (including the terminal cover thereof);

FIGS. 53A-53B show system components that can be selectively employed in or as part of (or in conjunction with) the food waste disposer of FIGS. 48-52 so as to achieve installation of the food waste disposer in either of the two alternative manners depending upon whether the home includes a Romex/BX cable or a wall outlet.

DETAILED DESCRIPTION

Figure 1:
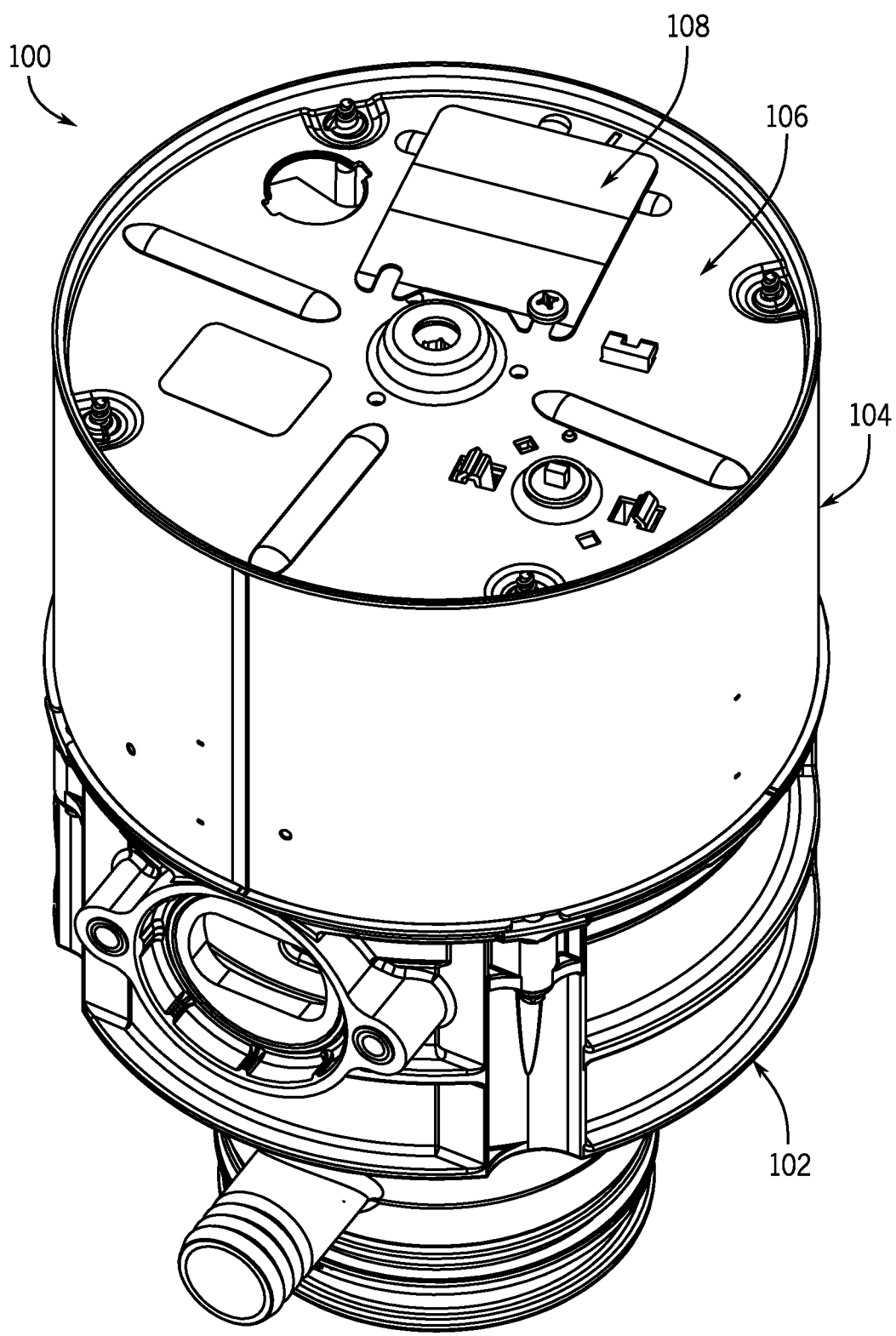
FIG. 1 is a bottom perspective view of a Prior Art food waste disposer, as can be installed in relation to another structure such as a sink.
Figure 2:
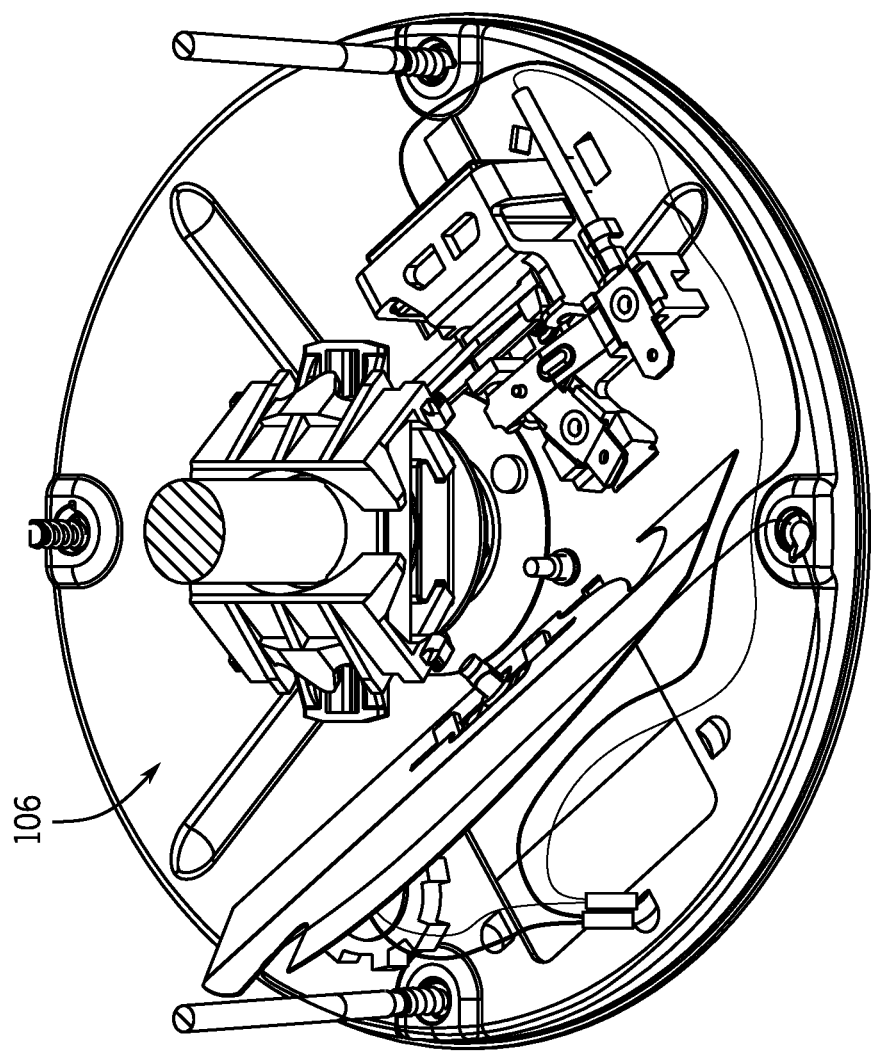
FIG. 2 is a top perspective view of a LEF that is part of the food waste disposer of FIG. 1.

The present disclosure envisions waste disposers such as food waste disposers that are configured so as to be capable of either corded installation, in which a cord associated with the waste disposer can be plugged into an electric power (e.g., wall) outlet at the installation site, or hardwired installation, such that electric power can be delivered to the waste disposer via a Romex/BX cable that is present at the installation site. That is, the present disclosure envisions that a given waste disposer can include, or be implemented in conjunction with, a system (or system components) that enables the waste disposer to be installed in either (or both) of two different manners relative to a surrounding environment such as a home installation site so that the given waste disposer can be provided with electric power either by way of an electric power outlet or by way of a Romex/BX cable. Relatedly, the present disclosure envisions methods of installation of waste disposers according to which a waste disposer can be installed in relation to a surrounding environment in either of two manners depending upon whether the waste disposer is to receive electric power from an electric power outlet or via a Romex/BX cable.

The present disclosure is intended to encompass numerous different embodiments and versions of waste disposers that are capable of each of corded installation and hardwired installation. FIGS. 5 through 54, which are discussed in detail below, illustrate ten different example embodiments of food waste disposers and associated system components and features, which are configured so as to allow each of the respective food waste disposers to be implemented via corded installation or hardwired installation in accordance with installation methods as also described below. Notwithstanding the particular embodiments shown in FIGS. 5-54, however, the present disclosure is also intended to encompass other embodiments or versions of waste disposers (including food waste disposers and other types of waste disposers) that are capable of being implemented in multiple different manners so as to receive power from one or more power sources.

In at least some of the embodiments encompassed herein, the food waste disposers and/or the associated system components and features are particularly configured to facilitate each of corded installation and hardwired installation—that is, configured to make both corded installation and hardwired installation of the same waste disposer easy for an installer. This is in contrast to many conventional waste disposers, for which perhaps one of either corded installation or hardwired installation may be relatively straightforward but the other of those manners of installation may prove to be difficult, unwieldy, or impractical (or impossible). Nevertheless, even though facilitating easy (or relatively easy) installation is one example advantage associated with one or more of the embodiments encompassed herein, the present disclosure is intended to also encompass embodiments that have one or more other advantages in addition to (or instead of) facilitating easy installation.

Figure 5:
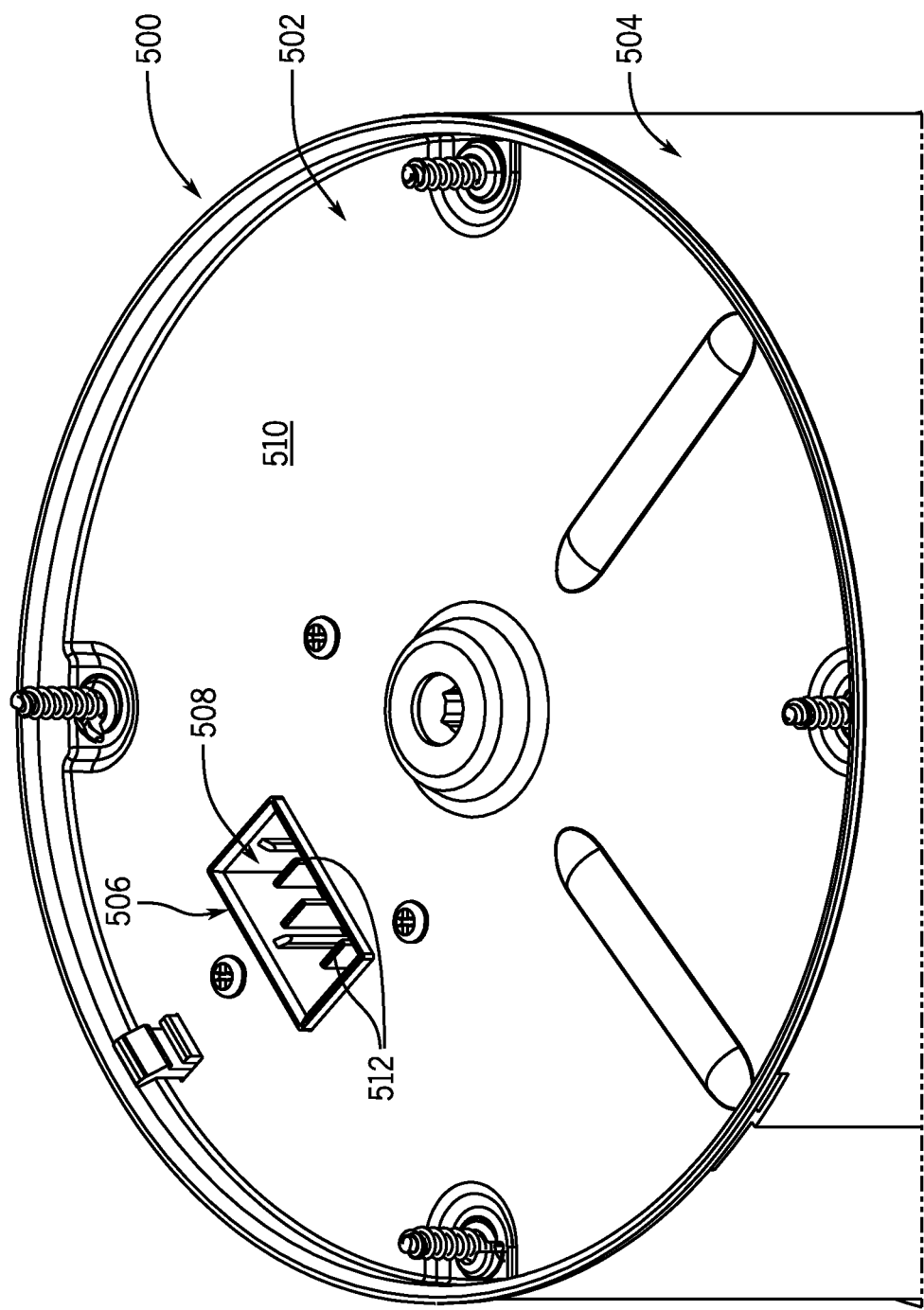
FIG. 5 is a bottom perspective cutaway view of portions of a first example food waste disposer that, in accordance with a first example embodiment encompassed herein, can be installed in a home so as to receive electric power, in either of two alternative manners depending upon whether the home includes a Romex/BX cable or a wall outlet.

Referring particularly to FIG. 5, a bottom perspective cutaway view is provided of portions of a first example food waste disposer 500 that, in accordance with a first example embodiment encompassed herein, can be installed in a home so as to receive electric power, in either of two alternative manners depending upon whether the home includes a Romex/BX cable or a wall outlet. FIG. 5 shows the bottom of the food waste disposer 500 in a manner illustrative of how it would be received by the customer, and particularly shows a bottom perspective view of a LEF 502 of the food waste disposer 500 as well as portions of a stator band 504 that circumferentially surrounds the LEF. It should be understood that, although not shown in FIG. 5, the food waste disposer 500 additionally includes an enclosure that is located above the stator band (below the stator band in the orientation shown in FIG. 5), as well as each of a food conveying section, a motor section, and a grinding section as described above with reference to the food waste disposer 100 of FIG. 1.

Figure 6:
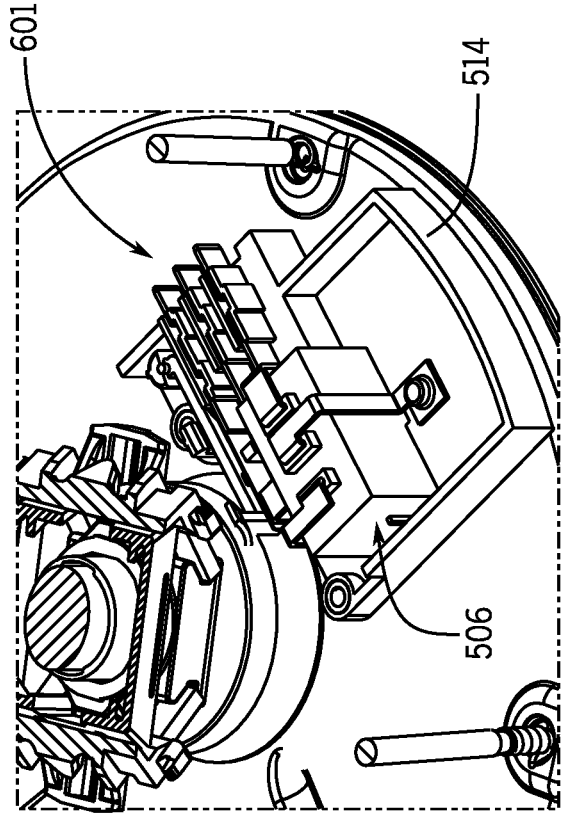
FIG. 6 is a top perspective cutaway view of a portion of a LEF (and associated components) of the food waste disposer of FIG. 5.

Referring still to FIG. 5, and additionally to FIG. 6, which shows a top perspective view of a portion of the LEF 502 (and associated components), the LEF 502 includes an appliance inlet power cord connection structure 506, which can be or include a modified C14 type appliance inlet. In the present embodiment, the appliance inlet power cord connection structure 506 can take the form of a receptacle having an opening 508 along a bottom surface 510 of the LEF 502 that is configured to receive a modified C13 type plug, and that is configured to allow for electrical power to be communicated from that plug to electrical coupling prongs 512 extending within the receptacle. It should be appreciated from FIGS. 5 and 6 that, in contrast to the conventional food waste disposer 100 of FIG. 1 that has the terminal cover 108 by which an interior space within that waste disposer can be accessed, the food waste disposer 500 with the modified C14 type appliance inlet has no removable terminal cover by which an installer can gain access to the interior of the food waste disposer 500 (or to its internal motor compartment) to achieve coupling of the food waste disposer to an electrical power source. Further with respect to FIG. 6, it should also be appreciated that the appliance inlet power cord connection structure 506 is part of a larger structure that is an induction motor start switch module 514. The induction motor start switch module 514 is accessible through an opening in the LEF 502, and has a set of terminals to allow for easy electrical connection to the stator during the manufacture and assembly of the disposer (FIG. 6 shows terminals 601 that are for a cluster block connector from a motor).

Figure 7C:
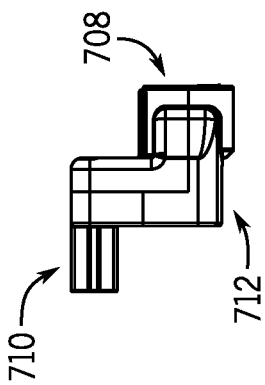
FIGS. 7A-7C show system components that can be selectively employed in or as part of (or in conjunction with) the food waste disposer of FIGS. 5 and 6 so as to achieve installation of the food waste disposer in either of the two alternative manners depending upon whether the home includes a Romex/BX cable or a wall outlet.
Figure 7B:
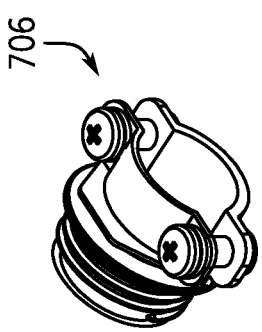
Figure 7A:
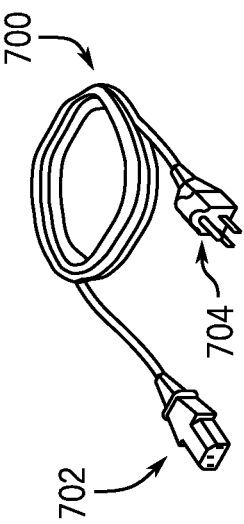

Turning to FIGS. 7A, 7B, and 7C, the food waste disposer 500 includes, or can be installed in conjunction with, system components that permit the food waste disposer to achieve either corded installation or hardwired installation depending upon whether the environment (e.g., home kitchen) within which the food wasted disposer is being installed includes an electrical wall outlet or a Romex/BX cable. As will be described in further detail below, these system components can be considered to be alternative system components, in that one or more of the system component(s) can be implemented to achieve corded installation and one or more other(s) of the system component(s) can be implemented to achieve hardwired installation.

More particularly, FIG. 7A shows a power cord 700 that particularly allows for corded installation in an environment in which there is an electrical wall outlet. As shown, the power cord 700 includes a modified C13 type plug 702 at a first end of the cord and a NEMA 5-15 plug 704 at a second (e.g., opposite) end of the cord. Corded installation of the food waste disposer 500 can be achieved using the power cord 700 simply by plugging the modified C13 type plug 702 into the appliance inlet power cord connection structure 506, and by plugging the NEMA 5-15 plug 704 into the electrical wall outlet (not shown).

By comparison, FIG. 7B and FIG. 7C respective show a Romex/BX (or simply Romex) coupler 706 and a Romex/BX adapter with custom plug (or simply Romex adapter) 708, which includes both a modified C13 type plug 710 on a first side (or end) of the adapter and a Romex/BX coupling assembly 712 on a second side (or end) of the adapter. The Romex coupler 706 in the present embodiment can take the form of a commonly available electrical component typically used to ground metallic sheathed cable (BX) and/or secure the Romex/BX cable to another component (e.g., to an electrical outlet box or an adapter). As further illustrated by FIG. 8, in an installation environment in which a Romex/BX cable 800 is present, an installer can pass an end of the Romex/BX cable through the Romex coupler 706 and attach lead wires 802 extending from an end if that Romex/BX cable to screws 804 of the Romex/BX coupling assembly 712. Additionally, as should be evident from FIG. 8, which provides a partly-exploded view of the Romex/BX coupling assembly 712 in which a cover portion 806 is exploded from a remainder portion 808 of that coupling assembly, the Romex coupler 706 can be attached to/retained in relation to the Romex/BX coupling assembly 712 when the cover portion 806 is assembled to the remainder portion 808 (e.g., by way of screws 810). When the Romex/BX cable 800 is fully assembled to the Romex adapter 708, electrical installation of the food waste disposer 500 can be achieved simply by plugging the modified C13 type plug 710 of the Romex adapter 708 into the appliance inlet power cord connection structure 506.

Figure 8:
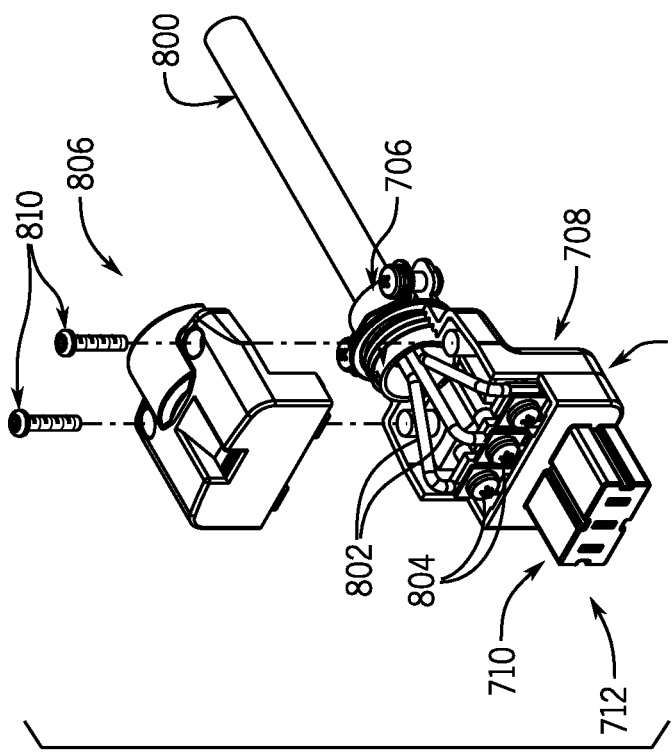
FIG. 8 is a partly-exploded view of an assembly of a Romex/BX cable in relation to an adapter with custom plug shown in FIG. 7C, which can be employed so as to achieve installation of the food waste disposer of FIGS. 5 and 6 in a home having/providing the Romex/BX cable.
Figure 9:
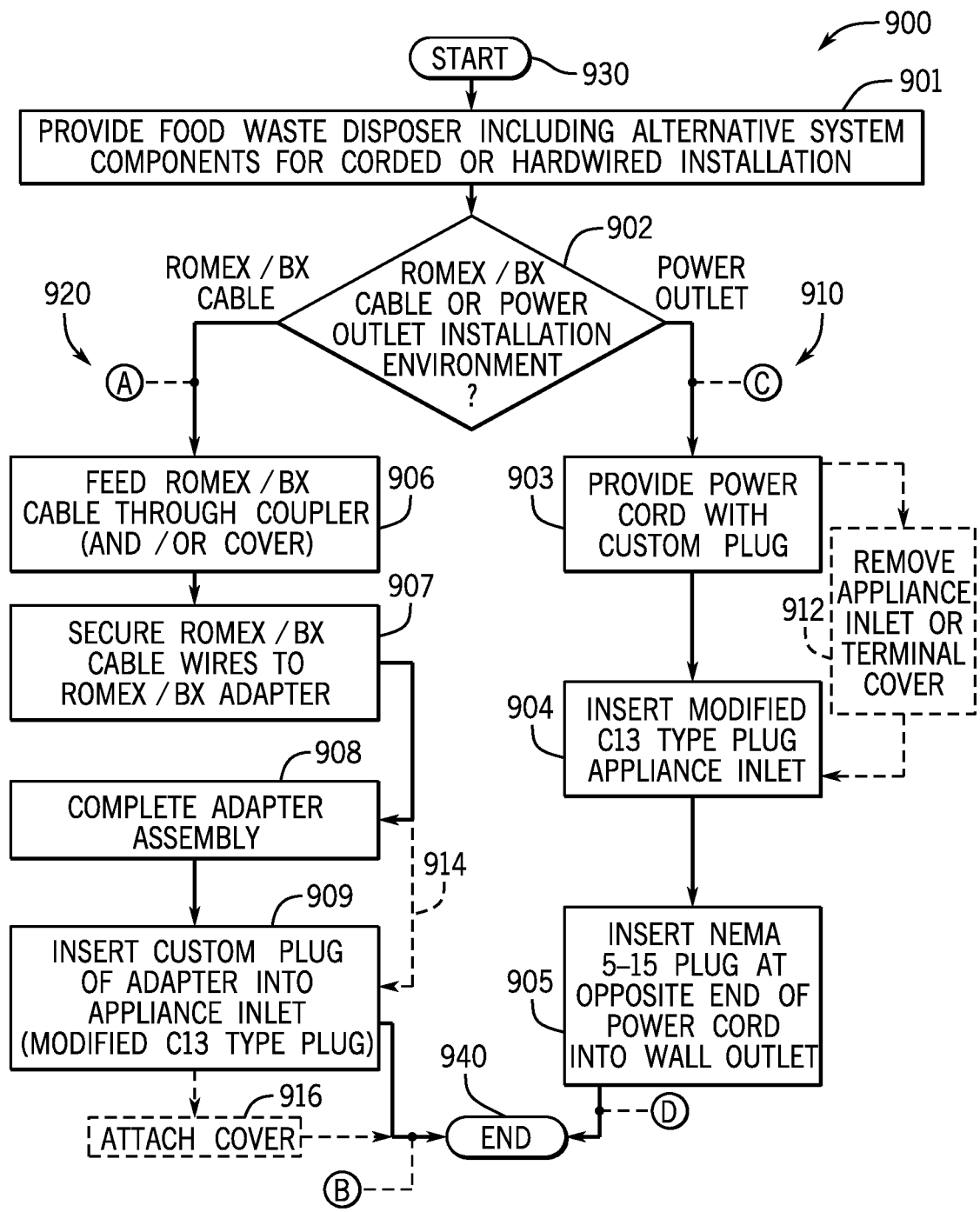
FIG. 9 is a flow chart showing example steps of an installation process by which the food waste disposer and associated system components described in relation to FIGS. 5, 6, 7A-7C, and 8 can be installed in either of the two alternative manners depending upon whether the home includes the Romex/BX cable of FIG. 8 or a wall outlet.

Turning to FIG. 9, a flow chart 900 illustrates in additional detail a method of installing the food waste disposer 500 in an environment such as for example in a kitchen in a home (e.g., beneath a kitchen sink), where the performing of the method takes into account, and varies depending upon, whether the environment includes a Romex/BX cable such as the Romex/BX cable 800 of FIG. 8 or includes an electric wall outlet. That is, the method represented by the flow chart 900 is one in which the steps of the method that are performed vary depending upon the installation environment is suited for corded installation or hardwired installation. It should be appreciated the method of FIG. 9 particularly relates to the installation of the food waste disposer 500 in terms of its being coupled to receive electric power, and not to other aspects of installation such as how the food waste disposer is physically mounted or supported in relation to a structure such as a sink, although it will be appreciated that installation of a food waste disposer will also typically include such as other aspects. Further, it will be appreciated that, in many installation circumstances, it will be appropriate or advantageous to perform the electrical installation of the food waste disposer after the physical/mechanical installation of the food waste disposer has already been achieved, such that the food waste disposer is physically fixed in place relative to the surrounding environment.

More particularly as shown in FIG. 9, upon the method of installation commencing at a start step 930, the food waste disposer 500 is provided to the installation environment including alternative system components that can be utilized to achieve corded or hardwired installation of the disposer, at a step 901. It is then determined, at a step 902, whether the installation environment is one that includes an electric wall power outlet, such that corded installation is appropriate, or includes a Romex/BX cable such as the Romex/BX cable 800, such that hardwired installation is appropriate. If it is determined that an electrical wall power outlet is present, then (after the food waste disposer 500 is installed to a sink) the food waste disposer 500 is connected to a power source using the provided power cord 700, by proceeding along a first branch of steps 910 subsequent to the step 902. More particularly, this entails performing of a step 903, at which the power cord 700 with the custom (e.g., modified C13 type) plug is provided, a step 904 at which the modified C13 type plug is connected to the appliance inlet power cord connection structure 506 of the food waste disposer, and a step 905 at which the NEMA 5-15 plug 704 is connected to the wall outlet. The method then ends, as represented by an end step 940.

Alternatively, if it is determined that a Romex/BX cable such as the Romex/BX cable 800 is present and thus that hardwired installation is appropriate, then (after the food waste disposer 500 is installed to a sink) the installer will attach the food waste disposer to that cable by proceeding along a second branch of steps 920 subsequent to the step 902. More particularly as shown, to achieve coupling of the food waste disposer 500 to the Romex/BX cable 800, the installer at a step 906 feeds the Romex/BX cable 800 through the Romex coupler 706. Additionally, the installer at a step 907 then attaches the Romex/BX cable 800 to the Romex adapter 708, particularly by connecting the individual lead wires 802 to the screws (or other terminals) 804 on the Romex adapter. Further, at a step 908, the installer completes the adapter assembly by positioning the Romex coupler 706 onto the remainder portion (or base) 808 of the Romex adapter 708 and attaching the cover portion 806 to the remainder portion 808 (again, in this example embodiment, by way of the screws 810). Finally, upon completion of the steps 906, 907, and 908, the hardwired installation process is completed at a step 909 when the installer inserts the custom plug 710 of the Romex adapter 712 into the appliance inlet power cord connection structure 506. The method then ends, again as represented by the end step 940.

It should be appreciated that, in general, overall attachment of the Romex adapter 708, Romex coupler 706, and Romex/BX cable 800 with one another in the present embodiment is achieved as a result of the performing of the steps 906, 907, and 908. Nevertheless, notwithstanding the present description, it should be appreciated that in alternate embodiments the aforementioned steps, or portions of these steps, can be performed in different orders, and/or one or more alternate steps (or substeps) can be performed in addition to, or instead of, the aforementioned steps or portions of the aforementioned steps. For example, in one example of an alternate embodiment, the Romex coupler 706 can be positioned onto the remainder portion 808 of the Romex adapter 708 prior to the connecting of the lead wires 802 to the screws 810.

Additionally, although in the flow chart 900 the step 902 at which the installation environment is determined occurs subsequent to the step 901 at which the food waste disposer including alternative system components is provided, an installer need not make a determination of the type of installation environment at a time when the installer is physically present at the installation environment, or at a time after which the installer has already brought the food waste disposer 500 and all of the alternative system components suited for corded and hardwired installation to installation site. It is also possible that, in some cases, an installer will be apprised of whether an installation environment will be suited for corded or hardwired installation prior to the installer being physically at that site and, in some such cases, it may be possible that the installer will only bring to the installation site certain one(s) of the alternative system components that are suited for that environment. For example, if an installer knows that a particular home has a wall outlet beneath the sink, the installer may bring the power cord 700 to that home but not any of the Romex coupler 706 or Romex adapter 708. Alternatively for example, if an installer knows that a particular home has a Romex/BX cable, the installer may bring the Romex coupler 706 and Romex adapter 708 but not the power cord 700.

Depending upon the circumstance or embodiment, the food waste disposer 500 can be understood as including all of the alternative system components suited for each of corded and hardwired installation, such as (in the present example embodiment) all of the power cord 700, the Romex coupler 706, and Romex adapter 708. Alternatively, however, the food waste disposer 500 also can be understood as including a subset of those alternative system components (e.g., only the Romex coupler 706 and Romex adapter 708, or only the power cord 700). For example, the food waste disposer 500 can be understood as including only those of the alternative system components that are actually implemented at the installation site. Further alternatively, the food waste disposer 500 can be understood as not including any of those alternative system components that may or may not be implemented depending upon whether the installation site is suitable for corded installation or hardwired installation. For example, the food waste disposer 500 can be understood as including the structures shown in FIG. 5 and FIG. 6 but not any of the structures shown in FIG. 7 and FIG. 8, and the structures shown in FIG. 7 and FIG. 8 can be considered distinct and separate from the food waste disposer itself.

It should be recognized that the food waste disposer and associated alternative system components described above in relation to FIGS. 5, 6, 7, and 8, and the method of installing same shown by the flow chart 900 of FIG. 9, can provide one or more advantages relative to conventional food waste disposer arrangements. For example, because this food waste disposer arrangement is equally suitable for corded and hardwired installation, there is no need to manufacture two distinct food waste disposer products that are respectively suited for corded installation or hardwired installation. That is, there is no difference between uncorded or pre-corded disposers during manufacture, and the installer can use the provided power cord 700 or the Romex adapter 708 and Romex coupler 706 for any particular installation site. Also, in the present embodiment, all wiring related to connecting the food waste disposer 500 to a power source is positioned externally of the main body of the food waste disposer (e.g., external to the LEF 502 and stator band 504, or external to the entire food waste disposer 500 if the food waste disposer is understood as not including any of the alternative system components), and this can reduce the likelihood of installation errors. Further, the detachable power cord 700 does not need to be assembled to (or as part of) the food waste disposer prior to packaging and can be better positioned in the carton to prevent damage during shipping.

Figure 11:
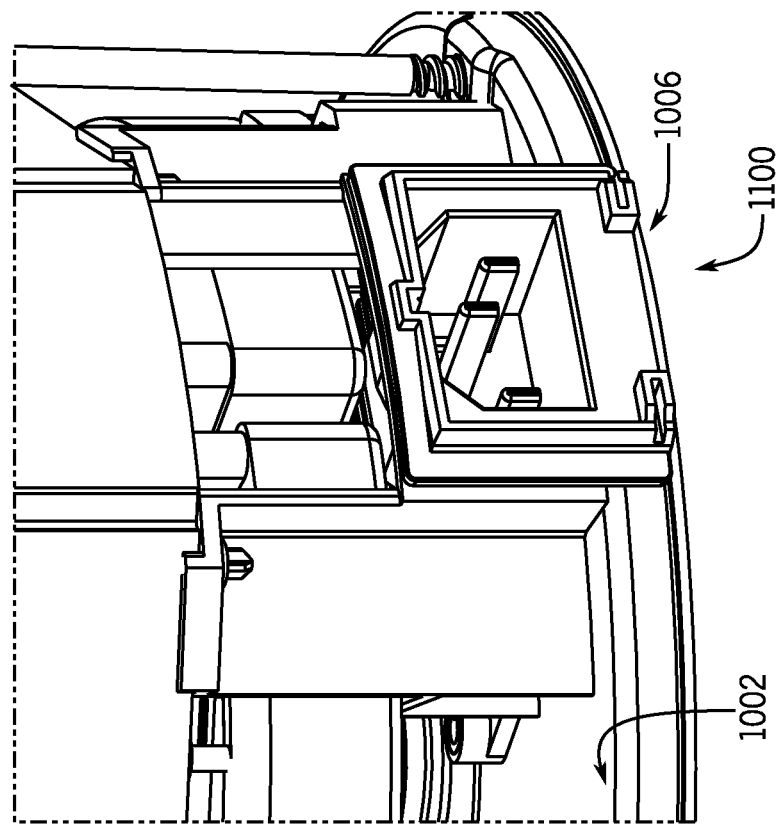
FIG. 11 is a side perspective cutaway view of portions of the food waste disposer in which a stator band of the food waste disposer is removed to reveal some internal features of the disposer.
Figure 10:
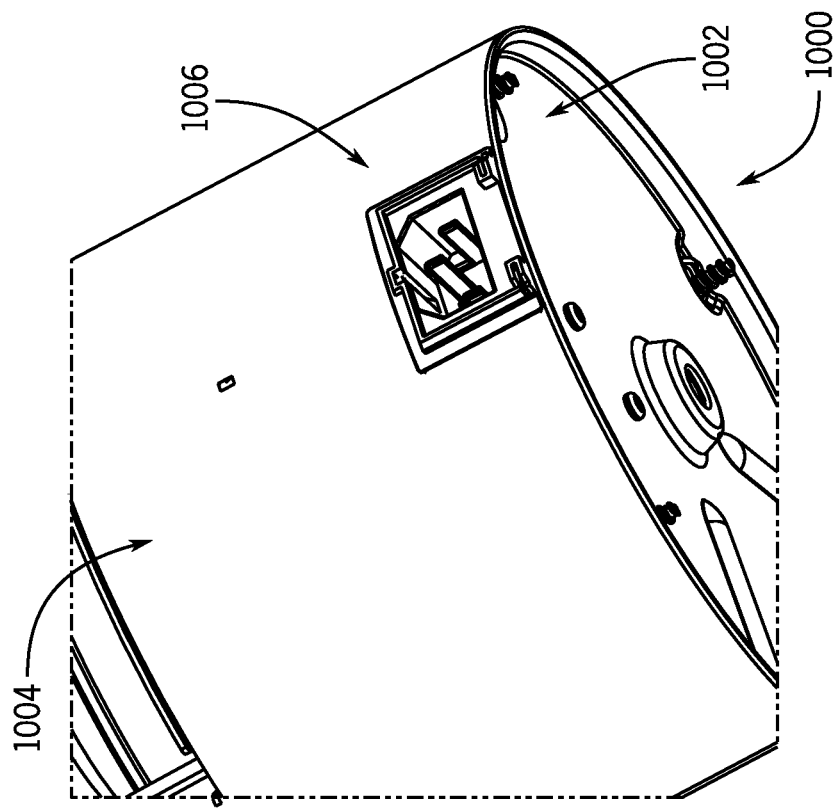
FIG. 10 is a bottom side perspective cutaway view of portions of a second example food waste disposer that, in accordance with a first example embodiment encompassed herein, can be installed in a home so as to receive electric power, in either of two alternative manners depending upon whether the home includes a Romex/BX cable or a wall outlet.

Turning to FIGS. 10, 11, 12, 13A, 13B, 13C, and 14, features of a second example embodiment of a food waste disposer 1000 are shown, where again the food waste disposer can be installed in a home so as to receive electric power in either of two alternative manners depending upon whether the home includes a Romex/BX cable or a wall outlet. FIG. 10 shows a side view of the food waste disposer that also particularly reveals part of the bottom of the food waste disposer 1000 in a manner illustrative of how it would be received by the customer. In particular, FIG. 10 provides a bottom perspective view of a part of a LEF 1002 and a stator band 1004 of the food waste disposer 1000. Relatedly, FIG. 12 (similar to FIG. 6) shows a top perspective view of a portion of the LEF 1002 (and associated components), which includes a start switch module 1014 and an appliance inlet power cord connection structure 1006, which is part of the start switch module 1014 and which can be or include a modified C14 type appliance inlet (FIG. 12 also shows terminals 1201 that are for a cluster block connector from a motor). Further, FIG. 11 provides an additional side view of portions of the food waste disposer 1000 in which the stator band 1004 is removed so as to reveal in more detail certain internal features 1100 of the food waste disposer (e.g., the motor thereof).

Figure 13A:
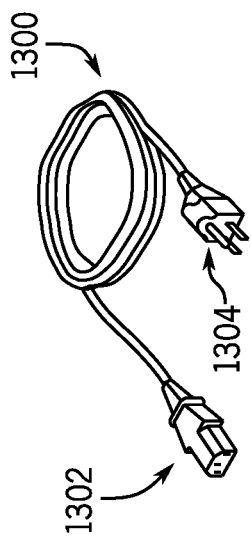
FIGS. 13A-13C show system components that can be selectively employed in or as part of (or in conjunction with) the food waste disposer of FIGS. 10, 11, and 12 so as to achieve installation of the food waste disposer in either of the two alternative manners depending upon whether the home includes a Romex/BX cable or a wall outlet.
Figure 13B:
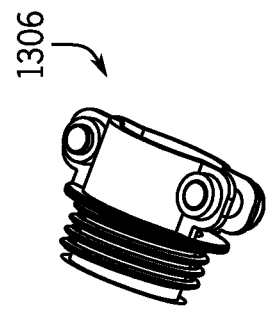
Figure 13C:
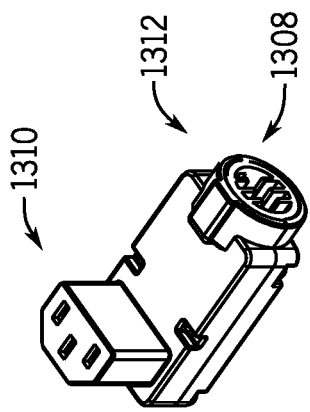
Figure 12:
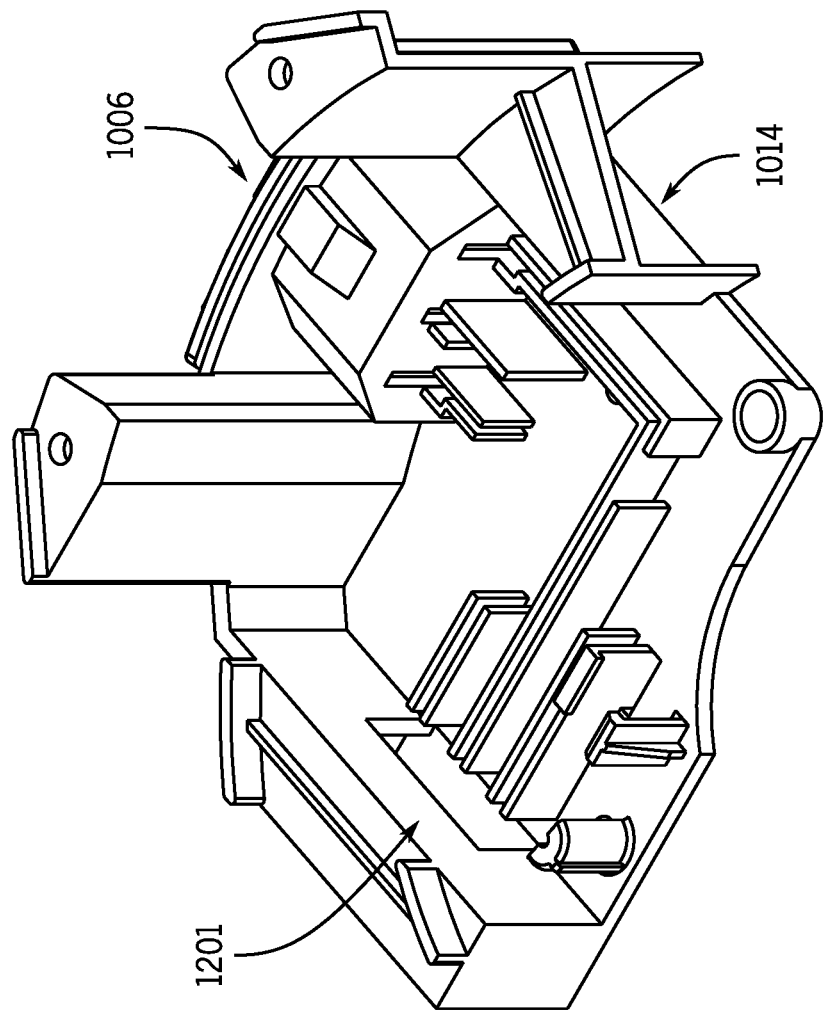
FIG. 12 is a top perspective cutaway view of a portion of a LEF (and associated components) of the food waste disposer of FIG. 10.

Additionally, similar to FIG. 7A, 7B, and 7C, respectively, FIG. 13A, FIG. 13B, and FIG. 13C respectively show system components in conjunction with which the food waste disposer 1000 can be installed, so as to permit the food waste disposer to achieve either corded installation or hardwired installation depending upon whether the environment (e.g., home kitchen) within which the food wasted disposer is being installed includes an electrical wall outlet or a Romex/BX cable. FIG. 13A particularly shows a power cord 1300 that allows for corded installation in an environment in which there is an electrical wall outlet, and that includes both a modified C13 type plug 1302 at a first end of the cord and a NEMA 5-15 plug 1304 at a second (e.g., opposite) end of the cord. By comparison, FIG. 13B and FIG. 13C respectively show a Romex/BX (or simply Romex) coupler 1306 and a Romex/BX adapter with custom plug (or simply Romex adapter) 1308, which includes both a modified C13 type plug 1310 on a first side (or end) of the adapter and a Romex/BX coupling assembly 1312 on a second side (or end) of the adapter.

Figure 14:
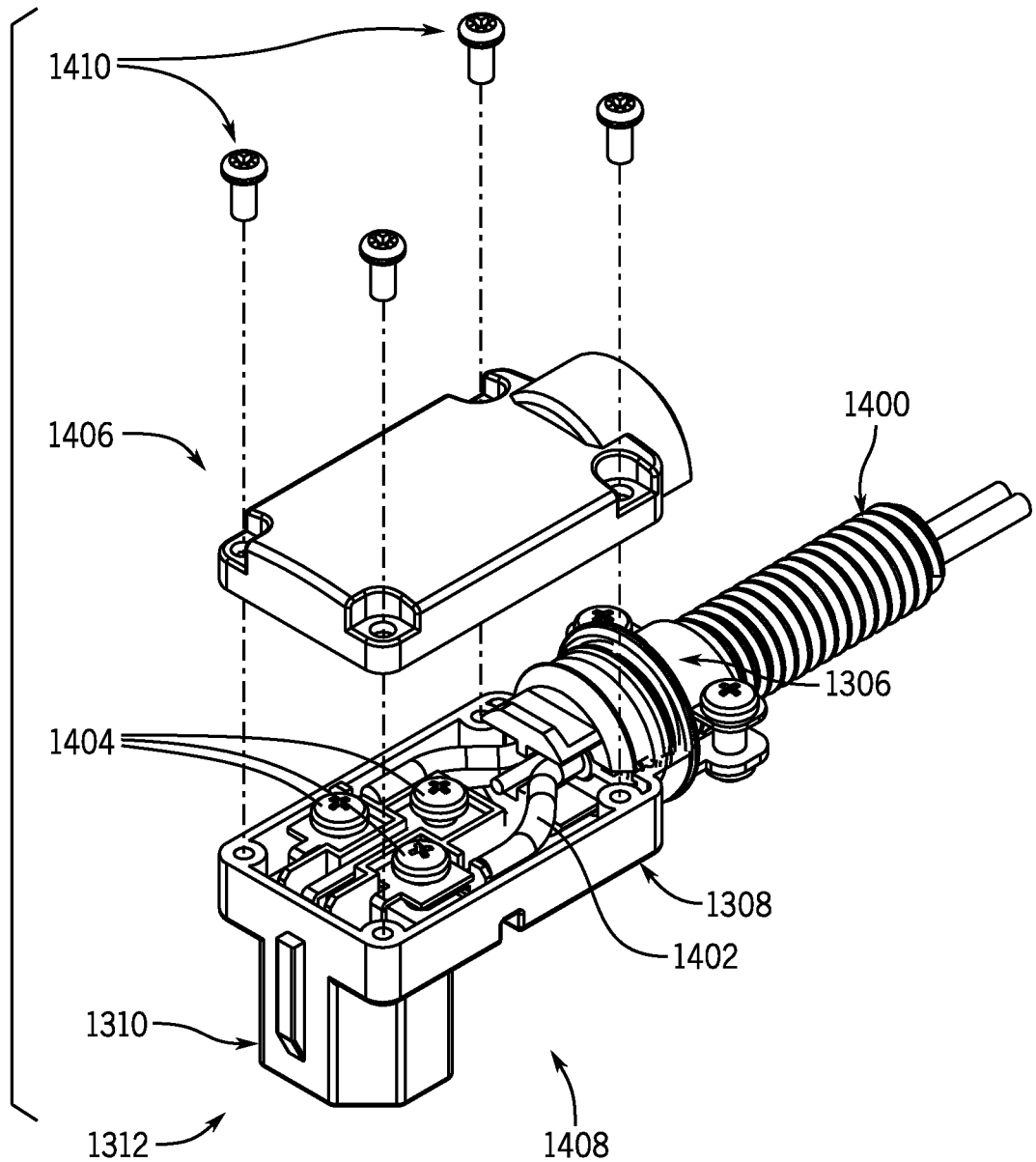
FIG. 14 is a partly-exploded view of an assembly of a Romex/BX cable in relation to an adapter with custom plug shown in FIG. 13C, which can be employed so as to achieve installation of the food waste disposer of FIGS. 10, 11, and 12 in a home having/providing the Romex/BX cable.

Additionally, as further illustrated by FIG. 14, in an installation environment in which a Romex/BX cable 1400 is present, an installer can pass an end of the Romex/BX cable through the Romex coupler 1306 and attach lead wires 1402 extending from an end of that Romex/BX cable to screws 1404 of the Romex/BX coupling assembly 1312. As should be evident from FIG. 14, which provides a partly-exploded view of the Romex/BX coupling assembly 1312 in which a cover portion 1406 is exploded from a remainder portion 1408 of that coupling assembly, the Romex coupler 1306 can be attached to/retained in relation to the Romex/BX coupling assembly 1312 when the cover portion 1406 is assembled to the remainder portion 1408 (e.g., by way of screws 1410).

Based upon a comparison of FIGS. 5, 6, 7A-7C and 8 with FIGS. 10, 12, 13A-13C, and 14, respectively, it should be appreciated that the food waste disposer 1000 and associated system components are either identical to (e.g., in the case of the power cord 1300 relative to the power cord 700) or similar to the food waste disposer 500 and associated system components thereof and, in particular, there is a one-to-one correspondence between the respective components of the food waste disposer 1000 and the respective components of the food waste disposer 500. The food waste disposer 1000 primarily differs from the food waste disposer 500 in that, although the appliance inlet power cord connection structure 506 of the food waste disposer 500 is positioned along the LEF 502, the appliance inlet power cord connection structure 1006 is positioned along the side of the stator 1004 (e.g., along the outer circumferential surface of the food waste disposer 1000) rather than along the LEF 1002. That is, although the modified C14 type appliance inlet of the food waste disposer 500 is accessible through an opening in the LEF 502, the modified C14 type appliance inlet of the food waste disposer 1000 is accessible through an opening in the stator band 1004 rather than through an opening in the LEF 1002.

In view of this difference between the food waste disposer 1000 and food waste disposer 500, there is an additional corresponding difference between the shape of the Romex adapter 1308 relative to the shape of the Romex adapter 708. In particular, as is evident from FIG. 13C and FIG. 14, the modified C13 type plug 1310 of the Romex adapter 1308 extends outward from the Romex adapter 1308 in a direction that is perpendicular to, or substantially perpendicular to, a direction in which the Romex/BX coupling assembly 1312 extends outward from the Romex adapter (that is, the two portions of the Romex adapter extend at right angles relative to one another). This is in contrast to the modified C13 type plug 710 and Romex/BX coupling assembly 712 of the Romex adapter 708, which generally extend outward from the Romex adapter in opposite directions that are parallel or substantially parallel to another. This difference between the Romex adapter 708 and Romex adapter 1308 exists primarily to permit installation of the food waste disposer 1000 in a manner that accommodates a Romex/BX cable that approaches the food waste disposer from a location generally beneath the food waste disposer.

Notwithstanding the above-described differences between the food waste disposer 1000 and associated system components and the food waste disposer 500 and associated system components, nevertheless it should be appreciated that the food waste disposer 1000 can be installed in a manner that is identical or substantially similar to that shown by the flow chart 900 of FIG. 9. Again, depending upon whether the installation environment in which the food waste disposer 1000 is being installed includes a wall outlet or a Romex/BX cable, respectively, either the first branch of steps 910 or the second branch of steps 920 are performed.

Figure 15:
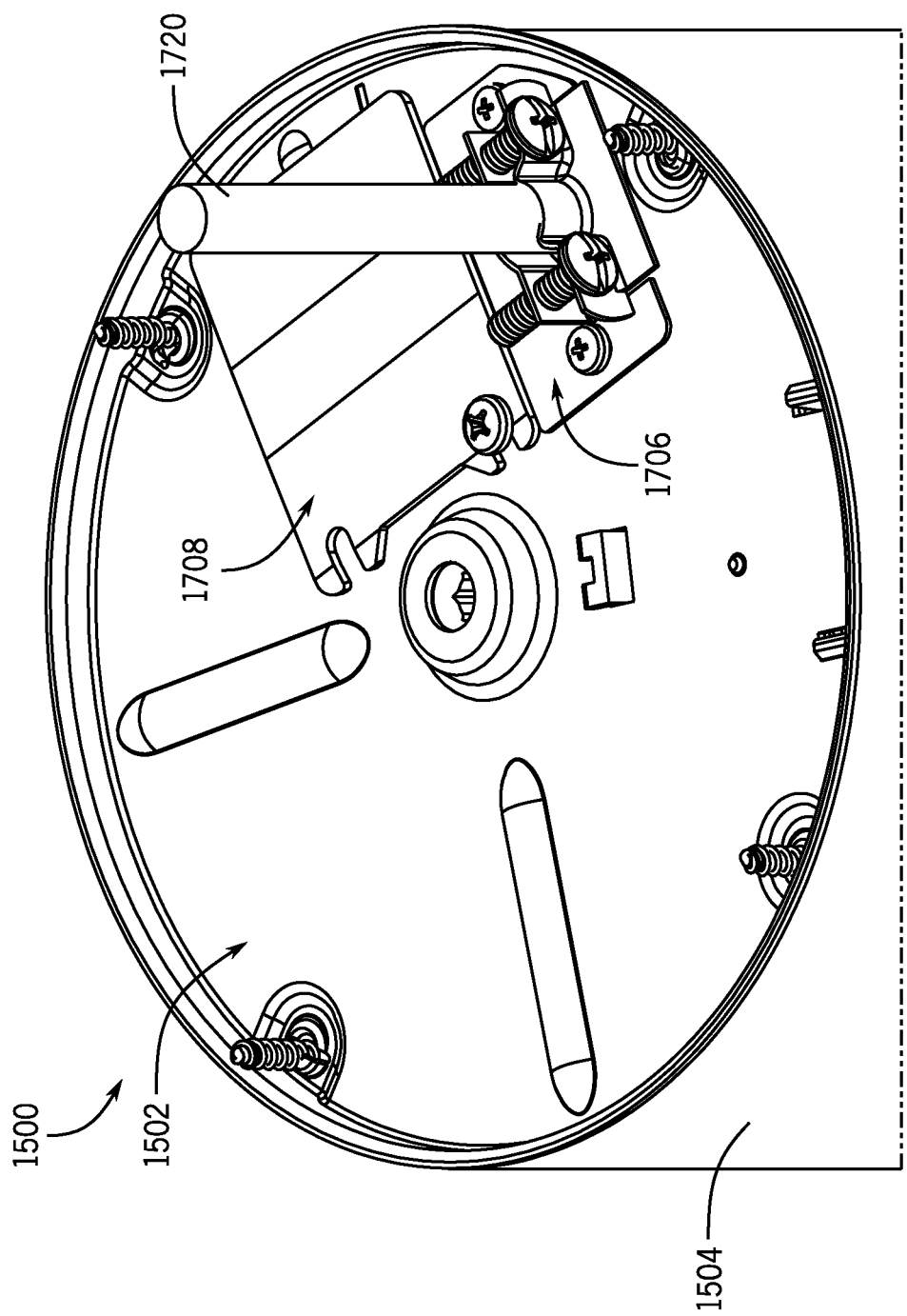
FIG. 15 is a bottom perspective cutaway view of portions of a third example food waste disposer that, in accordance with a third example embodiment encompassed herein, can be installed in a home so as to receive electric power, in either of two alternative manners depending upon whether the home includes a Romex/BX cable or a wall outlet.

Turning to FIGS. 15, 16, 17A, 17B, 17C, 17D, and 17E, features of a third example embodiment of a food waste disposer 1500 are shown, where again the food waste disposer can be installed in a home so as to receive electric power in either of two alternative manners depending upon whether the home includes a Romex/BX cable or a wall outlet. FIG. 15 shows a bottom perspective view of portions the food waste disposer 1500 that also particularly reveals part of the bottom of the food waste disposer 1500 in a manner illustrative of the unit after the Romex/BX cable or cord is installed. Similar to FIG. 5, the bottom perspective view provided by FIG. 15 shows a LEF 1502 and a stator band 1504 of the food waste disposer 1500. Relatedly, FIG. 16 (similar to FIG. 6) shows a top perspective view of the LEF 1502 (and associated components), which includes a start switch module 1514 (FIG. 16 also shows terminals 1601 that are for a cluster block connector from a motor).

In contrast to the food waste disposer 500 of FIG. 5 (and the food waste disposer 1000 of FIG. 10), the food waste disposer 1500 does not include any appliance inlet power cord connection structure that corresponds to the structure 506 (or the structure 1006), but rather includes other features by which the food waste disposer can be installed in environments in which there are either a wall outlet or a Romex/BX cable. More particularly in this regard, the food waste disposer 1500 includes (or is configured to be implemented in conjunction with) system components shown in FIGS. 17A, 17B, 17C, 17D, and 17E. FIG. 17A shows a power cord 1700 that includes lead wires 1702 at a first end and a NEMA 5-15 plug 1704 at a second end. FIGS. 17B and 17C respectively show a Romex coupler plate 1706 and a terminal cover 1708, each of which can be positioned along and coupled to (e.g., by way of screws) a bottom surface of the LEF 1502 so as to cover over (or substantially cover over) respective orifices within the LEF. FIG. 17D additionally shows a pair of lead couplers 1710 and FIG. 17E shows an assembly 1712 including a cluster block connector 1714 along with lead wires 1716 extending therefrom.

It should be appreciated from FIGS. 15, 16, and 17B that the Romex coupler plate 1706 particularly includes an adjustable clamp feature 1718 (e.g., which can be adjusted in tightness for example by way of screws as illustrated). In the present embodiment, either a Romex/BX cable (such as the Romex/BX cable 800 of FIG. 8) or the power cord 1700 can be positioned through and held within (after tightening of) the adjustable clamp feature, depending upon whether installation environment is one in which the Romex/BX cable is present or instead a wall outlet is present, such that use of the power cord 1700 is appropriate for installation of the food waste disposer 1500. FIG. 15 and FIG. 16 both show the Romex coupler plate 1706 to be attached to the LEF 1502, with a cord structure 1720 extending from a location outside of (e.g., from beneath) the LEF 1502 through the clamp feature 1718 to a location within an interior of the food waste disposer 1500. It should be appreciated that the cord structure 1720 shown in FIGS. 15 and 16 is intended to be representative of each of a Romex/BX cable or the power cord 1700, even though only one or other of these two cord structures would extend into the food waste disposer 1500 in any given installation environment.

FIG. 16 particularly illustrates how the cord structure 1720, regardless of whether it is a Romex/BX cable or the power cord 1700 that extends through the Romex coupler plate 1706, can be coupled to the start switch module 1514 so as to allow power to be provided to the food waste disposer 1500. As shown, when the food waste disposer 1500 is fully installed, the cluster block connector 1714 of the assembly 1712 is coupled (inserted relative to) the start switch module 1514 and the lead wires 1716 are coupled to lead wires (or leads) 1722 extending from the cord structure 1720, by way of the lead couplers 1710.

FIG. 16 is intended to be illustrative of each of an installation scenario in which the cord structure 1720 is the power cord 1700 because the installation environment includes a wall outlet, and also another installation scenario in which the installation environment includes a Romex/BX cable, such that the cord structure 1720 is a Romex/BX cable. To the extent that the cord structure 1720 is the power cord 1700, then the lead wires 1722 are the lead wires 1702 of the power cord, and alternatively, to the extent that the cord structure 1720 is a Romex/BX cable, then the lead wires 1722 are lead wires extending from that cable. Finally, it can be noted that the lead wires 1722 in the present example embodiment include each of three different wires.

Two of the lead wires (e.g., a black lead wire and a white lead wire) are respectively coupled by way of respective ones of the lead couplers 1710 to respective ones (e.g., to black and white ones) of the lead wires 1716 of the assembly 1714. However, a third one 1724 of the lead wires 1722 can be a grounding wire and can be coupled to a grounding location on the LEF 1502.

As with the food waste disposers 500 and 1000 and as described in relation to FIG. 9, the method of installation of the food waste disposer 1500 can entail a process that involves either of two branches of steps depending whether the installation environment includes a wall outlet or a Romex/BX cable. The installer would use/implement either the power cord 1700 or the Romex/BX cable (already present at the installation environment/home) in relation to the Romex coupler plate 1706 as appropriate given the particular installation environment. Thus, the method of installation of the food waste disposer 1500 can include each of the steps 901 and 902 as shown in FIG. 9, and based upon the installation environment, can entail either of two branches of steps corresponding to the first branch of steps 910 and second branch of steps 920.

However, it should be recognized that the exact steps of the first branch of steps and second branch of steps that are performed to achieve installation of the food waste disposer 1500 will differ from those shown in FIG. 9, due to the structural differences between the food waste disposer 1500 and the food waste disposers 500, 1000. Indeed, rather than involving performance of the steps 903 through 909 shown in FIG. 9, instead installation of the food waste disposer 1500 entails steps 1801, 1805, 1806, 1807, 1808, 1802, 1803, 1804, 1809, 1810 and 1811 of a flow chart 1800 shown in FIG. 18. As illustrated, the flow chart 1800 can be considered to represent each of two subprocesses or branches of steps, namely, a first alternate branch of steps (in place of the first branch of steps 910) that involves installation via the power cord 1700 if it is performed between points C and D of FIG. 9, and also a second alternate branch of steps (in place of the second branch of steps 912) that involves installation via a Romex/BX cable if it is performed between points A and B of FIG. 9. That is, the flow chart 1800 includes eleven steps 1801 through 1811 that are each performed, in relation to either the power cord 1700 or a Romex/BX cable depending upon the installation environment.

More particularly as shown, the subprocesses represented by the flow chart 1800 each begin at the step 1801, at which the terminal cover 1708 is removed from the LEF 1502. Next, at a step 1802, the installer can pull the motor wires (e.g., the lead wires 1716) through a terminal cover opening within the LEF 1502, which is open due to removal of the terminal cover 1708. Further, at a step 1803, the cord structure 1720 (either the power cord 1700 or the Romex/BX cable, depending upon the installation environment) including associated lead wires such as the lead wires 1722 can be fed through the Romex coupler plate 1706. Next, at a step 1804, a ground screw (not shown) on the LEF 1502 can be loosened and then, at a step 1805, a ground lead wire of the cord structure 1720 (e.g., the third one 1724 of the lead wires 1722 shown in FIG. 16) is coupled to the ground screw (or another ground location on the LEF 1502, if such a ground screw is not available). As already discussed earlier, the cord structure 1720 can be either the power cord 1700 or a Romex/BX cable and thus the step 1805 entails securing either a ground lead wire of the power cord or a ground lead wire of a Romex/BX cable to a ground screw (or other ground location).

Further, at steps 1806 and 1807, first and second additional (e.g., white and black) ones of the lead wires (or wire leads) 1722 of the cord structure 1720 are respectively coupled to first and second lead wires (or motor leads) 1716 of the assembly 1714. Again, the cord structure 1720 can be either the power cord 1700 or a Romex/BX cable, and thus the steps 1806 and 1807 entail either securing the respective lead wires 1702 of the power cord 1700 to the respective motor lead wires 1716 or securing respective lead wires of a Romex/BX cable (e.g., such as the lead wires 802 or 1402 discussed above) to the motor lead wires 1716 depending upon the installation environment, by way of the couplers 1710. It should be appreciated that these steps of coupling the lead wires 1722 to the lead wires 1716 by way of the couplers 1710 is performed outside of the interior of the food waste disposer, as all of these lead wires are at this time extending outward beneath the bottom of the LEF 1502 via the opening existing due to the removal of the terminal cover 1708.

Next, at a step 1808, the Romex coupler plate (or Romex/BX coupler) 1706 is attached to the bottom of the LEF 1502. In the present embodiment, such attachment can be accomplished by way of screws (so that the coupler plate is screwed into the bottom of the LEF). Further, at a step 1809, the lead wires 1716 and 1722 and couplers 1710 linking those lead wires, which are not yet positioned within the interior of the food waste disposer 1500, are pushed through the terminal cover opening back into the interior (e.g., the wiring compartment) of the food waste disposer 1500. Then, at a step 1810 the Romex coupler plate 1706 is secured to the cord structure 1720 (either the power cord 1700 or the Romex/BX cable, depending upon the installation environment) by way of adjustment of the adjustable clamp feature 1718. Finally, at a step 1811 the installer re-attaches the terminal cover 1708 to the LEF 1502 (in this example, by way of a screw).

Figure 3:
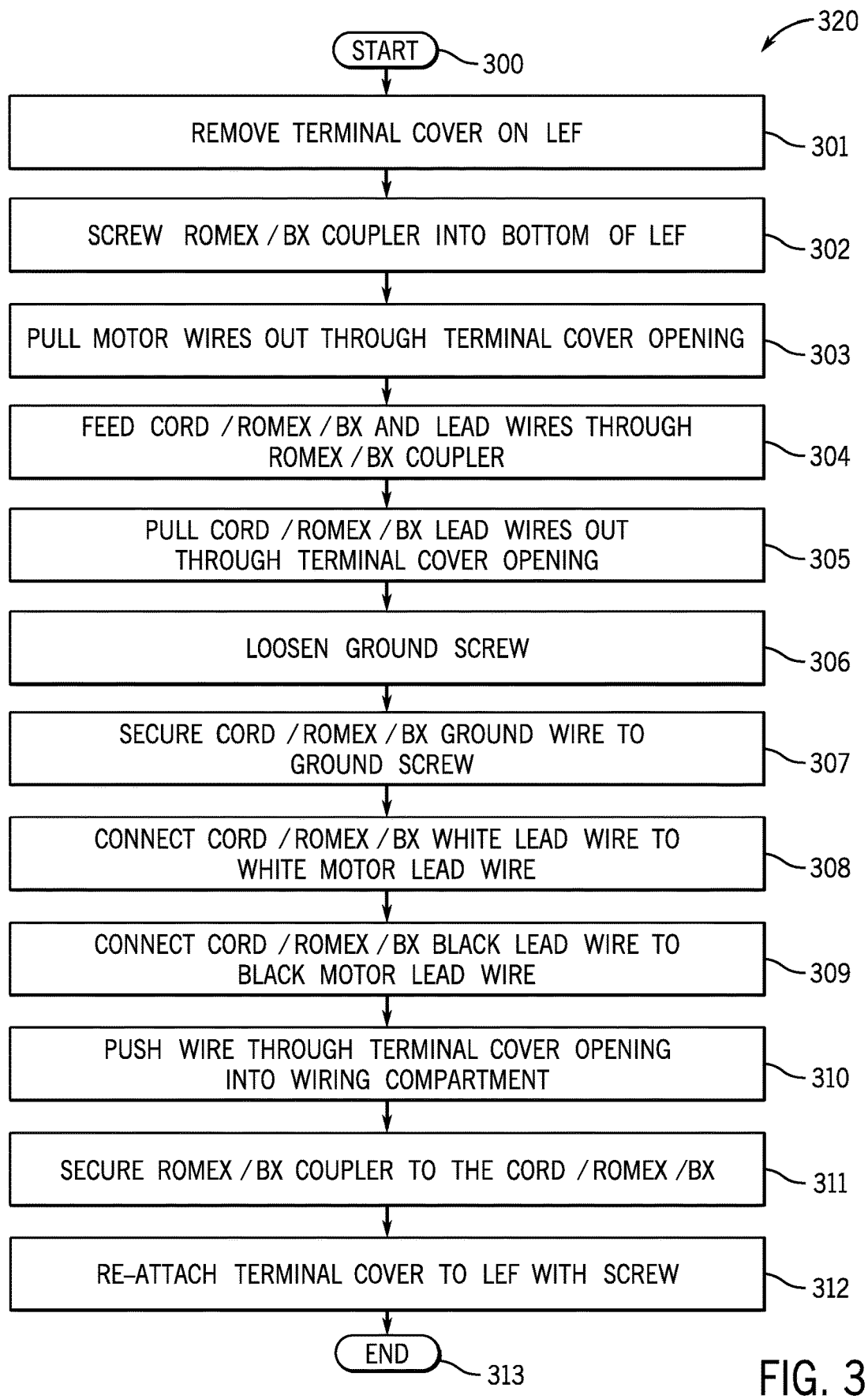
FIG. 3 is a flow chart showing example steps of an installation process by which the food waste disposer of FIG. 1 can be installed in a home having a Romex/BX cable so as to receive electric power.
Figure 4A:
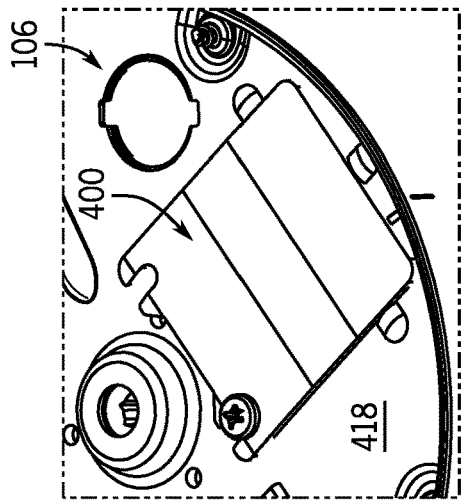
FIGS. 4A through 4L illustrate various ones of the example steps of the installation process of FIG. 3, relative to the LEF and associated components of FIG. 1 and FIG. 2.
Figure 4B:
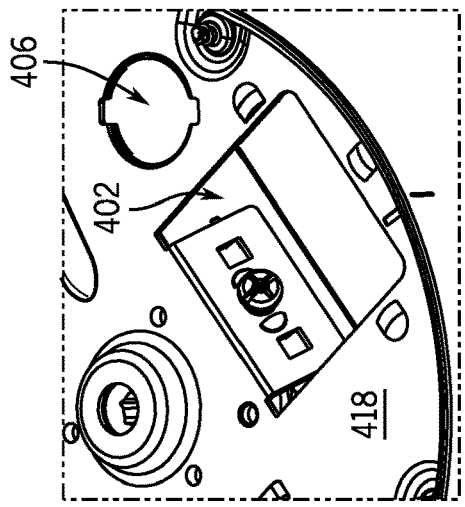
Figure 4C:
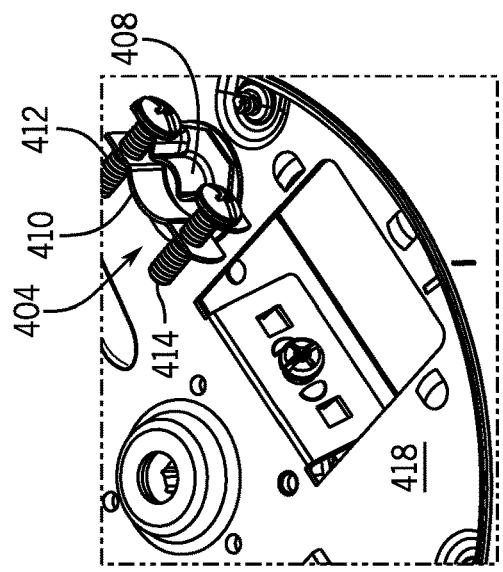
Figure 4D:
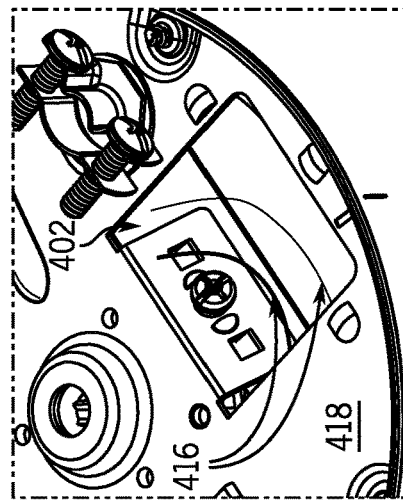
Figure 4E:
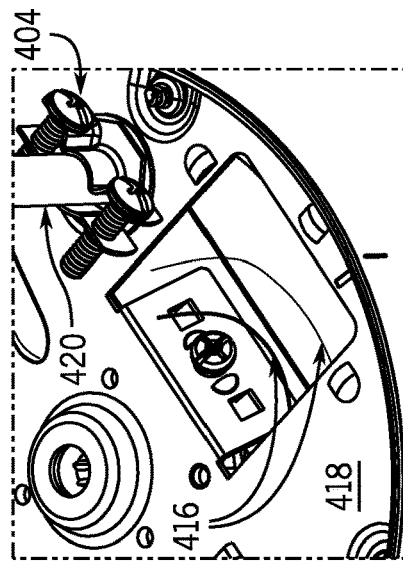
Figure 4F:
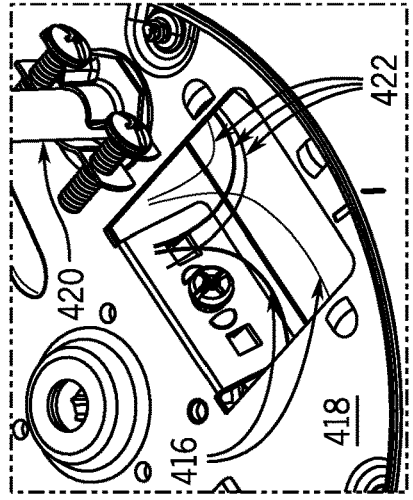
Figure 4G:
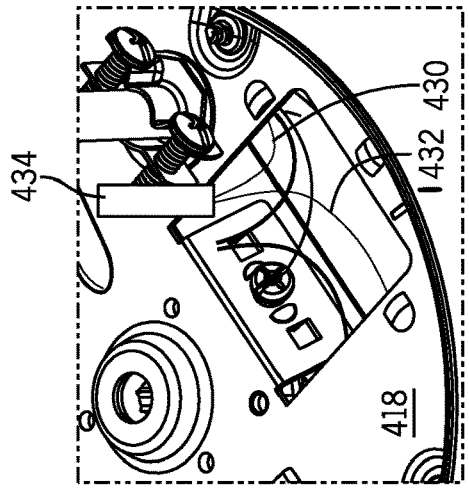
Figure 4H:
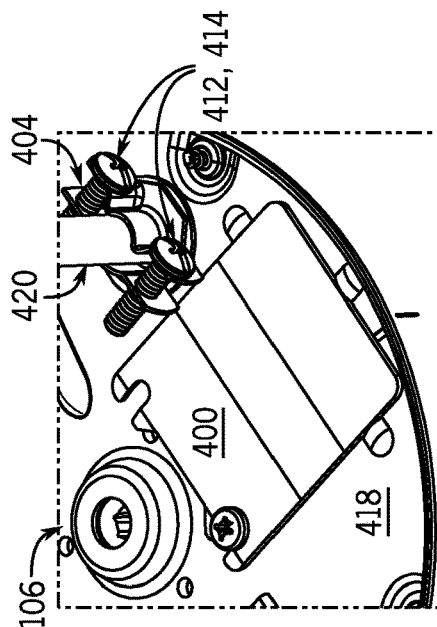
Figure 4I:
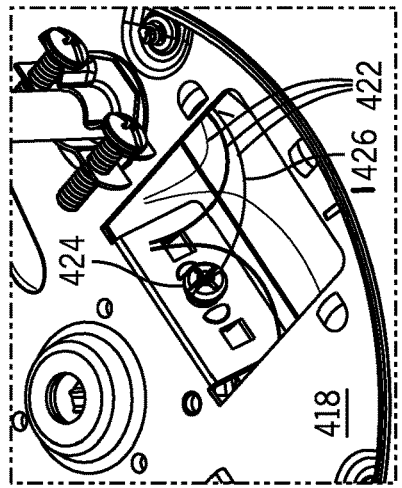
Figure 4J:
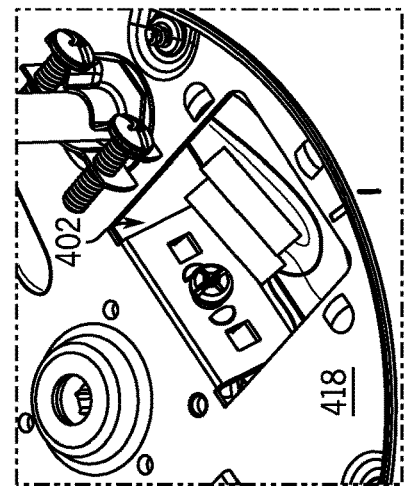
Figure 4K:
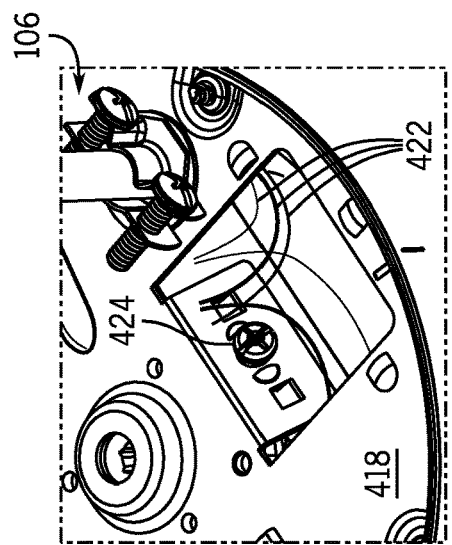
Figure 4L:
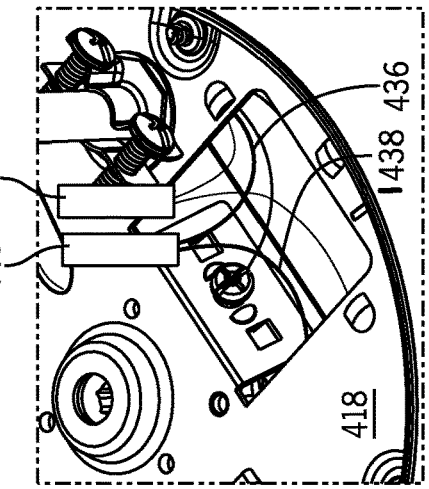

It will be recognized that the flow chart 1800 includes some steps that are identical or similar to those of the flow chart 320 if FIG. 3. However, it should be further recognized that the flow chart 1800 differs from the flow chart 320 in a number of respects. In particular, the flow chart 1800 lacks any step corresponding to the step 305 (involving pulling a cord/Romex/BX lead wires out through a terminal cover opening). Also, several of the steps of the flow chart 1800 (e.g., the steps 1805, 1806, and 1807 of the flow chart 1800 involving securing or connecting of lead wires) are performed prior to the step 1808 at which the Romex coupler plate 1706 is attached (e.g., screwed into) the bottom of the LEF 1502. This is in contrast to the steps 307, 308, and 309 of the flow chart 320, which occur well after the step 302 at which a Romex/BX coupler is screwed into the bottom of the LEF.

The features of the food waste disposer 1500 and associated system components, and method of installing such a food waste disposer, can be advantageous in several respects. For example, it is expected that the above-described change in the ordering of the steps so that the securing/connecting of lead wires (e.g., at the steps 1805, 1806, and 1807) occurs prior to the attachment of the Romex coupler plate 1706 (e.g., at the step 1808) should simplify the process of making the electrical connections. In particular, the lead wires 1716 can be coupled to the lead wires 1722 at a location outside of the interior of the food waste disposer 1502. After the lead wires 1716 and 1722 have been coupled, then the coupled sets of lead wires (including the couplers 1710) can be moved back into the interior of the food waste disposer via the orifice in the LEF 1502 that is to be substantially covered by the Romex coupler plate 1706 and the terminal cover 1708, after which time both the terminal cover and the Romex coupler plate, along with a portion of the cord structure 1720 proceeding therethrough, can be assembled to the LEF 1502. Additionally, it should be appreciated that, in the case of the food waste disposer 1500 and associated system components, there is no difference between uncorded or pre-corded disposers during manufacture. Also, since the disposer is not pre-corded, the power cord can be better positioned in the carton to prevent damage during shipping.

Figure 19:
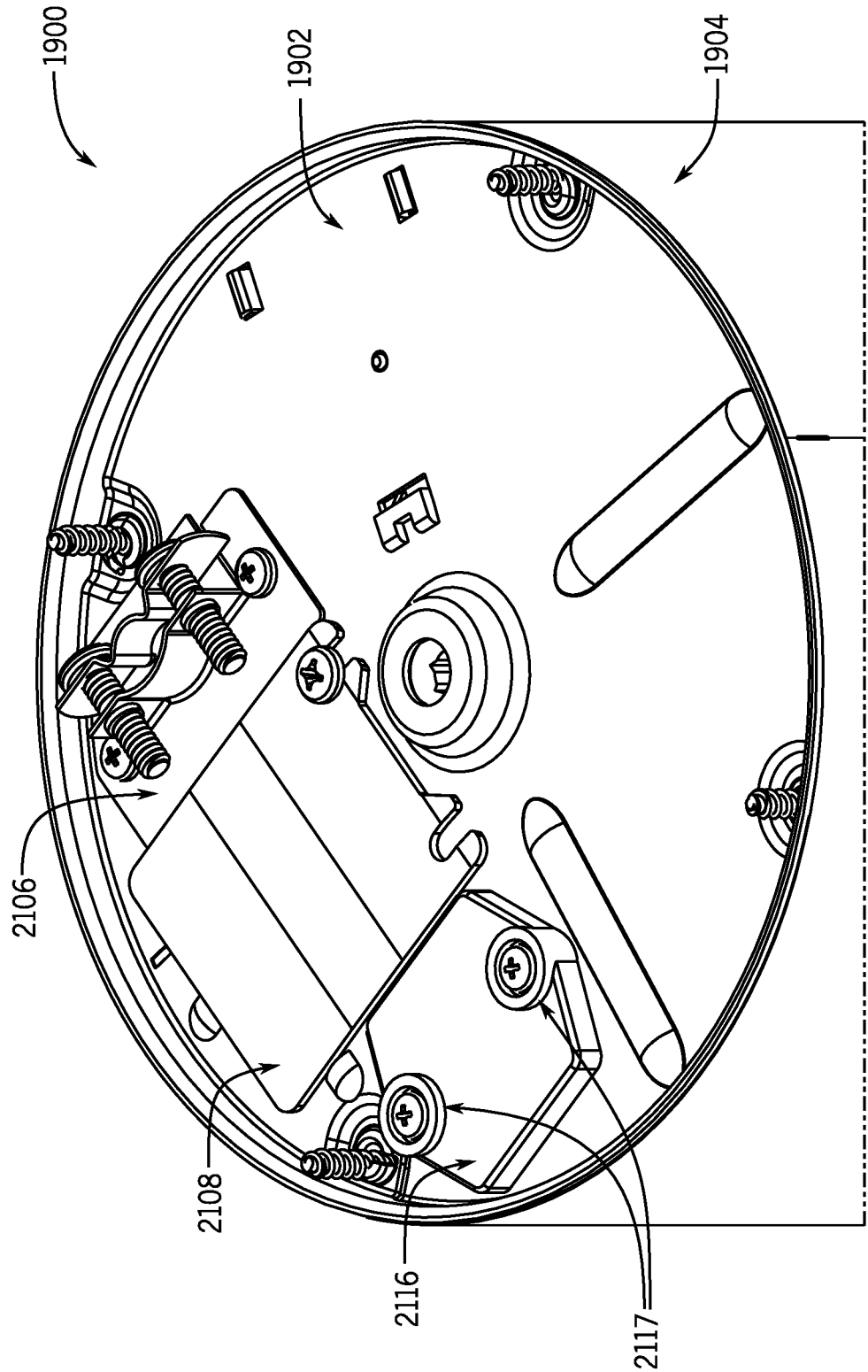
FIG. 19 is a bottom perspective cutaway view of portions of a fourth example food waste disposer that, in accordance with a fourth example embodiment encompassed herein, can be installed in a home so as to receive electric power, in either of two alternative manners depending upon whether the home includes a Romex/BX cable or a wall outlet.

Turning to FIGS. 19, 20, 21A, 21B, 21C, 21D, 21E, 21F, and 21G, features of a fourth example embodiment of a food waste disposer 1900 are shown, where again the food waste disposer can be installed in a home so as to receive electric power in either of two alternative manners depending upon whether the home includes a Romex/BX cable or a wall outlet. FIG. 19 shows a bottom perspective view of portions the food waste disposer 1900 that also particularly reveals the food waste disposer 1900 in a manner illustrative of how it would be received by the customer. Similar to FIG. 15, the bottom perspective view provided by FIG. 19 shows a LEF 1902 and a stator band 1904 of the food waste disposer 1900. Relatedly, FIG. 20 (similar to FIG. 16) shows a top perspective view of portions of the LEF 1902 (and associated components), which includes a start switch module 1914 (FIG. 20 also shows terminals 2001 that are for a cluster block connector from a motor).

In contrast to the food waste disposer 1500 of FIG. 15 (but similar to the food waste disposers 500 and 1000 of FIGS. 5 and 10), the food waste disposer 1900 includes an appliance inlet module (or assembly) 2006 that is shown in FIG. 20. The appliance inlet module 2006 has a receptacle 2115 (see FIG. 21F) that can be exposed along the bottom surface of the LEF 1902 and can receive, depending upon the implementation of the food waste disposer 1900, a power cord 2100 shown in FIG. 21A. As will be discussed in further detail below, however, in the present embodiment the appliance inlet module 2006 is not configured to receive any modified C13 type plug of any Romex adapter as was the case with the Romex adapters 708 and 1308 employed with the food waste disposers 500 and 100 of FIGS. 8 and 14.

Additionally, the food waste disposer 1900 also includes (or is configured to be implemented in conjunction with) system components that are shown in FIGS. 21A, 21B, 21C, 21D, 21E, 21F, and 21G. FIG. 21A particularly shows the power cord 2100 that includes a modified C13 type plug 2102 at a first end and a NEMA 5-15 plug 2104 at a second end. FIGS. 21B and 21C respectively show a Romex coupler plate 2106 and a terminal cover 2108, each of which can be positioned along and coupled (e.g., by way of screws) to a bottom surface of the LEF 1902 so as to cover over (or substantially cover over) respective orifices within the LEF. FIG. 21D additionally shows a pair of lead couplers 2110 and FIG. 17E shows an assembly 2112 including a cluster block connector 2114 along with lead wires 2116 extending therefrom. Additionally, FIG. 21F shows the appliance inlet module 2006 separate and apart from the LEF 102, with the receptacle 2115 of that appliance inlet module (which is capable of receiving the plug 2102) being visible, and FIG. 21G shows an appliance inlet cover 2116 that can be mounted over the receptacle 2115 so as to preclude access to that receptacle.

It will be appreciated that FIG. 19 particularly shows the appliance inlet cover 2116 as being mounted in place (e.g., via screws 2117) over the receptacle 2115 of the appliance inlet module 2006 so as to preclude access to that receptacle.

Additionally, it should also be appreciated from FIGS. 19, 20, and 21B that the Romex coupler plate 2106 includes an adjustable clamp feature 2118 (e.g., which can be adjusted in tightness for example by way of screws as illustrated). Although not shown in FIG. 19, 20, or 21B, it should further be appreciated that a Romex/BX cable (which can be the same as the Romex cables 800 and 1400 of FIGS. 8 and 14) can be positioned through and held within the adjustable clamp feature 2118 (after tightening of the adjustable clamp feature), in the same manner as the cord structure 1720 is held within the adjustable clamp feature of FIG. 17B.

FIG. 20 particularly illustrates internal wiring within the food waste disposer 1900 that allows for one or both of the appliance inlet module 2006 and a Romex/BX cable (not shown in FIG. 20) to be coupled directly or indirectly to the start switch module 1914 so that power can be provided to the start switch module (and thus to a motor within the food waste disposer), either from a wall outlet that is coupled to the appliance inlet module by way of the power cord, or from the Romex/BX cable. As shown, the cluster block connector 2114 of the assembly 2112 is directly plugged into the start switch module 1914, and the lead wires 2116 are coupled to the appliance inlet module 2006. An additional lead wire 2008 is shown to couple a ground terminal 2010 of the appliance inlet module 2006 with a ground screw 2012 on the LEF 1902. Additionally, further lead wires 2020 are also provided that are coupled to the appliance inlet module 2006 that can in turn (at opposite ends thereof) be coupled to lead wires from the Romex/BX cable (e.g., such as the lead wires 1722 discussed above) by way of the couplers 2110. With this connection arrangement, power can be provided to the start switch module 1914 via the appliance inlet module 2006 and the assembly 2112 if the power cord 2100 is coupled between an electric wall outlet and the appliance inlet module, or alternatively if the Romex/BX cable is coupled to the further lead wires 2020.

Figure 18:
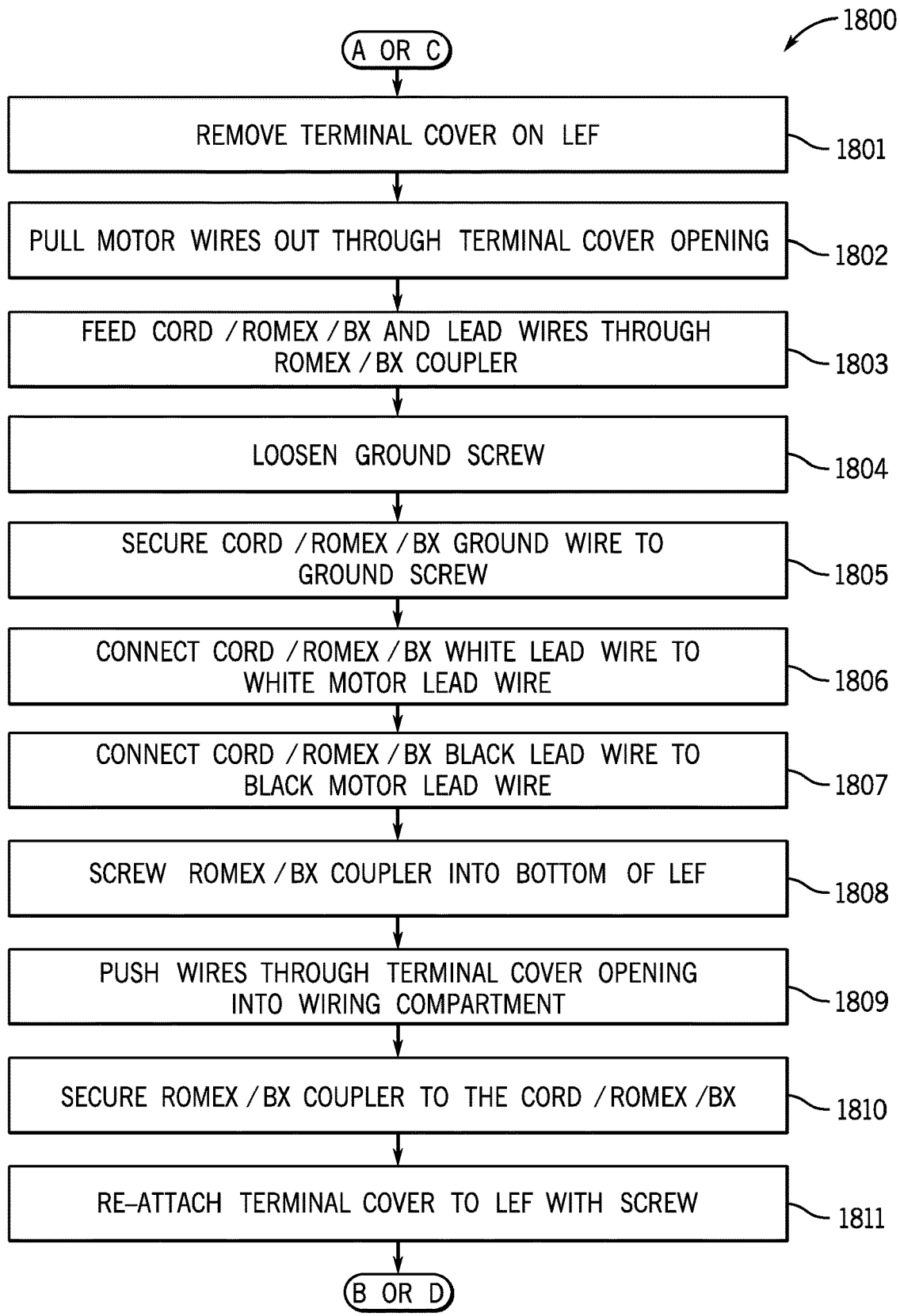
FIG. 18 is a flow chart showing example steps of portions of a modified version of the installation process shown in FIG. 9 by which the food waste disposer and associated system components described in relation to FIGS. 15, 16, and 17A-17E can be installed in either of the two alternative manners depending upon whether the home includes a Romex/BX cable or a wall outlet.

In view of the above discussion, the method of installation of the food waste disposer 1900 includes aspects that are as shown in FIG. 9 and/or FIG. 18 depending upon whether the installation environment includes a wall outlet or a Romex/BX cable. More particularly, if the installation environment includes a wall outlet, the method includes each of the steps 901 and 902 (in addition to the start step 930), as well as each of the steps 903, 904, and 905 of the first branch of steps 910 (in addition to the end step 940). Because the food waste disposer 1900 also includes the appliance inlet cover 2116, the method in such a circumstance can also include an additional step 912 (shown in phantom), in which the appliance inlet cover is removed so as to permit the plug 2102 of the power cord 2100 to be inserted into the receptacle 2115.

Alternatively, if the installation environment includes a Romex/BX cable, the method of installation of the food waste disposer 1900 includes each of the steps 901 and 902 (in addition to the start step 930) and then further the steps of the flow chart 1800 of FIG. 18 (in addition to the end step 940), which again serve as the second alternate branch of steps performed between points A and B of FIG. 9 as discussed above. More particularly, again as shown in FIG. 18, installation involving a Romex/BX cable (subsequent to the step 902) first involves removing the terminal cover 2108 from the LEF 1902 at the step 1801. Next, at the step 1802, the installer can pull the motor wires (e.g., the further lead wires 2020) through a terminal cover opening within the LEF 1902, which is open due to removal of the terminal cover 2108. Further, at the step 1803, the Romex/BX cable including associated lead wires (e.g., corresponding to the lead wires 1722 shown in FIG. 16) can be fed through the Romex coupler plate 2106. Next, at the step 1804, the ground screw 2012 on the LEF 1902 can be loosened and then, at the step 1805, a ground lead wire of the Romex/BX cable is coupled to the ground screw (or another ground location on the LEF 1902, if such a ground screw is not available).

Further, at the steps 1806 and 1807, first and second additional (e.g., white and black) ones of the lead wires (or wire leads) of the Romex/BX cable (e.g., corresponding to the lead wires 1722 of the cord structure 1720 shown in FIG. 16) are respectively coupled to first and second (e.g., white and black) ones of the further (e.g., motor) lead wires 2020 by way of the couplers 2110. It should be appreciated that these steps of coupling the lead wires of the Romex/BX cable to the further lead wires 2020 by way of the couplers 2110 is performed outside of the interior of the food waste disposer, as all of these lead wires are at this time extending outward beneath the bottom of the LEF 1902 via the opening existing due to the removal of the terminal cover 2108.

Next, at the step 1808, the Romex coupler plate (or Romex/BX coupler) 2106 is attached to the bottom of the LEF 1902. In the present embodiment, such attachment can be accomplished by way of screws (so that the coupler plate is screwed into the bottom of the LEF). Further, at the step 1809, the lead wires of the Romex/BX cable (e.g., corresponding to the lead wires 1722), the further lead wires 2020, and the couplers 2110 linking those lead wires, which are not yet positioned within the interior of the food waste disposer 1900, are pushed through the terminal cover opening back into the interior (e.g., the wiring compartment) of the food waste disposer 1900. Then, at the step 1810 the Romex coupler plate 2106 is secured to the Romex/BX cable by way of adjustment of the adjustable clamp feature 2118. Finally, at the step 1811 the installer re-attaches the terminal cover 2108 to the LEF 1902 (in this example, by way of a screw).

In view of the above description, it should be recognized that the food waste disposer 1900 differs from the previously described embodiments in that, although the appliance inlet module 2006 allows for plugging-in of a power cord as is the case with the food waste disposers 500 and 1000 when the installation environment entails a wall outlet, the appliance inlet module merely serves as an intermediate node (or nodes) when the installation environment entails a Romex/BX cable. Also, in contrast to the food waste disposers 500 and 1000, but similar to the food waste disposer 1500, lead wire coupling is performed to permit installation relative to a Romex/BX cable. Further, it should be recognized that the fourth embodiment of the food waste disposer 1900 includes both the modified C14 type appliance inlet and the Romex coupler plate and that, if the installer is using the provided power cord, then the appliance inlet cover 2116 must be removed from the appliance inlet module 2006.

In view of the above characteristics, the food waste disposer 1900 can to some degree be considered a hybrid of the food waste disposers 500, 1000, and 1500. Similar to the installation methods for the food waste disposers 500 and 1000, the installation method for the food waste disposer 1900 involves connecting the disposer to a power source using the provided power cord 2100 when the installation environment entails a wall outlet. That is, after the food waste disposer 1900 is physically installed (e.g., physically mounted to a sink), installation proceeds by connecting the modified C13 type plug 2102 to the disposer appliance inlet module 2006 and the NEMA 5-15 plug 2104 to the wall outlet. By contrast, when the installation environment entails a Romex/BX cable, the installation method for the food waste disposer 1900 entails the steps of the flow chart 1800 and is the same or substantially similar to the method of installing the food waste disposer 1500 when that disposer is installed in an installation environment having a Romex/BX cable.

The features of the food waste disposer 1900 and associated system components, and method of installing such a food waste disposer, can be advantageous in several respects. In particular, in the case of the food waste disposer 1900 and associated system components, there is no difference between uncorded or pre-corded disposers during manufacture. The installer would use the power cord (provided) or Romex/BX cable (e.g., as present at the home installation environment) and the Romex coupler plate (provided) depending upon the particular installation. Also, since the food waste disposer 1900 is not pre-corded, the power cord can be better positioned in the carton to prevent damage during shipping.

Further, as discussed above, the method of the flow chart 1800 includes some steps that are identical or similar to those of the flow chart 320 of FIG. 3, but nevertheless differs from the method of the flow chart 320 in a number of respects. In particular, the flow chart 1800 lacks a step particularly corresponding to the step 305 of the flow chart 320. Also, several of the steps of the flow chart 1800 (e.g., the steps 1805, 1806, and 1807 of the flow chart 1800 involving securing or connecting of lead wires) are performed prior to the step 1808 at which the Romex coupler plate 2106 is attached (e.g., screwed into) the bottom of the LEF 1902. This is in contrast to the steps 307, 308, and 309 of the flow chart 320, which occur well after the step 302 at which a Romex/BX coupler is screwed into the bottom of the LEF.

The above-described change in the ordering of the steps in an installation environment involving a Romex/BX cable, so that the securing/connecting of lead wires (e.g., at the steps 1805, 1806, and 1807) occurs prior to the attachment of the Romex coupler plate 2106 (e.g., at the step 1808), should simplify the process of making the electrical connections. In particular, the lead wires 2020 can be coupled to the lead wires of a Romex/BX cable (e.g., corresponding to the lead wires 1722) at a location outside of the interior of the food waste disposer 1900. After the lead wires have been coupled, then the coupled sets of lead wires (including the couplers 2110) can be moved back into the interior of the food waste disposer via the orifice in the LEF 1902 that is to be substantially covered by the Romex coupler plate 2106 and the terminal cover 2108, after which time both the terminal cover and the Romex coupler plate (along with a portion of the Romex/BX cable extending therethrough) can be assembled to the LEF 1902.

Figure 22:
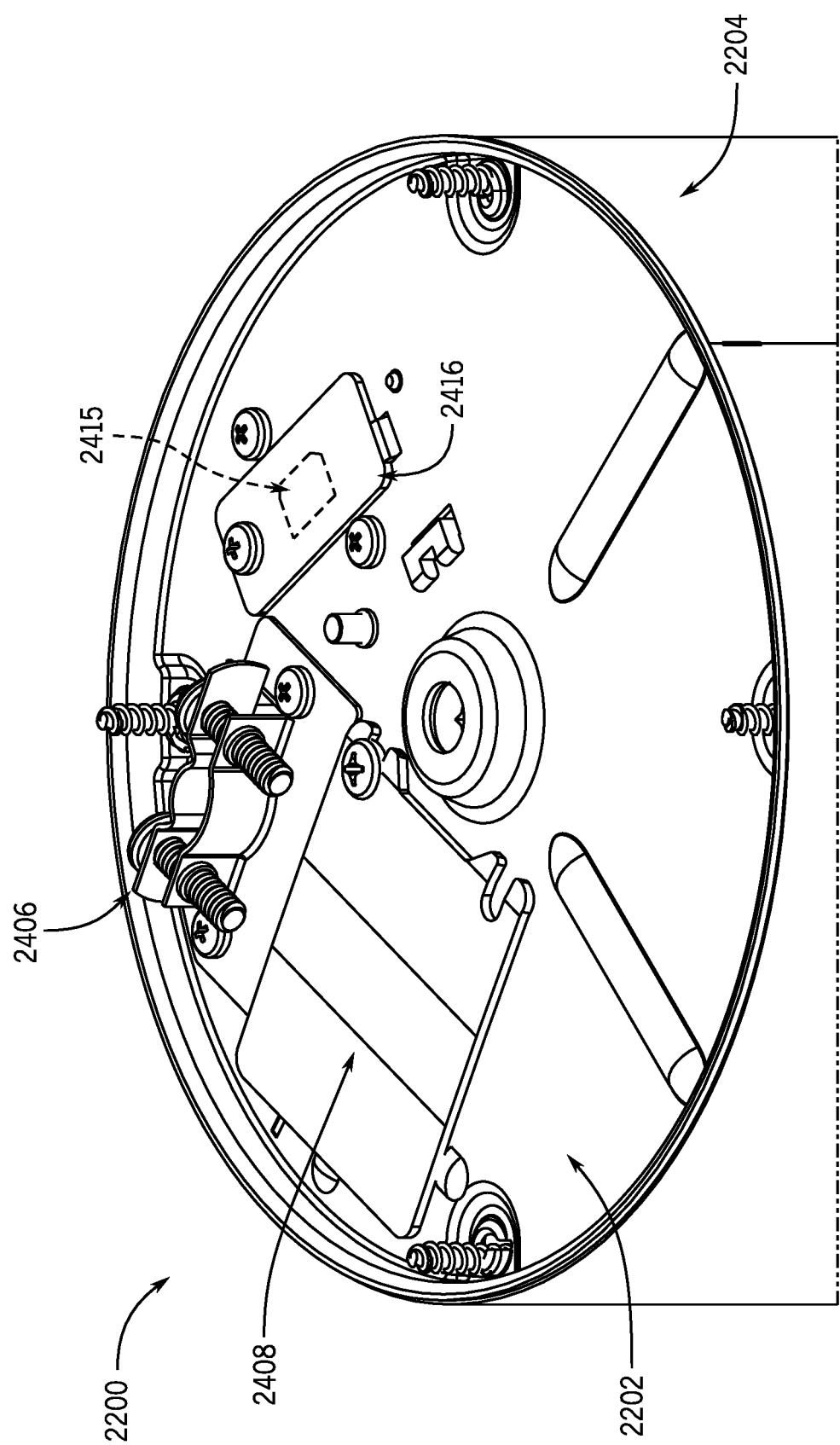
FIG. 22 is a bottom perspective cutaway view of portions of a fifth example food waste disposer that, in accordance with a fifth example embodiment encompassed herein, can be installed in a home so as to receive electric power, in either of two alternative manners depending upon whether the home includes a Romex/BX cable or a wall outlet.

Referring next to FIGS. 22, 23, 24A, 24B, 24C, 24D, and 24E, features of a fifth example embodiment of a food waste disposer 2200 are shown, where again the food waste disposer can be installed in a home so as to receive electric power in either of two alternative manners depending upon whether the home includes a Romex/BX cable or a wall outlet. FIG. 22 shows a bottom perspective view of portions the food waste disposer 2200 that also particularly reveals the food waste disposer 2200 in a manner illustrative of how it would be received by the customer. Similar to FIG. 19, the bottom perspective view provided by FIG. 22 shows a LEF 2202 and a stator band 2204 of the food waste disposer 2200. Relatedly, FIG. 23 (similar to FIG. 20) shows a top perspective view of portions of the LEF 2202 (and associated components), which includes a start switch module 2214

(FIG. 23 also shows terminals 2301 that are for a cluster block connector from a motor). It should be additionally appreciated that, as shown in FIG. 23, an appliance inlet module (or simply appliance inlet) 2306 is provided on the LEF 2202 and, in this embodiment, is fully integrated with the start switch module 2214.

Additionally, the food waste disposer 2200 also includes (or is configured to be implemented in conjunction with) system components that are shown in FIGS. 24A, 24B, 24C, 24D, and 24E. FIG. 24A particularly shows a power cord 2400, which includes a modified C13 type plug 2402 at a first end and a NEMA 5-15 plug 2404 at a second end, and which can be identical to the power cord 2100 of FIG. 21A. FIGS. 24B and 24C respectively show a Romex coupler plate 2406 and a terminal cover 2408, each of which can be positioned along and coupled (e.g., by way of screws) to a bottom surface of the LEF 2202 so as to cover over (or substantially cover over) respective orifices within the LEF. The Romex coupler plate 2406 can be (but need not be) identical to the Romex coupler plate 2106 of FIG. 21B, and in the present embodiment includes an adjustable clamp feature 2418 corresponding to the adjustable clamp feature 2118. Also, the terminal cover 2408 can be (but need not be) identical to the terminal cover 2108 of FIG. 21C. Additionally, FIG. 24D shows a pair of lead couplers 2410, which can be (but need not be) identical to the lead couplers 2110 of FIG. 21D. Finally, FIG. 24E shows an appliance inlet cover 2416, which is also shown in FIG. 22 as covering over a receptacle 2415 (shown in phantom) of the appliance inlet module 2306 (see FIG. 23). In the present embodiment, the appliance inlet cover 2416 has a shape that is different from the appliance inlet cover 2116, albeit in other embodiments the appliance inlet cover 2416 can have the same shape as the cover 2116.

The food waste disposer 2200 and is highly similar to, albeit not identical to, the food waste disposer 1900 described above with reference to FIGS. 19, 20, and 21A through 21G. As in the case of the food waste disposer 1900 (as well as the food waste disposers 500 and 1000), the appliance inlet module 2306 allows for plugging-in of a power cord (e.g., the power cord 2400) when the installation environment entails a wall outlet. However, in the food waste disposer 2200, the appliance inlet module 2306 is connected directly to, or can be formed integrally as part of, the start switch module 2214. That is, the induction motor start switch module 2214 is modified to include the appliance inlet module (or appliance inlet) 2306, which is accessible through an opening in the LEF 2202, and a set of terminals to allow easy electrical connection to the stator during the manufacture and assembly of the disposer.

Given this arrangement of the appliance inlet module 2306 and start switch module 2214, there is no need for any assembly corresponding to the assembly 2112 by which the start switch module 2214 is coupled to the appliance inlet module 2306. Yet the food waste disposer 2200 does still include additional lead wires (or wire leads) 2320 that extend from the appliance inlet module 2306 and that correspond to the lead wires 2116 of the food waste disposer 1900. As with the food waste disposer 1900, in an installation environment entailing a Romex/BX cable, the food waste disposer 2200 is installed relative to the Romex/BX by coupling the lead wires 2320 with lead wires from the Romex/BX cable via the couplers 2410. Further, it should be recognized that the fifth embodiment of the food waste disposer 2200 includes both the modified C14 type appliance inlet and the Romex coupler plate and that, if the installer is using the provided power cord, then the appliance inlet cover 2416 must be removed from the appliance inlet module 2306.

In view of the above discussion, the method of installation of the food waste disposer 2200 is the same or substantially similar to the method of installation of the food waste disposer 1900 discussed above. As with the method of installation of the food waste disposer 1900, the method of installation of the food waste disposer 2200 includes aspects that are as shown in FIG. 9 and/or FIG. 18 depending upon whether the installation environment includes a wall outlet or a Romex/BX cable. More particularly, if the installation environment includes a wall outlet, the method includes each of the steps 901 and 902 (in addition to the start step 930), as well as each of the steps 903, 904, and 905 of the first branch of steps 910 (in addition to the end step 940). Because the food waste disposer 2200 also includes the appliance inlet cover 2416, the method in such a circumstance can also include the additional step 912 (shown in phantom), in which the appliance inlet cover is removed so as to permit the plug 2402 of the power cord 2400 to be inserted into the receptacle 2415.

Alternatively, if the installation environment includes a Romex/BX cable, the method of installation of the food waste disposer 2200 includes each of the steps 901 and 902 (in addition to the start step 930) and then further the steps of the flow chart 1800 of FIG. 18 (in addition to the end step 940), which again serve as the second alternate branch of steps performed between points A and B of FIG. 9 as discussed above. More particularly, again as shown in FIG. 18, installation involving a Romex/BX cable (subsequent to the step 902) first involves removing the terminal cover 2408 from the LEF 2202 at the step 1801. Next, at the step 1802, the installer can pull the motor wires (e.g., the additional lead wires 2320) through a terminal cover opening within the LEF 2202, which is open due to removal of the terminal cover 2408. Further, at the step 1803, the Romex/BX cable including associated lead wires (e.g., corresponding to the lead wires 1722 shown in FIG. 16) can be fed through the Romex coupler plate 2406. Although not shown in FIG. 22 or 23, it should be appreciated that method of installation can further include, at the step 1804, loosening of a ground screw (not shown) on the LEF 2202 and then, at the step 1805, coupling of a ground lead wire of the Romex/BX cable to the ground screw (or another ground location on the LEF 2202, if such a ground screw is not available).

Further, at the steps 1806 and 1807, first and second additional (e.g., white and black) ones of the lead wires (or wire leads) of the Romex/BX cable (e.g., corresponding to the lead wires 1722 of the cord structure 1720 shown in FIG. 16) are respectively coupled to first and second (e.g., white and black) ones of the further (e.g., motor) lead wires 2320 by way of the couplers 2410. It should be appreciated that these steps of coupling the lead wires of the Romex/BX cable to the further lead wires 2320 by way of the couplers 2410 is performed outside of the interior of the food waste disposer, as all of these lead wires are at this time extending outward beneath the bottom of the LEF 1202 via the opening existing due to the removal of the terminal cover 2408.

Next, at the step 1808, the Romex coupler plate (or Romex/BX coupler) 2406 is attached to the bottom of the LEF 2202. In the present embodiment, such attachment can be accomplished by way of screws (so that the coupler plate is screwed into the bottom of the LEF). Further, at the step 1809, the lead wires of the Romex/BX cable (e.g., corresponding to the lead wires 1722), the additional lead wires 2320, and the couplers 2410 linking those lead wires, which are not yet positioned within the interior of the food waste disposer 2200, are pushed through the terminal cover opening back into the interior (e.g., the wiring compartment) of the food waste disposer 2200. Then, at the step 1810 the Romex coupler plate 2406 is secured to the Romex/BX cable by way of adjustment of the adjustable clamp feature 2418. Finally, at the step 1811 the installer re-attaches the terminal cover 2408 to the LEF 2202 (in this example, by way of a screw).

In view of the above characteristics, the food waste disposer 2200 (as is the case with the food waste disposer 1900) can to some degree be considered a hybrid of the food waste disposers 500, 1000, and 1500. Similar to the food waste disposers 500 and 1000, when the installation environment entails a wall outlet, after the food waste disposer 1900 is physically installed (e.g., physically mounted to a sink), the disposer is connected to a power source using the provided power cord 2400—that is, by connecting the modified C13 type plug 2402 to the disposer appliance inlet module 2306 and the NEMA 5-15 plug 2404 to the wall outlet. By contrast, similar to the food waste disposer 1500, when the installation environment entails a Romex/BX cable, the installation method entails the steps of the flow chart 1800 and is the same or substantially similar to the method of installing the food waste disposer 1500 when that disposer is installed in an installation environment having a Romex/BX cable.

The features of the food waste disposer 2200 and associated system components, and method of installing such a food waste disposer, can be advantageous in several respects. In particular, in the case of the food waste disposer 2200 and associated system components, there is no difference between uncorded or pre-corded disposers during manufacture. The installer would use the power cord (provided) or Romex/BX cable (e.g., as present at the home installation environment) and the Romex coupler plate (provided) depending upon the particular installation. Also, since the food waste disposer 2200 is not pre-corded, the power cord can be better positioned in the carton to prevent damage during shipping.

Further, as discussed above, the method of the flow chart 1800 includes some steps that are identical or similar to those of the flow chart 320 of FIG. 3, but nevertheless differs from the method of the flow chart 320 in a number of respects. In particular, the flow chart 1800 lacks a step particularly corresponding to the step 305 of the flow chart 320. Also, several of the steps of the flow chart 1800 (e.g., the steps 1805, 1806, and 1807 of the flow chart 1800 involving securing or connecting of lead wires) are performed prior to the step 1808 at which the Romex coupler plate 2406 is attached (e.g., screwed into) the bottom of the LEF 1902. This is in contrast to the steps 307, 308, and 309 of the flow chart 320, which occur well after the step 302 at which a Romex/BX coupler is screwed into the bottom of the LEF.

The above-described change in the ordering of the steps in an installation environment involving a Romex/BX cable, so that the securing/connecting of lead wires (e.g., at the steps 1805, 1806, and 1807) occurs prior to the attachment of the Romex coupler plate 2406 (e.g., at the step 1808), should simplify the process of making the electrical connections. In particular, the lead wires 2320 can be coupled to the lead wires of a Romex/BX cable (e.g., corresponding to the lead wires 1722) at a location outside of the interior of the food waste disposer 2200. After the lead wires have been coupled, then the coupled sets of lead wires (including the couplers 2410) can be moved back into the interior of the food waste disposer via the orifice in the LEF 2202 that is to be substantially covered by the Romex coupler plate 2406 and the terminal cover 2408, after which time both the terminal cover and the Romex coupler plate (along with a portion of the Romex/BX cable extending therethrough) can be assembled to the LEF 2202.

Figure 25:
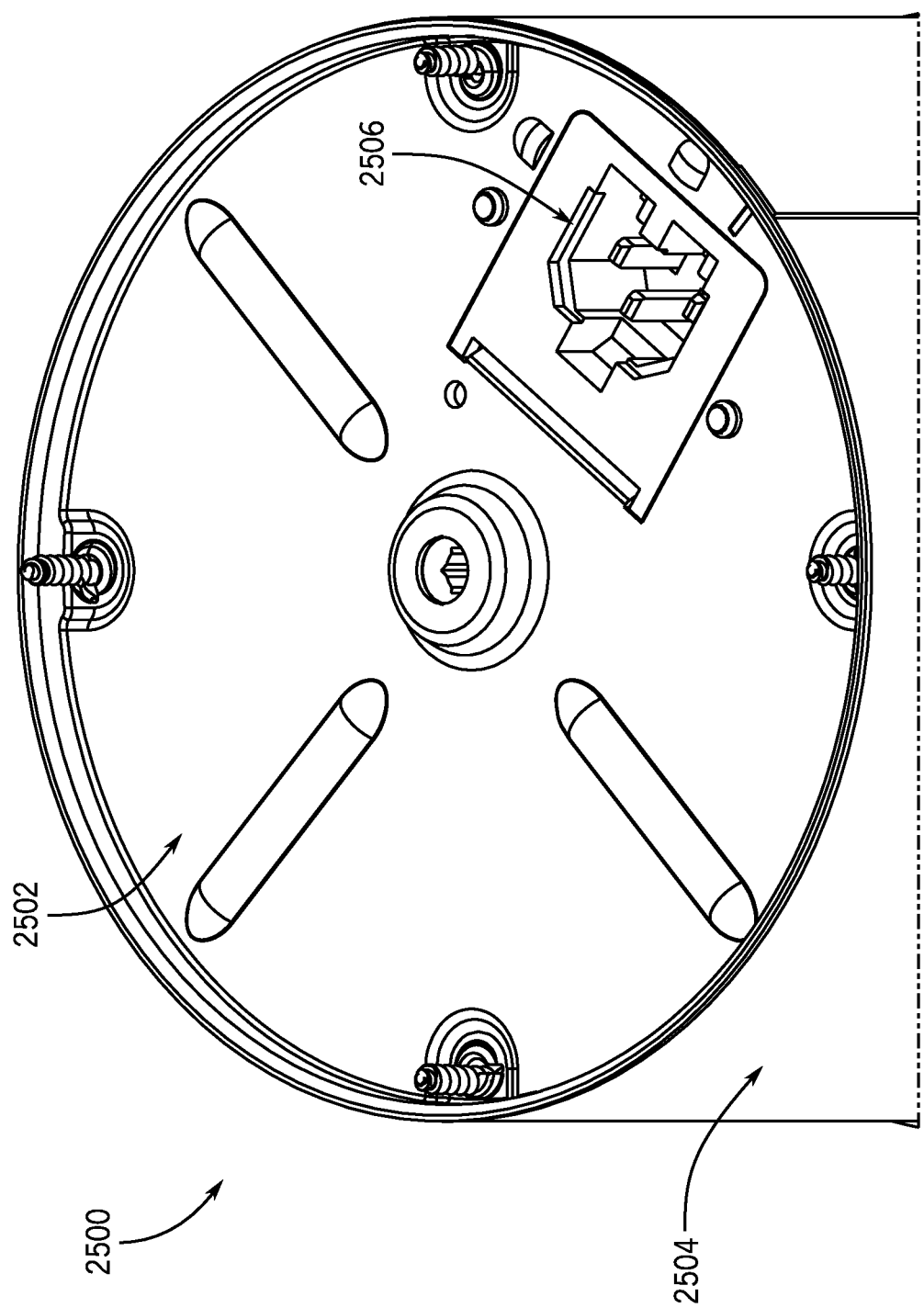
FIG. 25 is a bottom perspective cutaway view of portions of a sixth example food waste disposer that, in accordance with a sixth example embodiment encompassed herein, can be installed in a home so as to receive electric power, in either of two alternative manners depending upon whether the home includes a Romex/BX cable or a wall outlet.

Turning to FIGS. 25, 26, 27A, 27B, 27C, 27D, 28, and 29, features of a sixth example embodiment of a food waste disposer 2500 are shown, where again the food waste disposer can be installed in a home so as to receive electric power in either of two alternative manners depending upon whether the home includes a Romex/BX cable or a wall outlet. FIG. 25 shows a bottom perspective view of the food waste disposer 2500 that reveals part of the bottom of the food waste disposer in a manner illustrative of how it would be received by the customer. In particular, FIG. 25 provides a bottom perspective view of a LEF 2502 and a part of a stator band 2504 of the food waste disposer 2500. Relatedly, FIG. 26 (similar to FIG. 6) shows a top perspective view of a portion of the LEF 2502 (and associated components), which includes a start switch module 2514 and an appliance inlet module 2606, which is part of the induction motor start switch module 2514 and which can be or include an appliance inlet power cord connection structure 2506 that can be a modified C14 type appliance inlet. It should be appreciated that, although the start switch module 2514 includes the modified C14 type appliance inlet that is accessible through an opening in the LEF, there is no access to the internal motor compartment. The start switch module 2514 also includes a set of terminals to allow easy electrical connection to the stator during the manufacture and assembly of the disposer (FIG. 26 also shows terminals 2601 that are for a cluster block connector from a motor).

Additionally, similar to FIGS. 7A, 7B, and 7C, respectively, FIG. 27A, FIG. 27B, and FIG. 27C respectively show system components in conjunction with which the food waste disposer 2500 can be installed, so as to permit the food waste disposer to achieve either corded installation or hardwired installation depending upon whether the environment (e.g., home kitchen) within which the food wasted disposer is being installed includes an electrical wall outlet or a Romex/BX cable. FIG. 27A particularly shows a power cord 2700 that allows for corded installation in an environment in which there is an electrical wall outlet, and that includes both a modified C13 type plug 2702 at a first end of the cord and a NEMA 5-15 plug 2704 at a second (e.g., opposite) end of the cord. After the food waste disposer 2500 is physically installed (e.g., to a sink), the disposer is connected to a power source using the provided power cord 2700 and connecting the modified C13 type plug 2702 to the disposer appliance inlet power cord connection structure 2506 and the NEMA 5-15 plug 2704 to the wall outlet.

By comparison, FIG. 27B and FIG. 27C respectively show system components that are utilized for installation an environment in which there is a Romex/BX cable. More particularly, FIG. 27B and FIG. 27C respectively show a Romex/BX (or simply Romex) coupler 2706 and a Romex/BX cable adapter (or simply Romex adapter) 2708, which includes both a modified C13 type plug 2710 on a first side (or end) of the adapter and a Romex/BX coupling assembly 2712 on a second side (or end) of the adapter. In addition to the system components shown in FIGS. 27A, 27B, and 27C, in the present embodiment the food waste disposer 2500 also can be installed in conjunction with (or include) an additional terminal cover 2714 shown in FIG. 27D, which includes an orifice 2716, and for which there is no counterpart in the food waste disposer 500 that is the subject of FIGS. 5, 6, 7A-7C, and 8).

Figure 29:
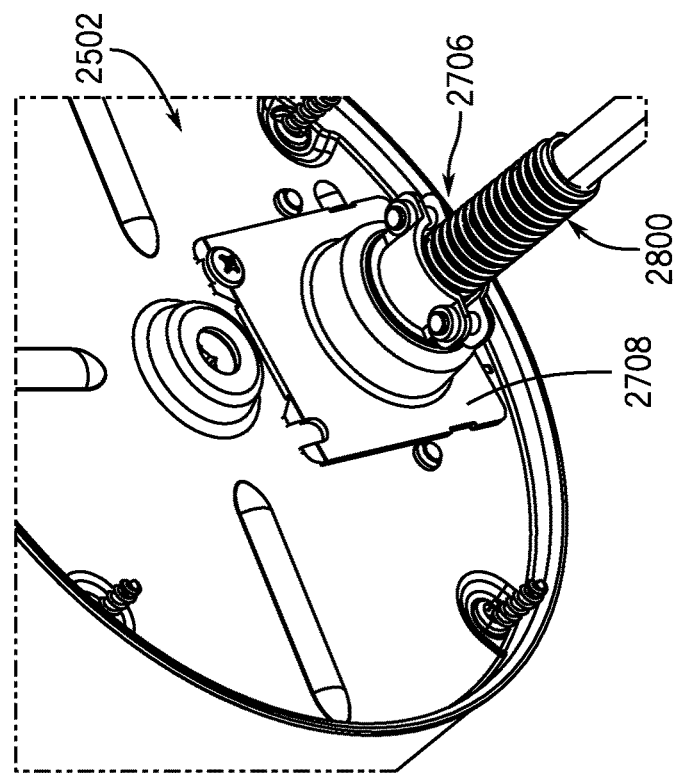
FIG. 29 is an additional bottom perspective cutaway view of the food waste disposer of FIG. 25 when the Romex/BX cable and system components of FIG. 28 are installed so as to allow for electrical power to be provided to the disposer via the Romex/BX cable.
Figure 28:
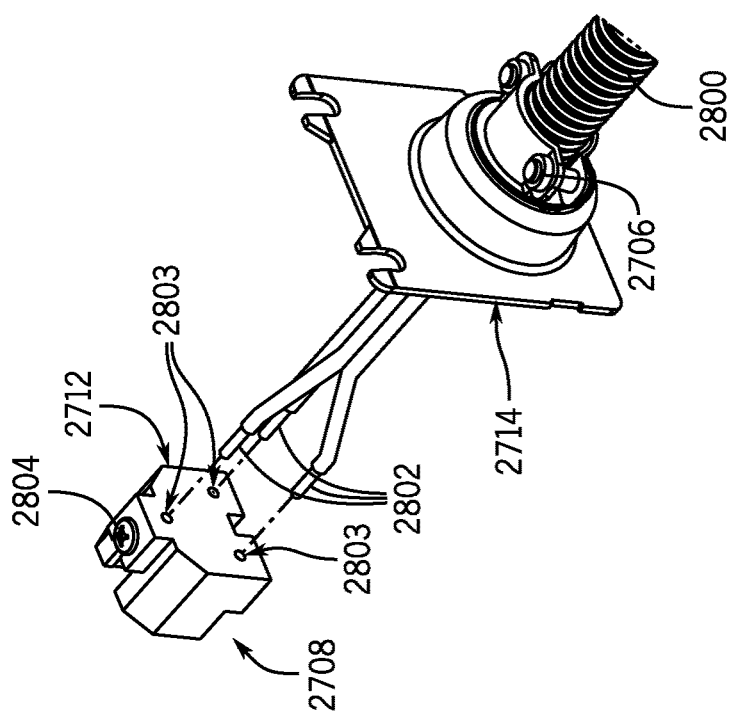
FIG. 28 is a partly-exploded view of an assembly of a Romex/BX cable and the system components of FIGS. 27B, 27C, and 27D, which can be employed so as to achieve installation of the food waste disposer of FIGS. 25 and 26 in a home having/providing the Romex/BX cable.

FIGS. 28 and 29 are additionally provided to illustrate how several of the system components shown in FIGS. 27A, 27B, 27C, and 27D are utilized for installation of the food waste disposer 2500 in an installation environment in which a Romex/BX cable 2800 is present. In this regard, FIG. 28 particularly provides an exploded view of a subassembly of the system components in relation to the Romex/BX cable 2800 prior to coupling of the subassembly to the appliance inlet module 2606 of the food waste disposer 2500, and FIG. 29 shows that subassembly after it has been assembled in relation to the LEF 2502 of the food waste disposer.

More particularly, it should be appreciated from FIGS. 28 and 29 that an installer can attach the Romex coupler 2706 to the terminal cover 2714 by screwing threads 2707 (see FIG. 27B) into the orifice 2716 of the terminal cover. Additionally, an installer will pass an end of the Romex/BX cable 2800 through the Romex coupler 2706 and through the orifice 2716 of the terminal cover 2714. Upon doing so, the installer can further insert tips of lead wires 2802 extending from an end of that Romex/BX cable into complementary holes 2803 within the Romex/BX coupling assembly 2712 of the Romex adapter 2708. The installer then adjusts the tightness of screws 2804 of the Romex/BX coupling assembly 2712, so as to retain the lead wires 2802 within the holes 2803 and thereby complete formation of a subassembly that includes the Romex coupler 2706, terminal cover 2714, and Romex adapter 2708, and that can additionally be viewed as including the Romex/BX cable 2800 (or an end portion thereof). It should be noted that the Romex coupler 2706 can also be tightened relative to the Romex/BX cable 2800 by way of an adjustable clamp feature that is substantially similar to the adjustable clamp feature 2418 of FIG. 24B. With this subassembly fully formed, an installer can complete the installation method by inserting the Romex adapter 2708 into the appliance inlet power cord connection structure 2506 along the bottom surface of the LEF 2502, so that the plug 2710 engages the appliance inlet module 2606, and further attaching the terminal cover 2714 to the bottom of the LEF 2502 (e.g., by way of a screw).

In view of the above discussion, it will be appreciated that there are significant similarities between the food waste disposer 2500 and associated system components and the food waste disposer 500 and associated system components (as well as the food waste disposer 1000 and associated system components). A primary difference between the food waste disposer 2500 and the food waste disposer 500 is that the Romex adapter 2708 takes a form that is smaller than Romex adapter 708 and is sufficiently small that, when the Romex adapter 2708 is inserted into the appliance inlet power cord connection structure 2506, it is positioned sufficiently deeply that the terminal cover 2714 can be positioned directly onto the bottom surface of the LEF 2502 and coupled to the LEF.

Notwithstanding the above-described differences between the food waste disposer 2500 and associated system components and the food waste disposer 500 and associated system components, nevertheless it should be appreciated that the food waste disposer 2500 can be installed in a manner that is identical or substantially similar to that shown by the flow chart 900 of FIG. 9. Again, depending upon whether the installation environment in which the food waste disposer 2500 is being installed includes a wall outlet or a Romex/BX cable, respectively, either the first branch of steps 910 or the second branch of steps 920 are performed.

In an installation environment in which the Romex/BX cable 2800 is present (e.g., for a hardwire installation with Romex/BX cable), the installer can attach the provided Romex adapter 2708, terminal cover 2714, and Romex coupler 2706 to the Romex/BX cable, where attachment of the Romex adapter 2708 involves connecting the individual lead wires 2802 from the Romex/BX cable 2800 to the terminals on the Romex adapter via the screws 2804. The Romex coupler 2706 can be a commonly available electrical component typically used to ground metallic sheathed cable (BX) and/or secure the Romex/BX cable to another component such as an adapter or electrical outlet box.

It should be appreciated that, to the extent the second branch of steps 920 is performed with respect to the food waste disposer 2500, those steps can be performed in a manner that takes into account the particular structural characteristics of the food waste disposer 2500 and associated system components. In particular, at the step 906, as already discussed above, the Romex/BX cable 2800 should be fed through both the Romex coupler and the terminal cover 2714. Additionally, although the second branch of steps 920 is shown to include both the step 907 at which the lead wires of the Romex/BX cable 2800 are secured to the Romex adapter 2708 and additionally the assembly of the Romex adapter is completed, in the case of the food waste disposer 2500 it will be appreciated that the assembly of the Romex adapter is effectively completed upon attachment of the lead wires of the Romex/BX cable to the Romex adapter. Thus, as indicated by a dashed arrow 914, the step 908 can be effectively bypassed during performance of the second branch of steps 920 in the case of the food waste disposer 2500. Finally, again given the presence of the terminal cover 2714 in the present embodiment, the second branch of steps 920 can additionally be viewed as including a step 916 following the step 909, at which the terminal cover 2714 is attached to the LEF 2502, prior the installation method ending at the end step 940.

The above-described sixth embodiment of the food waste disposer 2500 can be advantageous in several respects. In particular, there are no differences between uncorded or pre-corded disposers during manufacture. The installer can use either the provided power cord 2700 or the Romex/BX adapter 2708 for any particular installation. Also, all wiring is external to the disposer and can therefore reduce the likelihood of installation errors. Lastly the detachable cord does not need to be assembled to the food waste disposer 2500 prior to packaging and can be better positioned in the carton to prevent damage during shipping.

Figure 30:
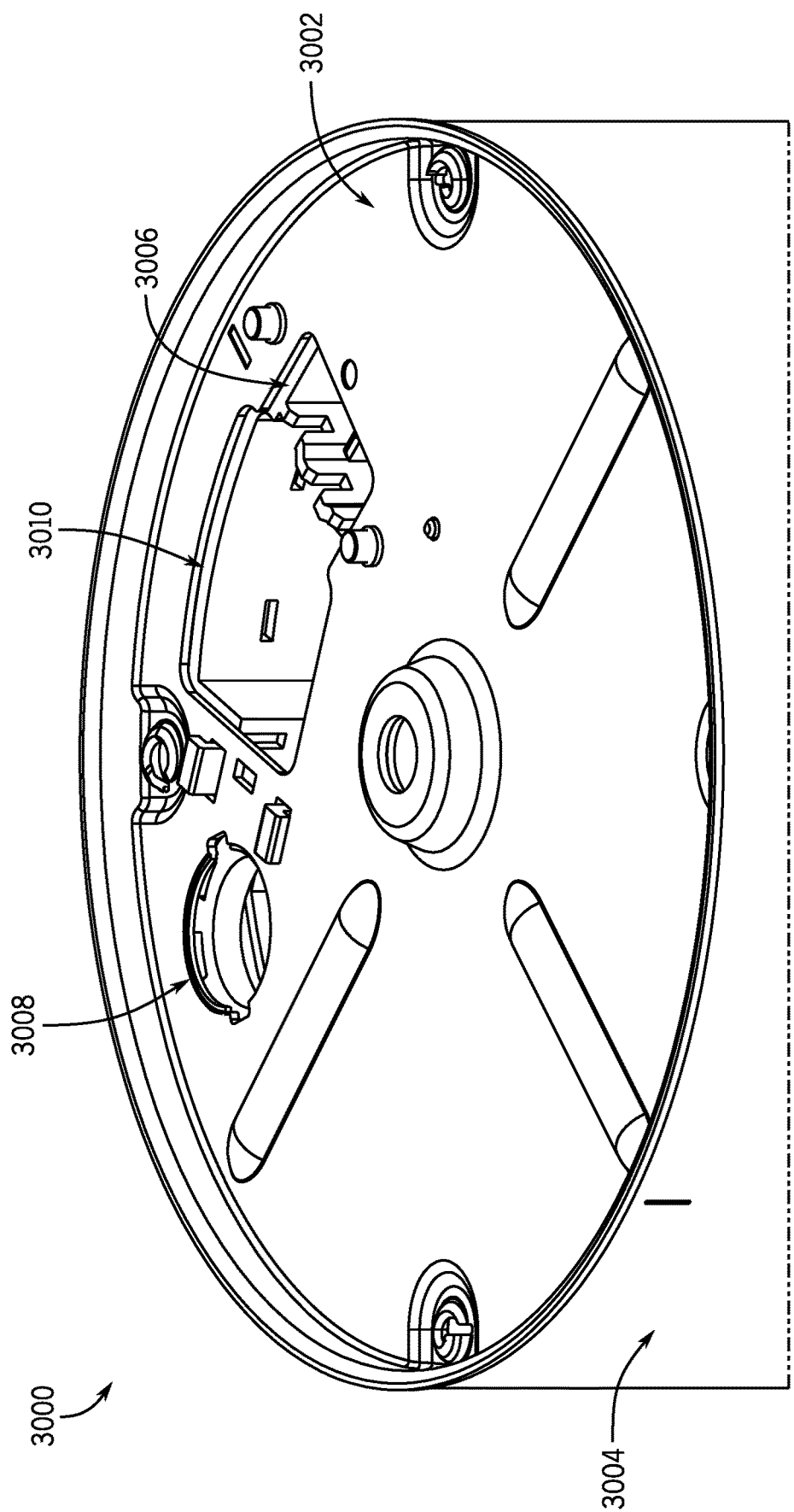
FIG. 30 is a bottom perspective cutaway view of portions of a seventh example food waste disposer that, in accordance with a seventh example embodiment encompassed herein, can be installed in a home so as to receive electric power, in either of two alternative manners depending upon whether the home includes a Romex/BX cable or a wall outlet.
Figure 31:
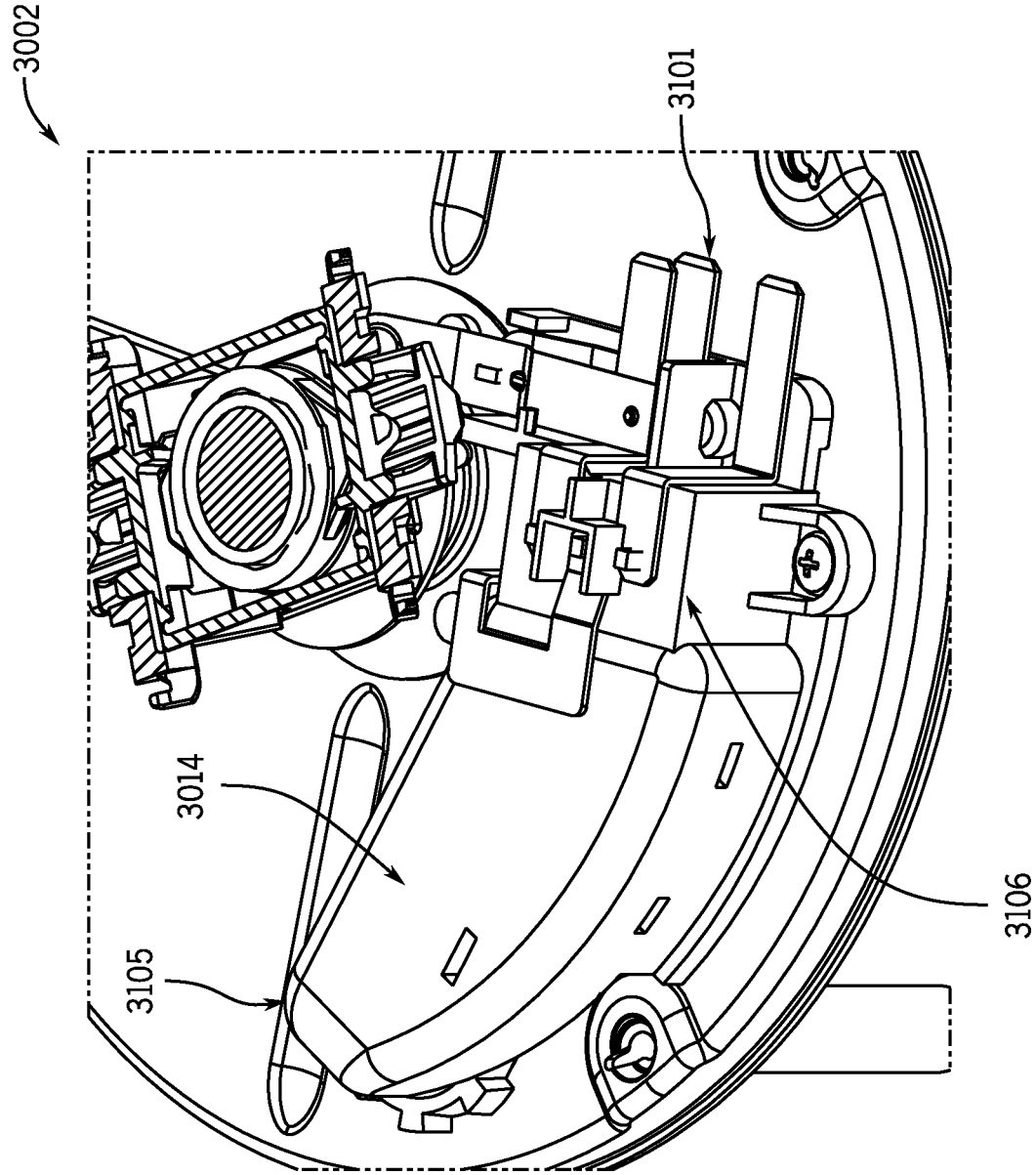
FIG. 31 is a top perspective cutaway view of a portion of a LEF (and associated components) of the food waste disposer of FIG. 30, which also shows system components permitting the disposer to be installed in either of two alternative manners depending upon whether the home includes a Romex/BX cable or a wall outlet.

Referring next to FIGS. 30, 31, 32A, 32B, 32C, 32D, 32E, 33, and 34, features of a seventh example embodiment of a food waste disposer 3000 are shown, where again the food waste disposer can be installed in a home so as to receive electric power in either of two alternative manners depending upon whether the home includes a Romex/BX cable or a wall outlet. FIG. 30 shows a bottom perspective view of portions the food waste disposer 3000 that reveals the food waste disposer in a manner illustrative of how it would be received by the customer. The bottom perspective view provided by FIG. 30 particularly shows a LEF 3002 and a stator band 3004 of the food waste disposer 3000. Relatedly, FIG. 31 shows a top perspective view of portions of the LEF 3002 (and associated components), which include a start switch module 3014 and also terminals 3101 that are for a cluster block connector from a motor. The set of terminals (e.g., the terminals 3101) facilitates electrical connection to the stator during the manufacture and assembly of the disposer.

Additionally as shown, each of an internal wiring box 3105 and an appliance inlet module (or simply appliance inlet) 3106 are provided on the LEF 3002 and, in this embodiment, are fully integrated with the start switch module 3014. The appliance inlet module 3106 provides, as is evident from FIG. 30, an appliance inlet power cord connection structure 3006. The internal wiring box 3105 provides an internal space within which wiring can be routed and, among other things, encloses an internal wiring cavity 3010 that is adjacent to that appliance inlet power cord connection structure 3006 as shown in FIG. 30. These features of the induction motor start switch module 3014—that is, the appliance inlet module 3106, the appliance inlet power cord connection structure 3006, the internal wiring box 3105, and the internal wiring cavity 3010—particularly facilitate installation of the food waste disposer 3000 in installation environment involving either a wall outlet or a Romex/BX cable. At the same time, even though the food waste disposer 3000 includes these features, including the modified C14 type appliance inlet (e.g., as provided by the appliance inlet power cord connection structure 3006) and the internal wiring cavity 3010, the food waste disposer does not provide meaningful access to the internal motor compartment.

Additionally, the food waste disposer 3000 also includes (or is configured to be implemented in conjunction with) system components that are shown in FIGS. 32A, 32B, 32C, 32D, and 32E. FIG. 32A particularly shows a power cord 3200, which includes a modified C13 type plug 3202 at a first end and a NEMA 5-15 plug 3204 at a second end, and which can be identical to the power cord 2400 of FIG. 24A. FIGS. 32B and 32C respectively show a Romex coupler 3206 and a terminal cover 3208, each of which can be positioned along and coupled to a bottom surface of the LEF 3002 so as to cover over (or substantially cover over) respective orifices within the LEF. In the present embodiment, the Romex coupler 3206 can be positioned into and locked in position relative to a coupler orifice 3008 shown in FIG. 30, and includes an adjustable clamp feature 3218 corresponding to the adjustable clamp feature 2418 shown in FIG. 24B.

In the present embodiment, the terminal cover 3208 of FIG. 32C has an arcuate shape that is somewhat different from the terminal cover 2408. It should be appreciated that the shape and size of the terminal cover 3208 are particularly configured so that the terminal cover will, when attached to a bottom surface of the LEF 3002 (see FIG. 34), cover over both the appliance inlet power cord connection structure 3006 and also the wiring cavity 3010 (as are shown in FIG. 30). Given its scope, in a sense the terminal cover 3208 can be considered as serving the coverage purposes of both of the terminal cover 2408 and the appliance inlet cover 2416 of FIGS. 24C and 24E. Additionally, FIG. 32D shows a pair of lead couplers 3210, which can be (but need not be) identical to the lead couplers 2410 of FIG. 24D. Finally, FIG. 32E shows a 3-wire hardwire adapter 3212 that includes a modified C13 type plug 3214 at a first end and three lead wires 3216 extending at a second end opposite the first end.

As in the case of several of the other embodiments of food waste disposers already discussed above (e.g., the food waste disposers 500, 1000, 1900, 2200, and 2500), the appliance inlet module 3106 with the appliance inlet power cord connection structure 3006 allows for plugging-in of a power cord (e.g., the power cord 3200) when the installation environment entails a wall outlet. Thus, after the food waste disposer 3000 is physically installed (e.g., to a sink), the disposer is connected to a power source using the provided power cord 3200, by connecting the modified C13 type plug 3202 to the disposer appliance inlet power cord connection structure 3006 and the NEMA 5-15 plug 3204 to the wall outlet. As already discussed, the appliance inlet module 3106 is connected directly to, or can be formed integrally as part of, the start switch module 3014 (that is, the induction motor start switch module 3014 is modified to include the appliance inlet module), with the appliance inlet power cord connection structure 3006 being accessible through an opening in the LEF 3002. There is no need to employ any assembly corresponding to the assembly 2112 by which the start switch module 3014 is coupled to the appliance inlet module 3106.

By contrast, in an installation environment entailing a Romex/BX cable, the food waste disposer 3000 is installed relative to the Romex/BX cable through the use of the 3-wire hardwire adapter 3212. More particularly, referring to FIG. 33, an additional bottom perspective view of the food waste disposer 3000 is provided that shows a Romex/BX cable 3300 as installed through the Romex coupler 3206. When the Romex/BX cable 3300 is positioned in this manner, lead wires of the Romex/BX cable (not shown) that correspond to the lead wires 1722 of FIG. 16 can be routed within the interior of the food waste disposer 3000 and particularly within the internal wiring box 3105 and into the wiring cavity 3010 via a port 3302. Those lead wires of the Romex/BX cable 3300 in turn can be coupled to the lead wires 3216 of the 3-wire hardware adapter 3212 by way of the couplers 3210, and the 3-wire hardware adapter itself can also be coupled to the appliance inlet power cord connection structure 3006 by plugging-in of the modified C13 type plug 3214 into that appliance inlet power cord connection structure.

Figure 34:
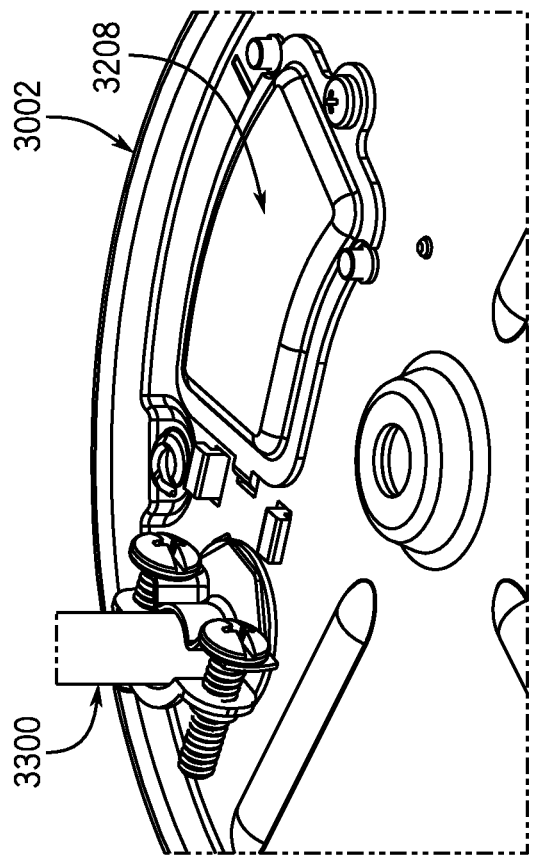
FIGS. 33 and 34 are two different bottom perspective cutaway views of portions of a LEF (and associated components) of the food waste disposer of FIGS. 30, 31, and 32A-32E, which also show system components permitting the disposer to be installed in a home having a Romex/BX cable, with the waste disposer and system components being shown at two states during the installation process.
Figure 33:
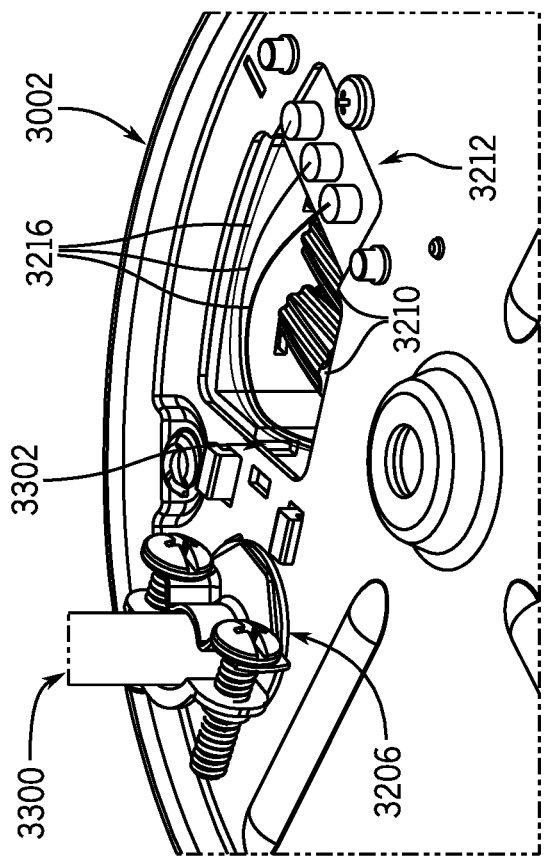

In view of the above description, it can be seen that the 3-wire hardwire adapter 3212 of the seventh embodiment of the food waste disposer 3000 performs a coupling role (in this case, by way of the coupling afforded by the couplers 3210) in a manner that is somewhat analogous to the role played by the Romex adapters 708 and 1308 described above in regard to first and second embodiments of the food waste disposers 500 and 1000. As with the Romex adapters 708 and 1308, the 3-wire hardwire adapter 3212 allows the lead wires from the Romex/BX cable 3300 to be coupled to an appliance inlet power cord connection structure (in this case the structure 3006) that also is suitable for receiving a modified C13 type plug (in this case, the plug 3202). At the same time, however, it should be appreciated that the food waste disposer 3000 differs from the food waste disposer 500 and 1000 in that the 3-wire hardwire adapter 3212, in contrast to the Romex adapters 708 and 1308, is positioned within an enclosed cavity rather than exteriorly of the food waste disposer 3000 when employed with the Romex/BX cable 3300. More particularly as shown in FIG. 34, when the 3-wire hardwire adapter is fully implemented, that adapter along with the couplers 3210 and the ends of the lead wires of the Romex/BX cable 3300 are all enclosed within the internal wiring cavity 3010 by way of the terminal cover 3208.

In view of the above discussion, the method of installation of the food waste disposer 3000 again will depend upon whether installation environment entails a wall outlet or the Romex/BX cable 3300. If the method of installation involves a wall outlet, the method again proceeds in accordance with the flow chart 900 of FIG. 9 including the steps 901 and step 902 (plus the start step 930), followed by the first branch of steps 910 (and the end step 940). However, if the method of installation involves the Romex/BX cable, then the method proceeds in accordance with the flow chart of FIG. 9, including again the steps 901 and 902 (plus the start step 930 and end step 940), except insofar as the steps of the second branch of steps between the points A and B are replaced by another alternate second branch of steps 3501, 3502, 3503, 3504, 3505, 3507, 3508, 3509, 3510, 3511, and 3512 shown in a flow chart 3500 of FIG. 35.

Figure 35:
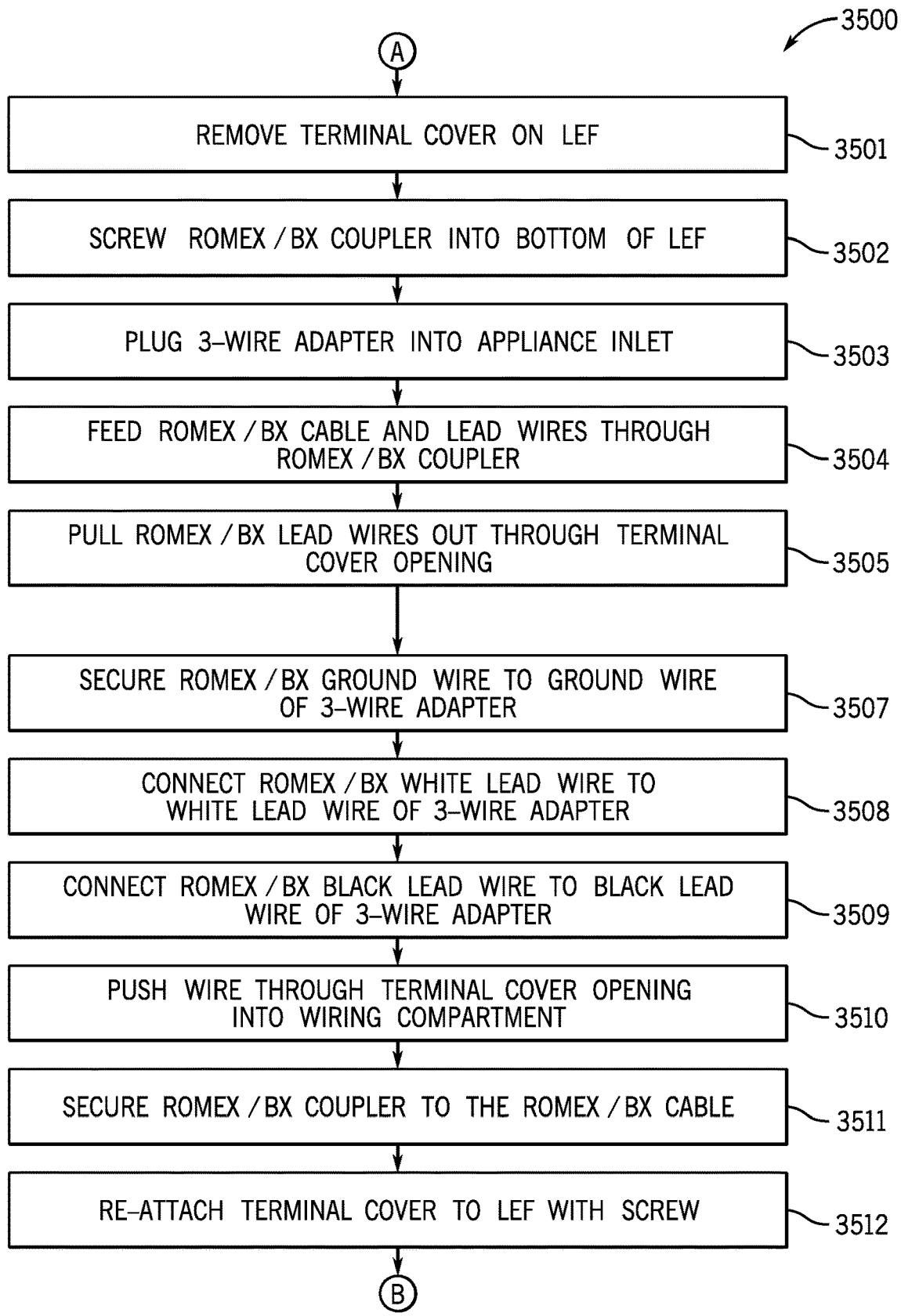
FIG. 35 is a flow chart showing example steps of portions of a modified version of the installation process shown in FIG. 9, in accordance with which the food waste disposer and associated system components described in relation to FIGS. 30-34 can be installed in a home having a Romex/BX cable.

Referring more particularly to FIG. 35, installation involving a Romex/BX cable (subsequent to the step 902) first involves removing the terminal cover 3208 from the LEF 3002 at the step 3501. Next, at the step 3502, the installer attaches (e.g., screws) the Romex/BX coupler 3206 into the coupler orifice 3008 along the bottom surface of the LEF 3002. Next, at the step 3503, the 3-wire hardwire adapter 3212 is plugged into the appliance inlet power cord connection structure 3006. Next, at the step 3504, the Romex/BX cable 3300 and associated lead wires are inserted through the Romex coupler 3206, into the internal wiring box 3105 and further, at the step 3505, the installer can also pull the lead wires of the Romex/BX cable 3300 through the port 3302, into the wiring cavity 3010, and effectively out of the interior of the food waste disposer 3300 through the terminal cover opening made accessible due to the removal of the terminal cover 3208.

Further, at the steps 3507, 3508, and 3509, respectively, first, second, and third ones of the lead wires (e.g., a ground wire, white lead wire, and black lead wire) of the Romex/BX cable 3300 are respectively coupled to complementary ones of the lead wires 3216 (e.g., ground, white, and black ones of those lead wires) of the 3-wire hardwire adapter 3212, by way of the couplers 3210. Next, at the step 3510, all of those coupled lead wires (or coupled lead wire ends) of the Romex/BX cable 3300 and the 3-wire hardwire adapter 3212 and the associated couplers 3210 are pushed back through the terminal cover opening into the wiring cavity 3010. Then, at the step 3511, the Romex coupler 3206 is secured to the Romex/BX cable 3300 (e.g., by way of the adjustable clamp feature 3218). Finally, at the step 3512, the terminal cover 3208 is re-attached to the LEF 3002 (e.g., by way of a screw), so as to completely enclose the lead wires of the Romex/BX cable 3300 and the 3-wire hardware adapter 3212 within the wiring cavity 3010.

It will be recognized that the flow chart 3500 includes some steps that are identical or similar to those of the flow chart 320 of FIG. 3. However, it should be further recognized that the flow chart 3500 differs from the flow chart 320 in a number of respects. For example, the step 303 involving pulling motor wires out through the terminal cover opening is replaced with plugging in the provided 3-wire hardwire adapter 3212 to the modified C14 type appliance inlet at the step 3503. Also for example, rather than including the steps 306 through 309, the flow chart 3500 includes the steps 3507, 3508, and 3509 that involve connecting the lead wires (e.g., the ground, white, and black lead wires) of the Romex/BX cable 3300 with corresponding lead wires of the 3-wire hardwire adapter 3212.

The features of the food waste disposer 3000 and associated system components, and method of installing such a food waste disposer, can be advantageous in several respects. Among other things, the design of the food waste disposer 3000 is such that there is no difference (or no substantial difference) between uncorded or pre-corded disposers during manufacture--the installer can simply use the provided cord or 3-wire hardwire adapter for any particular installation. Also, the internal wiring box (part of the switch) limits access to the internal motor compartment and can reduce installation errors. Lastly the detachable power cord 3200 does not need to be assembled to the food waste disposer prior to packaging and can be better positioned in the carton to prevent damage during shipping.

Figure 36:
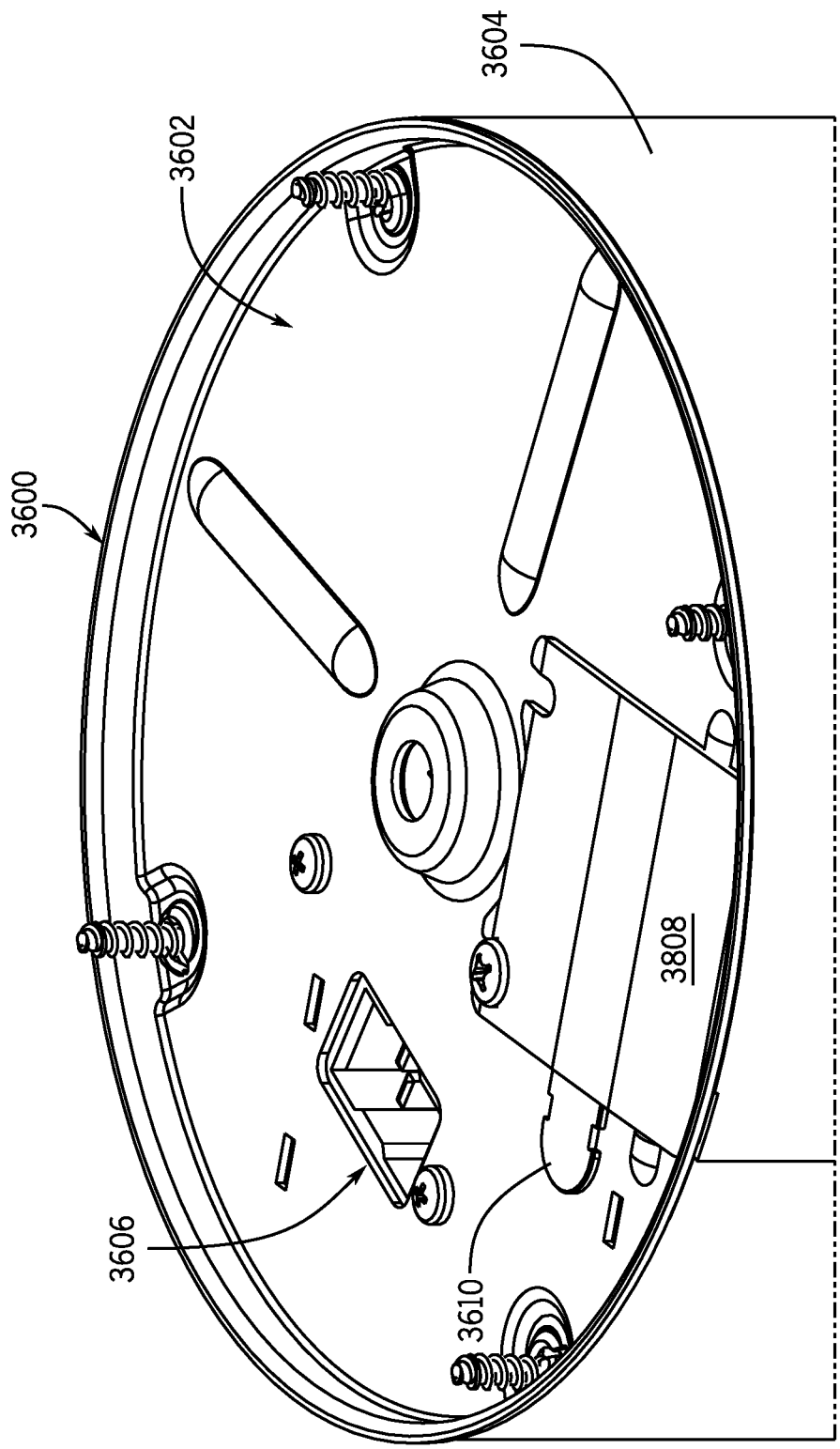
FIG. 36 is a bottom perspective cutaway view of portions of an eighth example food waste disposer that, in accordance with an eighth example embodiment encompassed herein, can be installed in a home so as to receive electric power, in either of two alternative manners depending upon whether the home includes a Romex/BX cable or a wall outlet.

Referring next to FIGS. 36, 37, 38A, 38B, 38C, 38D, 38E, 38F, and 39, features of an eighth example embodiment of a food waste disposer 3600 are shown, where again the food waste disposer can be installed in a home so as to receive electric power in either of two alternative manners depending upon whether the home includes a Romex/BX cable or a wall outlet. FIG. 36 shows a bottom perspective view of portions the food waste disposer 3600 that reveals the food waste disposer in a manner illustrative of how it would be received by the customer. The bottom perspective view provided by FIG. 36 particularly shows a LEF 3602 and a stator band 3604 of the food waste disposer 3600. Also evident in FIG. 36 is an appliance inlet power cord connection structure 3606. Further, the LEF 3602 also includes a lead wire cover 3610 and a terminal cover 3808 (see also FIG. 38C) that can be attached to the bottom surface of the LEF adjacent to one another. Removal of the lead wire cover 3610 and terminal cover 3808 from the LEF respectively results in the exposure of a lead wire orifice and a terminal cover orifice, respectively.

Relatedly, FIG. 37 shows a top perspective view of portions of the LEF 3602 (and associated components), which include a start switch module 3614 and also terminals 3701 (included by the start switch module 3614) that are for a cluster block connector from a motor. The set of terminals (e.g., the terminals 3701) facilitates electrical connection to the stator during the manufacture and assembly of the disposer. Also in the present embodiment, the start switch module 3614 is connected directly to or integrated with an appliance inlet module 3706, which provides the appliance inlet power cord connection structure 3606 that is accessible through an opening in the LEF 3602 as shown in FIG. 36.

Additionally, the food waste disposer 3600 also includes (or is configured to be implemented in conjunction with) system components that are shown in FIGS. 38A, 38B, 38C, 38D, 38E, and 38F. FIG. 38A particularly shows a power cord 3800, which includes a modified C13 type plug 3802 at a first end and a NEMA 5-15 plug 3804 at a second end, and which can be identical to the power cord 3200 of FIG. 32A. FIGS. 38B and 38C respectively show a Romex coupler 3806 and the terminal cover 3808. The Romex coupler 3806 includes an adjustable clamp feature 3818 corresponding to the adjustable clamp feature 3218 shown in FIG. 32B, and the terminal cover 3808 can be positioned along and coupled to a bottom surface of the LEF 3602 so as to cover over (or substantially cover over) a terminal cover orifice within the LEF. Additionally, FIG. 38D shows a pair of lead couplers 3810.

Further, FIG. 38E shows a 3-wire hardwire adapter 3812 that includes a modified C13 type plug 3814 at a first end and three lead wires 3816 extending at a second end opposite the first end. The lead couplers 3810 and 3-wire hardwire adapter 3812 can respectively be (but need not be) identical to the lead couplers 3210 of FIG. 32D and the 3-wire hardwire adapter 3212 of FIG. 32E, respectively. Finally, FIG. 38F shows a perspective view of an external wire box 3820, which as described below can be understood as fulfilling a role that to some extent is analogous to the role played by the internal wiring box 3105 of the food waste disposer 3000.

As in the case of several of the other embodiments of food waste disposers already discussed above (e.g., the food waste disposers 500, 1000, 1900, 2200, 2500, and 3000), the appliance inlet module 3706 with the appliance inlet power cord connection structure 3606 allows for plugging-in of a power cord (e.g., the power cord 3800) when the installation environment entails a wall outlet. Thus, after the food waste disposer 3600 is physically installed (e.g., to a sink), the disposer is connected to a power source using the provided power cord 3800, by connecting the modified C13 type plug 3802 to the disposer appliance inlet power cord connection structure 3606 and the NEMA 5-15 plug 3804 to the wall outlet. As already discussed, the appliance inlet module 3706 is connected directly to, or can be formed integrally as part of, the start switch module 3614 (that is, the induction motor start switch module 3614 is modified to include the appliance inlet module), with the appliance inlet power cord connection structure 3606 being accessible through an opening in the LEF 3602. There is no need to employ any assembly corresponding to the assembly 2112 by which the start switch module 3614 is coupled to the appliance inlet module 3706.

Referring additionally to FIG. 39, an additional perspective view is provided to show how the food waste disposer 3600 can be implemented in an installation environment including a Romex/BX cable 3900. As shown, in such an installation environment, the Romex coupler 3806 can be positioned into and locked in position relative to a coupler orifice 3822 of the external wire box 3820 (see FIG. 38F), and the Romex/BX cable can be inserted through the Romex coupler 3806 locked relative to the Romex coupler by way of the adjustable clamp feature 3818. Additionally, the external wire box 3820 (which is shown in phantom) can be affixed to the bottom surface of the LEF 3602 as shown. It should be appreciated that, when implemented as shown in FIG. 39, the external wire box 3818 in combination with the bottom surface of the LEF 3602 provides an internal space within which wiring can be routed. Also, in addition to covering over a portion of the bottom surface of the LEF 3602, the external wire box 3818 also encloses the appliance inlet power cord connection structure 3606 and the lead wire orifice that is exposed when the lead wire cover 3610 (see FIG. 36) is removed. When the food waste disposer 3600 is fully installed, both the terminal cover 3808 and the external wire box 3818 (but not the lead wire cover 3610) are attached to the bottom surface of the LEF 3602, and an edge 3902 of the external wire box 3818 runs along an edge of the terminal cover 3808.

Further with reference to FIG. 39, it should be appreciated that installation of the food waste disposer 3600 in an installation environment entailing the Romex/BX cable 3900 is somewhat similar to installation of the food waste disposer 3000 in an installation environment entailing the Romex/BX cable 3300 as described above. Just as the Romex/BX cable 3300 is attached to the appliance inlet power cord connection structure 3006 via the 3-wire hardwire adapter 3212 in the case of the food waste disposer 3000, the Romex/BX cable 3900 is attached to the appliance inlet power cord connection structure 3606 via the 3-wire hardwire adapter 3812 in the case of the food waste disposer 3600. However, while the coupling of the lead wires of the Romex/BX cable 3300 to the 3-wire hardwire adapter 3212 is achieved by way of wire coupling that ultimately is housed within the interior of the food waste disposer 3000 (e.g., above the LEF 3002), within the internal wiring cavity 3010 as enclosed by the terminal cover 3208, the coupling of lead wires of the Romex/BX cable 3900 to the 3-wire hardwire adapter 3812 is achieved by way of wire coupling that is ultimately housed within a region exterior of the food waste disposer 3600 (e.g., beneath the bottom surface of the LEF 3602), within the wiring cavity formed by the external wire box 3820.

More particularly, it should be appreciated that coupling of the Romex/BX cable 3900 in relation to the appliance inlet power cord connection structure 3606 via the 3-wire hardwire adapter 3812 occurs as illustrated by FIGS. 37 and 39. In particular, FIG. 39 illustrates a state in which the Romex/BX cable 3900 has been positioned through the Romex coupler 3806, the Romex coupler 3806 has been positioned within the orifice 3822 of the external wire box 3820, the modified C13 type plug 3814 of the 3-wire hardwire adapter 3812 has been inserted into the appliance inlet power cord connection structure 3606, and the external wire box 3820 has been attached to the bottom surface of the LEF 3602. When these components are in this state, then each of the lead wires 3816 of the 3-wire hardwire adapter 3812 and the lead wires 3702 of the Romex/BX cable (which correspond to the lead wires 1722 of FIG. 16) can be routed within the interior of the external wire box 3820 so as to extend through the lead wire orifice (existing due to the removal of the lead wire cover 3610) and into the interior of the food waste disposer 3600 as shown in FIG. 37.

Although FIGS. 37 and 39 both show the terminal cover 3808 as being present, it should be appreciated that during the installation process the terminal cover is temporarily removed, so that the terminal cover orifice is exposed and the interior of the food waste disposer 3600 can be accessed by the installer. With this being the case, each of the lead wires 3816 and lead wires 3702 can be accessed (notwithstanding each of those leads extending through the lead wire orifice as described above) and drawn out of the interior of the food waste disposer by way of the terminal cover orifice. When the lead wires 3816 and 3702 are accessed, two of the lead wires 3816 (e.g., the white and black lead wires) of the 3-wire hardware adapter 3812 can be coupled to corresponding ones (e.g., white and black ones) of the lead wires 3702 of the Romex/BX cable 3900 by way of the couplers 3810. Also, a third one of the lead wires 3702 (e.g., a ground wire) can be coupled to a ground screw 3704 on the LEF 3602, as can a third one of the lead wires 3816. After the lead wires 3816 are coupled in this manner to the lead wires 3702 and ground screw 3704, all of the coupled lead wires can be pushed back into the interior of the food waste disposer 3600 via the terminal cover orifice and the terminal cover 3808 can be reattached to the LEF 3602 so that all of the wiring is enclosed either within the main body of the food waste disposer (e.g., above the LEF 3602) or within the interior cavity formed by the external wire box 3820 relative to the LEF.

As with the food waste disposer 3000, it can be seen that the 3-wire hardwire adapter 3812 of the eighth embodiment of the food waste disposer 3600 performs a coupling role (in this case, by way of the coupling afforded by the couplers 3810) in a manner that is somewhat analogous to the role played by the Romex adapters 708 and 1308 described above in regard to first and second embodiments of the food waste disposers 500 and 1000. As with the Romex adapters 708 and 1308, the 3-wire hardwire adapter 3812 allows the lead wires from the Romex/BX cable 3000 to be coupled to an appliance inlet power cord connection structure (in this case the structure 3606) that also is suitable for receiving a modified C13 type plug (in this case, the plug 3802). At the same time, however, it should be appreciated that the food waste disposer 3600 differs from the food waste disposer 500 and 1000 in that the 3-wire hardwire adapter 3812, in contrast to the Romex adapters 708 and 1308, is positioned within an enclosed cavity when employed with the Romex/BX cable 3900.

In view of the above discussion, the method of installation of the food waste disposer 3600 again will depend upon whether installation environment entails a wall outlet or the Romex/BX cable 3900. If the method of installation involves a wall outlet, the method again proceeds in accordance with the flow chart 900 of FIG. 9 including the steps 901 and step 902 (plus the start step 930), followed by the first branch of steps 910 (and the end step 940). However, if the method of installation involves the Romex/BX cable, then the method proceeds in accordance with the flow chart of FIG. 9, including again the steps 901 and 902 (plus the start step 930 and end step 940), except insofar as the steps of the second branch of steps between the points A and B are replaced by another alternate second branch of steps 4001, 4002, 4003, 4004, 4005, 4007, 4008, 4009, 4010, 4011, and 4012 shown in a flow chart 4000 of FIG. 40.

Figure 40:
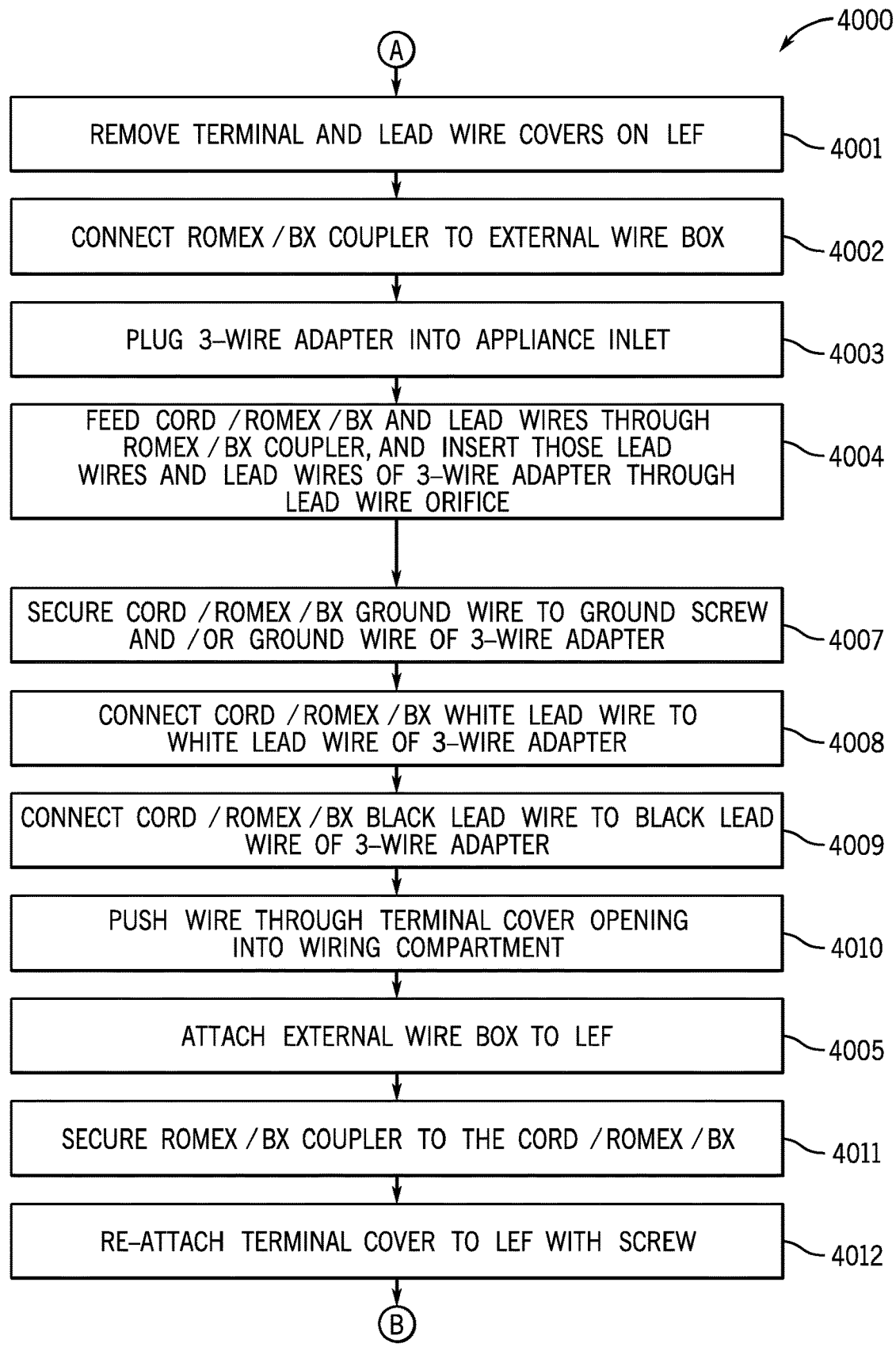
FIG. 40 is a flow chart showing example steps of portions of a modified version of the installation process shown in FIG. 9, in accordance with which the food waste disposer and associated system components described in relation to FIGS. 36-39 can be installed in a home having a Romex/BX cable.

Referring more particularly to FIG. 40, installation involving a Romex/BX cable (subsequent to the step 902) first involves removing the terminal cover 3808 and also the lead wire cover 3610 from the LEF 3602 at the step 4001. Next, at the step 4002, the installer attaches (e.g., screws) the Romex/BX coupler 3806 into the coupler orifice 3822 on the external wire box 3820. Next, at the step 4003, the 3-wire hardwire adapter 3812 is plugged into the appliance inlet power cord connection structure 3606. Next, at the step 4004, the Romex/BX cable 3900 and associated lead wires 3702 are inserted through the Romex coupler 3806 and through the lead wire orifice exposed due to the removal of the lead wire cover 3610. Also, at the step 4004, the lead wires 3816 of the 3-wire hardwire adapter 3812 are also inserted through the lead wire orifice. Further at this time, the installer can also pull the lead wires 3816 and 3702 out of the interior of the food waste disposer 3600 through the terminal cover opening made accessible due to the removal of the terminal cover 3808.

Additionally, at the step 4007, a first one of the lead wires 3702 of the Romex/BX cable 3900 that is a ground wire lead is coupled to the ground screw 3704. Additionally, at this time, a first one of the lead wires 3816 of the 3-wire hardwire adapter 3812 can also be coupled to the ground screw. Further, at the steps 4008 and 4009, respectively, second, and third ones of the lead wires (e.g., a white lead wire, and a black lead wire) of the Romex/BX cable 3900 are respectively coupled to complementary ones of the lead wires 3816 (e.g., white, and black ones of those lead wires) of the 3-wire hardwire adapter 3812, by way of the couplers 3810. Next, at the step 4010, all of those coupled lead wires (or coupled lead wire ends) of the Romex/BX cable 3900 and the 3-wire hardwire adapter 3812 and the associated couplers 3810 are pushed back through the terminal cover opening into the interior of the food waste disposer 3600. Then, at the step 4005, the external wire box 3820 is coupled to the bottom surface of the LEF 3602 (albeit in other embodiments this can be performed earlier in the process, such as at the time of the step 4004). Further, at the step 4011, the Romex coupler 3806 is secured to the Romex/BX cable 3900 (e.g., by way of the adjustable clamp feature 3818). Finally, at the step 4012, the terminal cover 3808 is re-attached to the LEF 3602 (e.g., by way of a screw), so as to completely enclose the lead wires of the Romex/BX cable 3900 and the 3-wire hardware adapter 3812 within the interior of the food waste disposer 3600 and/or the cavity formed by the external wire box 3820 relative to the LEF 3602.

It will be recognized that the flow chart 4000 includes some steps that are identical or similar to those of the flow chart 320 of FIG. 3. However, it should be further recognized that the flow chart 3500 differs from the flow chart 320 in a number of respects. For example, the step 4001 involves removing both the terminal cover 3808 and the lead wire cover 3610, instead of just a terminal cover as in the case of the step 301. Also for example, the step 4002 involves connecting the Romex coupler 3806 to the external wire box 3820 rather than to a LEF as in the case of the step 302, and the step 4005 regarding attachment of the external wire box 3820 is added. Additionally for example, the step 303 involving pulling motor wires out through the terminal cover opening is replaced with plugging in the provided 3-wire hardwire adapter 3812 to the modified C14 type appliance inlet at the step 3503. Further for example, rather than including the steps 306 through 309, the flow chart 4000 includes the steps 4007, 4008, and 4009 that involve connecting the lead wires (e.g., the ground, white, and black lead wires) 3702 of the Romex/BX cable 3900 with corresponding ones of the lead wires 3816 of the 3-wire hardwire adapter 3812 (and/or with the ground screw 3704 in the case of the ground lead wire).

The features of the food waste disposer 3600 and associated system components, and method of installing such a food waste disposer, can be advantageous in several respects. Among other things, the design of the food waste disposer 3600 is such that there is no difference (or no substantial difference) between uncorded or pre-corded disposers during manufacture—the installer can simply use the provided cord 3800 or the 3-wire hardwire adapter 3812 in combination with the external wire box 3820 for any particular installation. Also, because the lead wires for making a cable connection are more accessible, this should simplify the process of making the electrical connections. Lastly the detachable power cord 3800 does not need to be assembled to the food waste disposer prior to packaging and can be better positioned in the carton to prevent damage during shipping.

Figure 41:
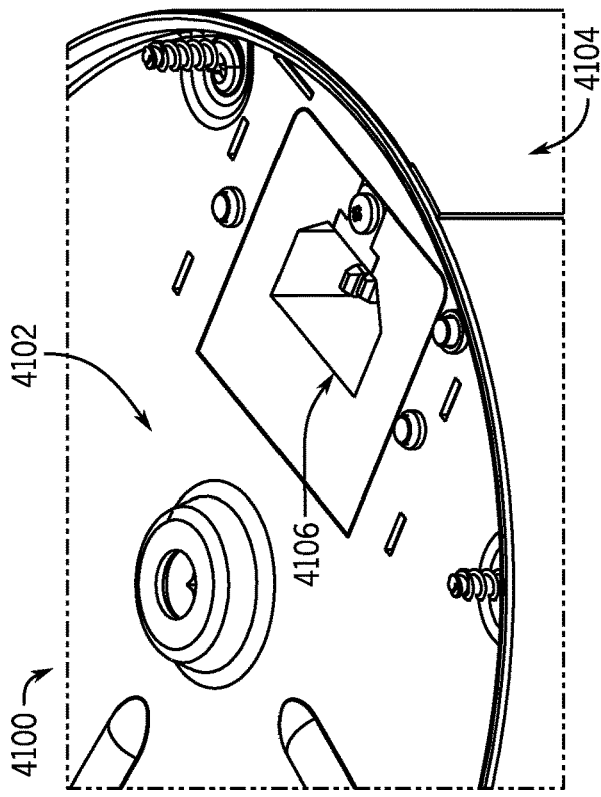
FIG. 41 is a bottom perspective cutaway view of portions of a ninth example food waste disposer that, in accordance with a ninth example embodiment encompassed herein, can be installed in a home so as to receive electric power, in either of two alternative manners depending upon whether the home includes a Romex/BX cable or a wall outlet.

Referring next to FIGS. 41, 42, 43A, 43B, 43C, 43D, 43E, 44, 45, and 46 features of a ninth example embodiment of a food waste disposer 4100 are shown, where again the food waste disposer can be installed in a home so as to receive electric power in either of two alternative manners depending upon whether the home includes a Romex/BX cable or a wall outlet. FIG. 41 shows a bottom perspective view of portions the food waste disposer 4100 that reveals the food waste disposer in a manner illustrative of how it would be received by the customer. The bottom perspective view provided by FIG. 41 particularly shows a LEF 4102 and a stator band 4104 of the food waste disposer 4100. Also evident in FIG. 41 is an appliance inlet power cord connection structure 4106. In general, the food waste disposer 4100 has the modified C14 type appliance inlet provided the appliance inlet power cord connection structure 4106 but otherwise there is no access provided to the internal motor compartment.

Figure 42:
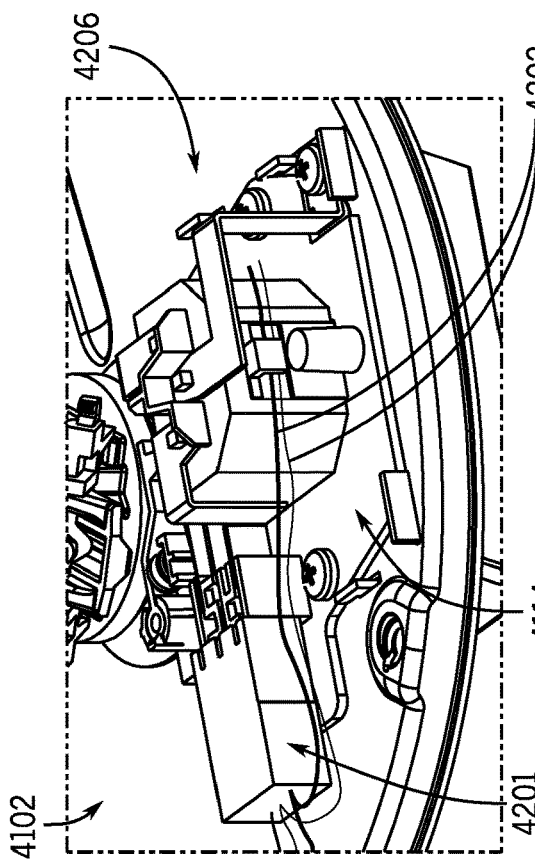
FIG. 42 is a top perspective cutaway view of a portion of a LEF (and associated components) of the food waste disposer of FIG. 41, which also shows system components permitting the disposer to be installed in either of two alternative manners depending upon whether the home includes a Romex/BX cable or a wall outlet.

Relatedly, FIG. 42 shows a top perspective view of portions of the LEF 4102 (and associated components), which include a start switch module 4114. The induction motor start switch module 4114 is modified to include an appliance inlet module 4206 and also a cluster block connector (from a motor of the food waste disposer 4100) 4201, which provides a set of terminals to facilitate electrical connection to the stator during the manufacture and assembly of the food waste disposer. The start switch module 4114 is connected directly to or integrated with an appliance inlet module 4206, which provides the appliance inlet power cord connection structure 4106 that is accessible through an opening in the LEF 4102 as shown in FIG. 41. Additionally, as will be described further below, the cluster block connector (or assembly) 4201 also includes lead wires 4202 that enable installation of the food waste disposer 4100 in an installation environment involving a Romex/BX cable.

Figure 43E:
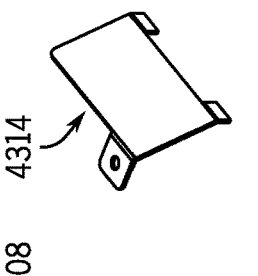
FIGS. 43A-43E show system components that can be selectively employed in or as part of (or in conjunction with) the food waste disposer of FIGS. 41-42 so as to achieve installation of the food waste disposer in either of the two alternative manners depending upon whether the home includes a Romex/BX cable or a wall outlet.
Figure 43D:
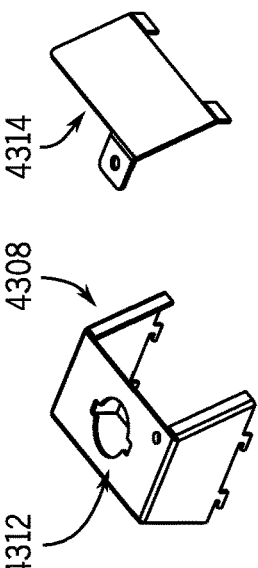
Figure 43C:
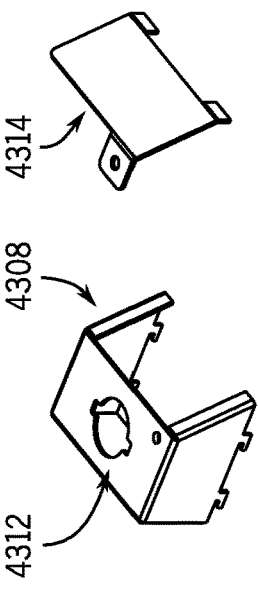
Figure 43B:
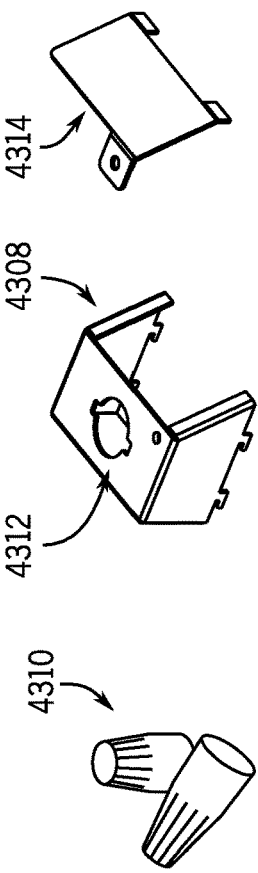
Figure 43A:
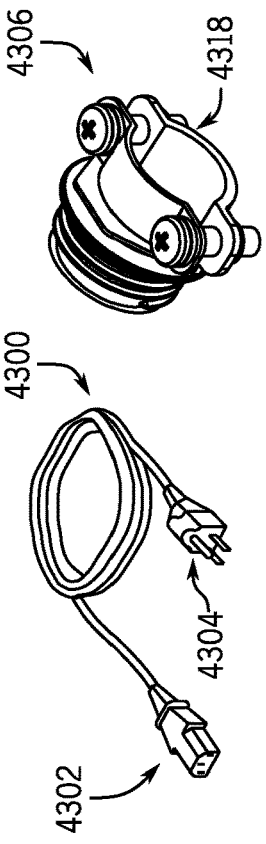

Additionally, the food waste disposer 4100 also includes (or is configured to be implemented in conjunction with) system components that are shown in FIGS. 43A, 43B, 43C, 43D, and 43E. FIG. 43A particularly shows a power cord 4300, which includes a modified C13 type plug 4302 at a first end and a NEMA 5-15 plug 4304 at a second end, and which can be identical to the power cord 3800 of FIG. 38A. FIG. 43B shows a Romex coupler 4306 that can be identical to the Romex coupler 3806 of FIG. 38B, and that includes an adjustable clamp feature 4318. FIG. 43C shows a pair of lead couplers 4310 that can be identical to the lead couplers 3810 of FIG. 38D. Further, FIG. 43D shows a perspective view of an external wire box 4308 that includes an orifice 4312, and FIG. 43E shows an external wire box cover 4314.

As in the case of several of the other embodiments of food waste disposers already discussed above (e.g., the food waste disposers 500, 1000, 1900, 2200, 2500, 3000, and 3600), the appliance inlet module 4206 with the appliance inlet power cord connection structure 4106 allows for plugging-in of a power cord (e.g., the power cord 4300) when the installation environment entails a wall outlet. Thus, after the food waste disposer 4100 is physically installed (e.g., to a sink), the disposer is connected to a power source using the provided power cord 4300, by connecting the modified C13 type plug 4302 to the disposer appliance inlet power cord connection structure 4106 and the NEMA 5-15 plug 4304 to the wall outlet. As already discussed, the appliance inlet module 4206 is connected directly to, or can be formed integrally as part of, the start switch module 4114 (that is, the induction motor start switch module 4114 is modified to include the appliance inlet module), with the appliance inlet power cord connection structure 4106 being accessible through an opening in the LEF 4102. There is no need to employ any assembly corresponding to the assembly 2112 by which the start switch module 4114 is coupled to the appliance inlet module 4206.

Figure 44:
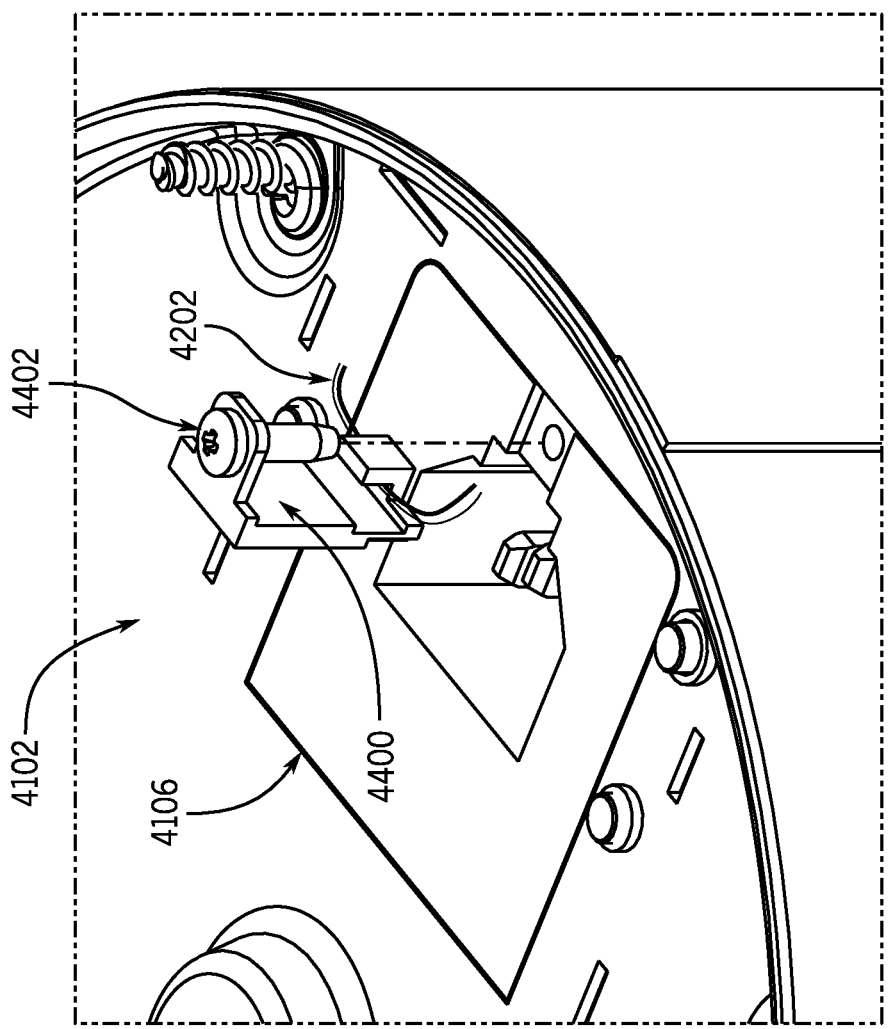
FIGS. 44-46 are three bottom perspective cutaway views of portions of a LEF (and associated components) of the food waste disposer of FIGS. 41 and 42, which also shows system components permitting the disposer to be installed in a home having a Romex/BX cable.
Figure 46:
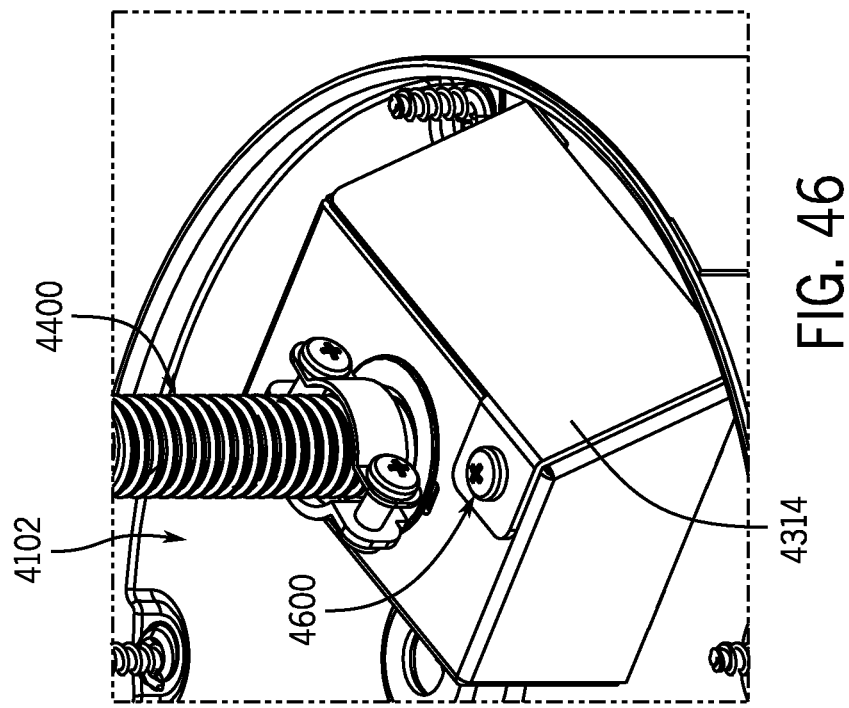
Figure 45:
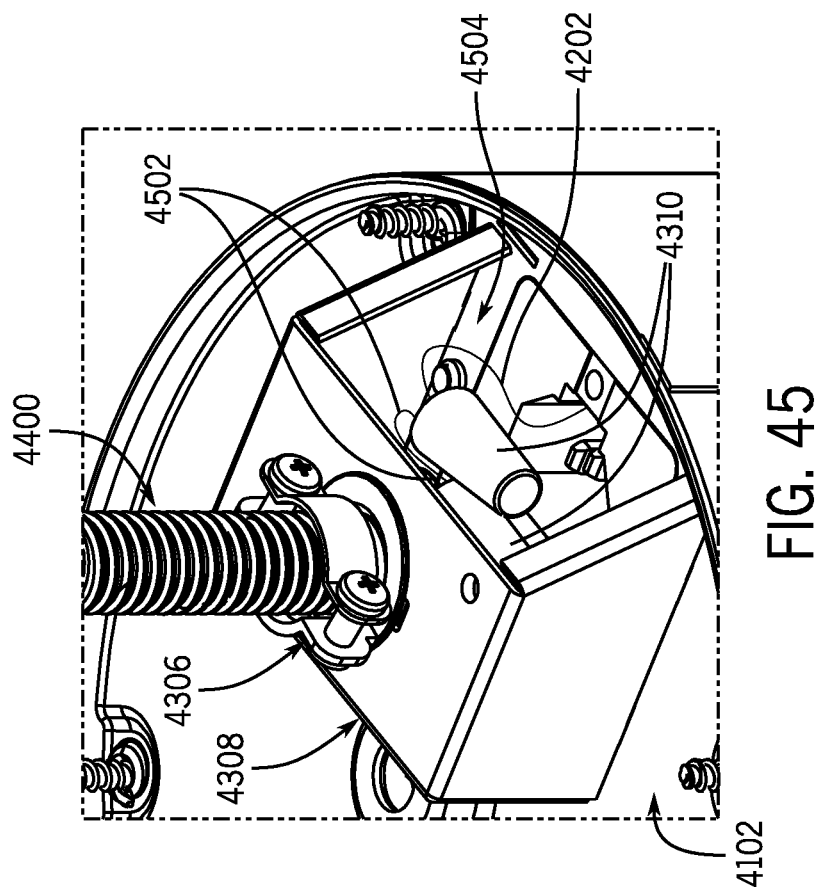

Referring additionally to FIGS. 44, 45, and 46, three additional perspective views are provided to show how the food waste disposer 4100 can be implemented in an installation environment including a Romex/BX cable 4400 (see FIGS. 44 and 45). FIGS. 44, 45, and 46 particularly illustrate three different stages in this process. More particularly in this regard, FIG. 44 illustrates an early stage in the installation process, at which a lead wire access cover 4400 is disengaged from the bottom of the LEF 4106 and particularly from the appliance inlet power cord connection structure 4106, by way of loosening of a screw 4402, at an early stage of the installation process. When this occurs, ends of the lead wires 4202 are exposed.

By comparison, FIG. 45 shows a later stage of the installation process. At this stage, the Romex coupler 4306 is positioned into and locked in position relative to the orifice 4312 of the external wire box 4308, and the Romex/BX cable 4400 is inserted through the Romex coupler 4306 and locked relative to the Romex coupler by way of the adjustable clamp feature 4318 (the locking of the Romex coupler to the Romex/BX cable can also occur much later during the installation process). Additionally, the external wire box 4308 is affixed to the bottom surface of the LEF 3602 as shown. Further, FIG. 45 also illustrates that, at this stage, lead wires (e.g., white and black lead wires) 4502 of the Romex/BX cable 4400 are coupled to corresponding ones (again, e.g., white and black ones) of the lead wires 4202 by way of the couplers 4310. As shown, all of those lead wires and couplers are positioned within a wiring compartment or cavity 4504 formed by the external wire box 4308 and the bottom surface of the LEF 4102. Finally, FIG. 46 illustrates a final stage of the installation process, at which the external wire box cover 4314 is affixed to the external wire box 4308 by way of a screw 4600 so as to fully enclose the wiring compartment 4504. The affixing of the external wire box cover 4314 can be considered to constitute the closing of a terminal cover opening existing between the external wire box 4308 and the LEF 4102.

In view of the above discussion, the method of installation of the food waste disposer 4100 again will depend upon whether installation environment entails a wall outlet or the Romex/BX cable 4400. If the method of installation involves a wall outlet, the method again proceeds in accordance with the flow chart 900 of FIG. 9 including the steps 901 and step 902 (plus the start step 930), followed by the first branch of steps 910 (and the end step 940). However, if the method of installation involves the Romex/BX cable, then the method proceeds in accordance with the flow chart of FIG. 9, including again the steps 901 and 902 (plus the start step 930 and end step 940), except insofar as the steps of the second branch of steps between the points A and B are replaced by another alternate second branch of steps 4701, 4702, 4703, 4704, 4705, 4706, 4707, 4708, 4709, 4710, 4711, and 4712 shown in a flow chart 4700 of FIG. 47.

Figure 47:
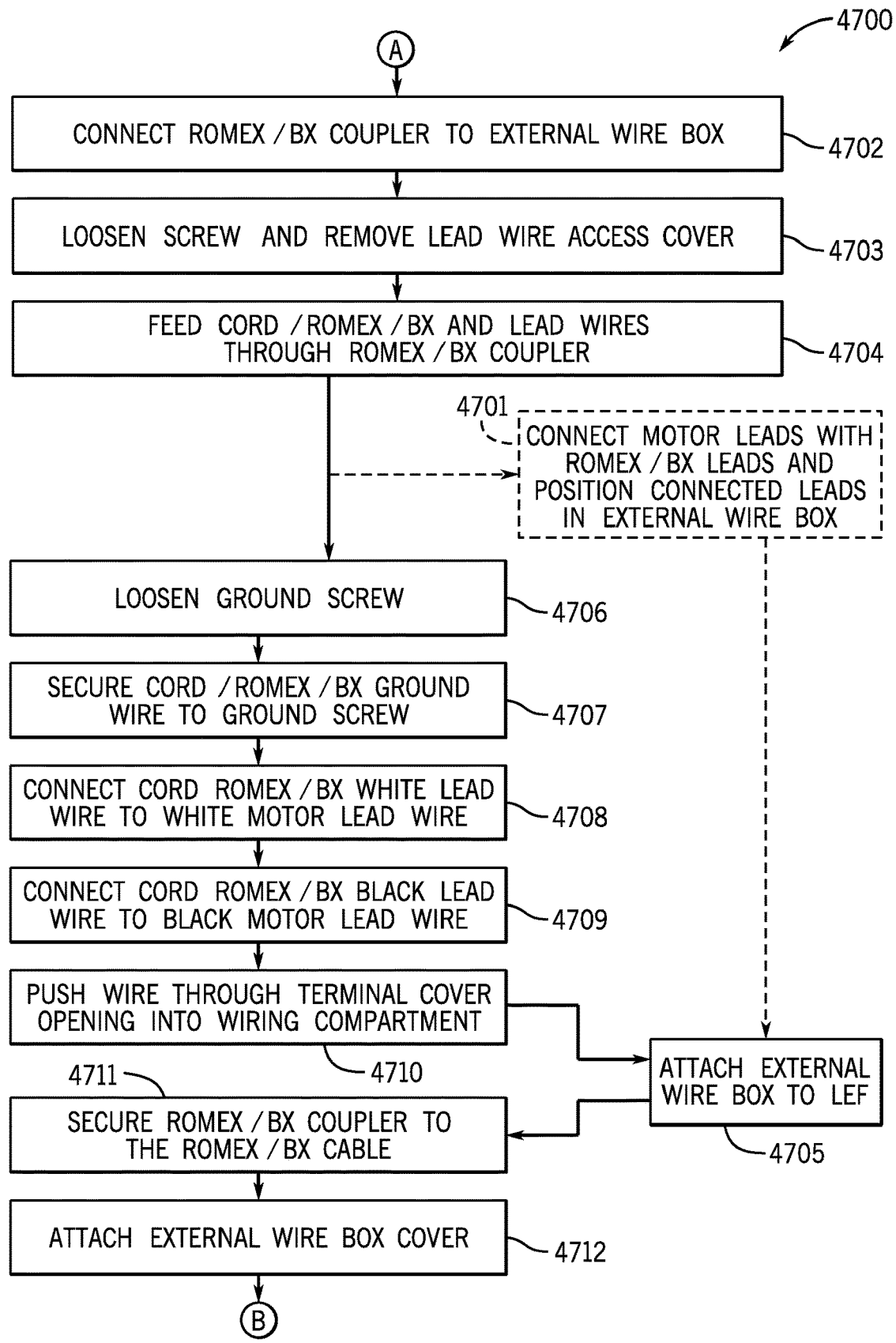
FIG. 47 is a flow chart showing example steps of portions of a modified version of the installation process shown in FIG. 9, in accordance with which the food waste disposer and associated system components described in relation to FIGS. 41-46 can be installed in a home having a Romex/BX cable.

Referring more particularly to FIG. 47, installation involving the Romex/BX cable 4400 (subsequent to the step 902) first involves connecting the Romex coupler 4306 to the external wire box 4308 via the orifice 4312 at the step 4702. Next, at the step 4703, the lead wire access cover 4400 is removed by loosening of the screw 4402. Further, at the step 4704, the Romex/BX cable 4400 and associated lead wires 4502 are inserted through the Romex coupler 4306 and into the cavity 4504. Following the step 4704, the steps 4706 and 4707 can be respectively performed, at which a ground screw (not shown in FIG. 45) is loosened, and a first one of the lead wires 4502 that is a ground wire is coupled to the ground screw, respectively. Next, at the steps 4708 and 4709, respectively, second and third ones (e.g., white and black ones) of the lead wires 4502 of the Romex/BX cable 440 are respectively coupled to corresponding ones (again, e.g., white and black ones) of the lead wires 4202 by way of the couplers 4310, respectively. Subsequently, at the step 4710, the installer makes sure that all of the lead wires 4202 and 4510 and the couplers 4310 are pushed through the terminal cover opening within the wiring compartment 4504, so that the lead wires and couplers are all within the interior space formed between the external wire box 4308 and the LEF 4102 (as previously mentioned, in this embodiment the terminal cover opening can be considered the opening in the external wire box 4308 that can be covered by the external wire box cover 4314). As illustrated by a step 4701, all of the steps 4706, 4707, 4708, 4709, and 4710 can be generally viewed overall as a step involving the connecting of the wire leads (motor leads) 4202 with the wire leads 4502 of the Romex/BX cable 4400 (and/or with a ground terminal) and positioning of all of those leads and associated couplers within the external wire box 4308.

As additionally illustrated by FIG. 47, after the completion of the step 4710 (or the step 4701), the method advances to a step 4705, at which the external wire box 4308 is attached to the LEF 4102. In alternate embodiments, this attachment step can occur earlier in the method, such as at the step 4704. Further, after the step 4705, the Romex/BX coupler 4306 is secured to the Romex/BX cable 4400 at the step 4711. Finally, at the step 4712, the flow chart 4700 is completed with the attachment of the external wire box cover 4314 to the external wire box 4308.

It will be recognized that the flow chart 4700 includes some steps that are identical or similar to those of the flow chart 320 of FIG. 3. However, it should be further recognized that the flow chart 4700 differs from the flow chart 320 in a number of respects. For example, in place of the step 302, the flow chart 4700 includes the step 4702 at which the Romex coupler 4306 is connected to the external wire box 4308. Also, instead of the step 303, the flow chart 4700 includes the step 4703 at which the screw 4402 is loosened so as to allow for the lead wire access cover 4400 to be accessed, so as to provide access to the leads 4202 and permit cable connection. Also, the flow chart 4700 need not include any step corresponding to the step 305, as the attachment of the external wire box 4308 at the step 4705 occurs after the coupling of the leads 4202 and 4502. Additionally, the flow chart 4700, in addition to including the step 4705 involving attachment of the external wire box 4308, also includes the step 4712 at which the external wire box cover 4314 also occurs.

The features of the food waste disposer 4100 and associated system components, and method of installing such a food waste disposer, can be advantageous in several respects. Among other things, the design of the food waste disposer 4100 is such that there is no difference (or no substantial difference) between uncorded or pre-corded disposers during manufacture—the installer can simply use the provided cord 4300 or the external wire box 4308 for any particular installation. Also, because the lead wires for making a cable connection are more accessible, this should simplify the process of making the electrical connections. Indeed, since all wiring is external to the food waste disposer, this should reduce installation errors. Lastly the detachable power cord 4300 does not need to be assembled to the food waste disposer 4100 prior to packaging and can be better positioned in the carton to prevent damage during shipping.

Figure 49:
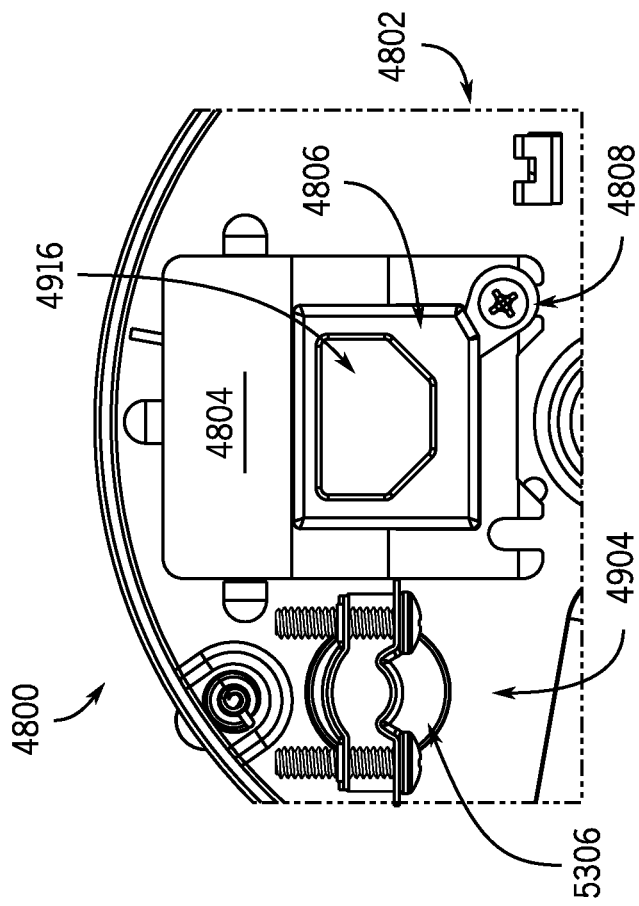
FIGS. 48 and 49 are two bottom perspective cutaway views of portions of a tenth example food waste disposer that, in accordance with a tenth example embodiment encompassed herein, can be installed in a home so as to receive electric power, in either of two alternative manners depending upon whether the home includes a Romex/BX cable or a wall outlet.
Figure 48:
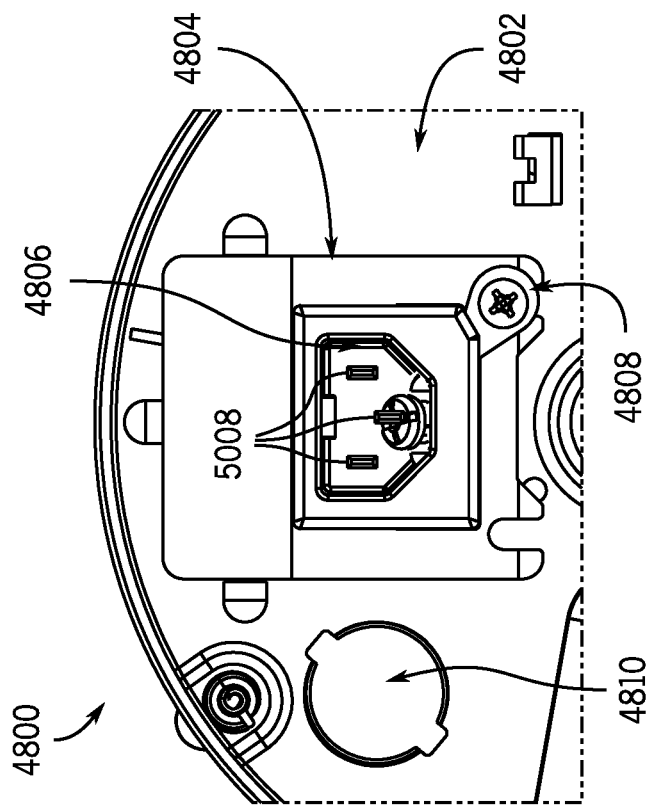

Referring next to FIGS. 48, 49, 50, 51, 52, 53A, and 53, features of a tenth example embodiment of a food waste disposer 4800 are shown, where again the food waste disposer can be installed in a home so as to receive electric power in either of two alternative manners depending upon whether the home includes a Romex/BX cable or a wall outlet. FIGS. 48 and 49 show two bottom plan cutaway views of portions of the food waste disposer 4800, including a LEF 4802 of the food waste disposer 4800. FIG. 48 particularly shows the LEF 4802 to include each of a terminal cover 4804, an appliance inlet power cord connection structure 4806, a ground screw 4808, and a Romex cover 4810 covering a Romex hole (not shown). That is, in this embodiment, the food waste disposer 4800 includes both a modified C14 type appliance inlet and a Romex hole.

FIG. 49 shows the food waste disposer 4800 after certain modifications have been made to permit installation of the food waste disposer in an installation environment including a Romex/BX cable such as the Romex/BX cable 4400 of FIG. 45. Also, FIG. 49 shows an appliance inlet cover 4916 to be positioned over the appliance inlet power cord connection structure 4806. It should be appreciated that FIG. 48 shows how the food waste disposer 4800 would be received by the customer, except insofar as typically the food waste disposer would also include the appliance inlet cover 4916 mounted as shown in FIG. 49 when first received by the customer.

In addition to FIGS. 48 and 49, FIG. 50 is provided to show a bottom perspective view of portions of the LEF 4802 (and associated components) of the food waste disposer 4800, including the terminal cover 4804 and an appliance inlet module 5000 that includes the appliance inlet power cord connection structure 4806. FIGS. 51 and 52 respectively are bottom and top perspective view of the appliance inlet module 5000 of the food waste disposer 4800, shown to be separated from the remainder of the LEF 4802 (including the terminal cover 4804 thereof). Further, the food waste disposer 4800 also includes (or is configured to be implemented in conjunction with) system components that are shown in FIGS. 53A and 53B. FIG. 53A particularly shows a power cord 5300, which includes a modified C13 type plug 5302 at a first end and a NEMA 5-15 plug 5304 at a second end, and which can be identical to the power cord 4300 of FIG. 43A. FIG. 53B shows a Romex coupler 5306 that can be identical to the Romex coupler 4306 of FIG. 43B, and that includes an adjustable clamp feature 5318.

Referring still particularly to FIGS. 50, 51, and 52, the appliance inlet module 5000 includes a ground terminal 5002. The ground screw 4808 can be employed to couple a lead wire (not shown) to the ground terminal 5002. Also, the appliance inlet module 5000 includes a pair of output terminals 5004, by which power can be provided to the start switch module or motor (not shown) internally to the food waste disposer 4800. Although not shown, it should be appreciated that the appliance inlet module 5000 is connected directly to, or can be formed integrally as part of, an induction motor start switch module (not shown) by way of the output terminals 5004. Further, the appliance inlet module 5000 also includes additional connection terminals 5006 by which a Romex/BX cable (such as the Romex/BX cable 4400) can be coupled to the appliance inlet module, which in the present embodiment are formed by screws. Additionally, the appliance inlet module 5000 also includes further terminals 5008, which are included as part of the appliance inlet power cord connection structure 4806.

In view of the above discussion, it should be recognized that in this tenth embodiment of the food waste disposer 4800, the appliance inlet module 5000 permits the food waste disposer to be installed in either an installation environment with a wall outlet or an installation environment with a Romex/BX cable. In an installation environment entailing a Romex/BX cable (such as the Romex/BX cable 4400), the terminal cover 4804 along with the appliance inlet module 5000 is removed from the LEF 4802. Then, the Romex coupler 5306 is installed on the LEF 4802 after the Romex cover 4810 is removed, and the Romex/BX cable and lead wires extending therefrom (e.g., such as the lead wires 4502) are inserted through the Romex coupler into the interior of the food waste disposer 4800. In this circumstance, the lead wires from the Romex/BX cable can be drawn through an orifice in the LEF 4802 that is present due to the removal of the terminal cover 4804, and those lead wires can be coupled to the connection terminals 5006, at which point the terminal cover 4804 (and accompanying appliance inlet module 5000) can be reattached to the LEF 4802. In such a circumstance, given that the terminals 5004 would also be coupled to the switch module (or motor), power from the Romex/BX cable would be made available to the food waste disposer 4800.

Alternatively, as in the case of several of the other embodiments of food waste disposers already discussed above (e.g., the food waste disposers 500, 1000, 1900, 2200, 2500, 3000, 3600, and 4100), the appliance inlet module 5000 with the appliance inlet power cord connection structure 4806 allows for plugging-in of a power cord (e.g., the power cord 5300) when the installation environment entails a wall outlet. Thus, after the food waste disposer 4800 is physically installed (e.g., to a sink), the disposer is connected to a power source using the provided power cord 5300, by removing the appliance inlet cover 4916, connecting the modified C13 type plug 5302 to the disposer appliance inlet power cord connection structure 4806, and connecting the NEMA 5-15 plug 5304 to the wall outlet.

In view of the above discussion, the method of installation of the food waste disposer 4100 again will depend upon whether installation environment entails a wall outlet or a Romex/BX cable (e.g., the Romex/BX cable 4400). If the method of installation involves a wall outlet, the method again proceeds in accordance with the flow chart 900 of FIG. 9 including the steps 901 and step 902 (plus the start step 930), followed by the first branch of steps 910 (and the end step 940). However, if the method of installation involves the Romex/BX cable, then the method proceeds in accordance with the flow chart of FIG. 9, including again the steps 901 and 902 (plus the start step 930 and end step 940), except insofar as the steps of the second branch of steps between the points A and B are replaced by another alternate second branch of steps 5401, 5402, 5403, 5404, 5405, 5406, and 5407 shown in a flow chart 5400 of FIG. 54.

Figure 54:
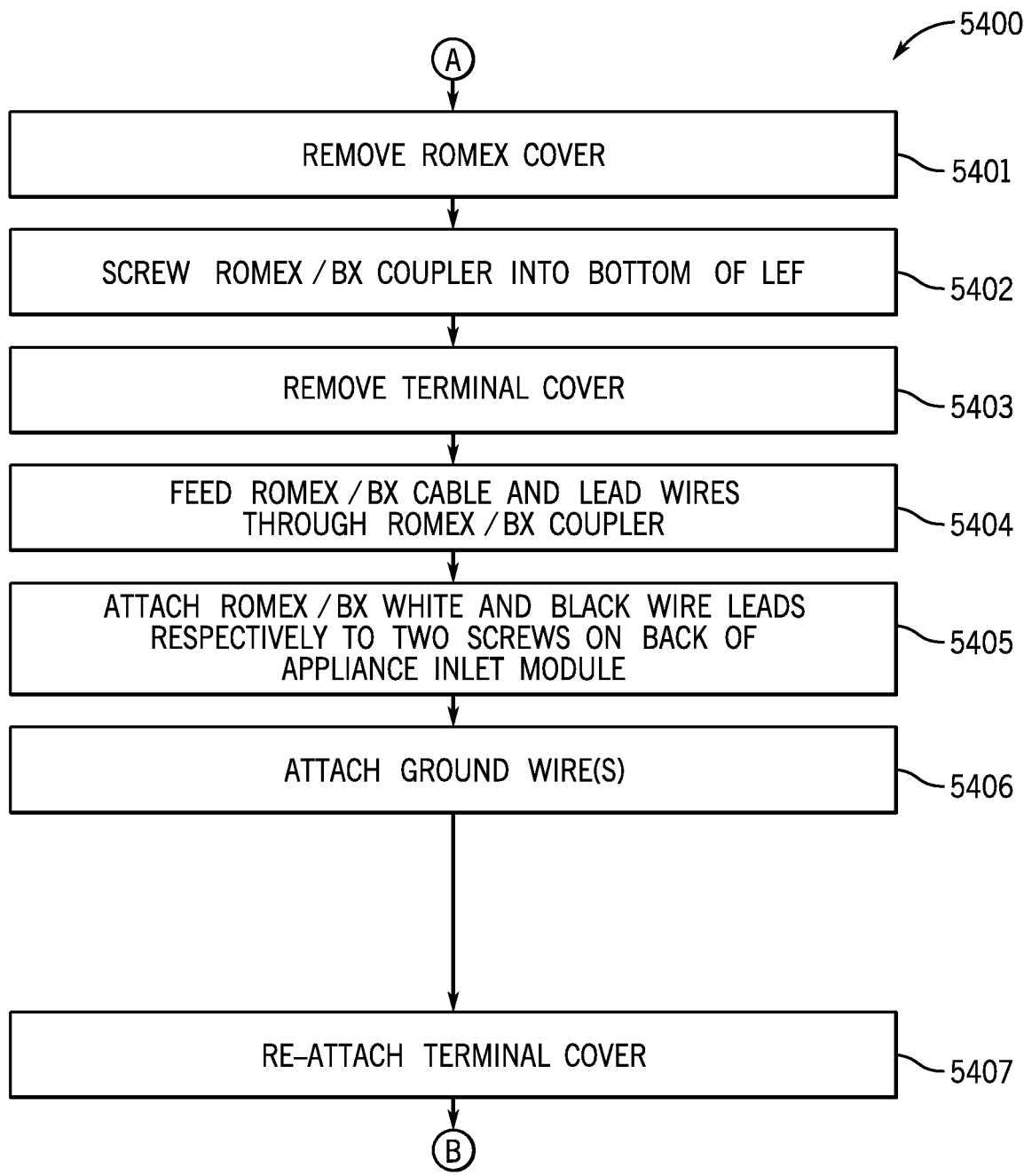
FIG. 54 is a flow chart showing example steps of portions of a modified version of the installation process shown in FIG. 9, in accordance with which the food waste disposer and associated system components described in relation to FIGS. 48-52 and 53A-53B can be installed in a home having a Romex/BX cable.

Referring more particularly to FIG. 54 installation involving a Romex/BX cable (subsequent to the step 902) first involves removing the Romex cover 4810 at the step 5401. Next, at the step 5402, the Romex coupler 5306 is attached (e.g., screwed into) the bottom surface of the LEF 4802. Next, at the step 5403, the terminal cover 4804 along with the appliance inlet module 5000 is removed from the LEF 4802. Further, at the step 5404, the Romex/BX cable and associated lead wires are inserted through the Romex coupler 5306 and into the interior of the food waste disposer 4800. Additionally, following the step 5404, two (e.g., white and black ones) of the lead wires of the Romex/BX cable are attached respectively to the respective connection terminals 5006 on the appliance inlet module 5000. Further, at the step 5406 a ground wire of the Romex/BX cable (and/or possibly any other ground wire) can be attached to the ground terminal 5002 by way of the ground screw 4808. Throughout these steps, it is also assumed that the terminals 5004 are coupled to the switch module (or motor) of the food waste disposer 4800 by way of additional wiring. Finally, at the step 5407, the terminal cover 4804 including the appliance inlet module 5000 is reattached to the LEF 4802.

The features of the food waste disposer 4800 and associated system components, and method of installing such a food waste disposer, can be advantageous in several respects. Among other things, in this embodiment, there is no difference between uncorded or pre-corded food waste disposers during manufacture. The installer can use the provided power cord 5300 or instead use the Romex/BX cable (e.g., as provided in an installation environment such as a home) and the Romex coupler 5306 for any particular installation. Also, since the food waste disposer 4800 is not pre-corded, the cord can be better positioned within a shipping carton to prevent damage during shipping.

Notwithstanding the above description, the present disclosure is intended to encompass additional embodiments and modified versions of the above-described embodiments in addition to the embodiments specifically described above. Among other things, although the above description relates to food waste disposers, the present disclosure is also intended to encompass embodiments relating to other types of waste disposers.

It is specifically intended that the present invention not be limited to the embodiments and illustrations contained herein, but include modified forms of those embodiments including portions of the embodiments and combinations of elements of different embodiments as come within the scope of the following claims.

We claim:

1. A food waste disposer system comprising:
a motor;
a switch module coupled at least indirectly to the motor and configured to govern a providing of power to the motor;
a housing including a first side housing portion and a bottom housing portion;
an appliance inlet power cord connection structure supported at least indirectly upon the housing, wherein the appliance inlet power cord connection structure is either connected to or integrally formed with the switch module; and
a power cord including a first end with a first plug and a second end with a second plug, wherein the first plug is configured to be coupled to the appliance inlet power cord connection structure,
wherein additionally the food waste disposer includes an adapter or first lead wires that are coupled at least indirectly to the appliance inlet power cord connection structure,
wherein the food waste disposer can be selectively implemented either in a first installation environment including a wall outlet by way of coupling the first plug to the appliance inlet power cord connection structure, or in a second installation environment including a hardwired power cable by coupling additional lead wires of the hardwired power cable either to the first lead wires or by coupling the additional lead wires to the adapter and further coupling the adapter to the appliance inlet power cord connection structure.

2. The food waste disposer system of claim 1, wherein the food waste disposer includes the adapter.

3. The food waste disposer system of claim 2, wherein the adapter includes a third plug at a first end thereof and includes a coupling assembly at a second end thereof, wherein the third plug is configured to be coupled to the appliance inlet power cord connection structure.

4. The food waste disposer system of claim 3, wherein the third plug extends in a first direction that is opposed to, and substantially parallel to, a second direction in which the coupling assembly extends.

5. The food waste disposer system of claim 3, wherein the third plug extends in a first direction that is substantially perpendicular to a second direction in which the coupling assembly extends.

6. The food waste disposer system of claim 3, further comprising a coupler including an adjustable clamp feature through which the hardwire power cable can be supported, wherein the hardwired power cable is a Romex/BX cable.

7. The food waste disposer system of claim 6, wherein the coupling assembly is configured to support the coupler and additionally includes screws by which the additional lead wires of the Romex/BX cable can be attached to the adapter.

8. The food waste disposer system of claim 6, wherein the coupling assembly includes screws by which the additional lead wires of the Romex/BX cable can be attached to the adapter, and further comprising a terminal cover that can be attached to the bottom housing portion and support the coupler.

9. The food waste disposer system of claim 2, wherein the food waste disposer system includes both the adapter and the first lead wires, wherein the adapter includes a third plug and the first lead wires, and wherein the third plug is configured to be coupled to the appliance inlet power cord connection structure.

10. The food waste disposer system of claim 9, further comprising a coupler including an adjustable clamp feature through which the Romex/BX can be supported, wherein the food waste disposer is configured to support the coupler at least indirectly upon the bottom housing portion.

11. The food waste disposer system of claim 10, further comprising a terminal cover, and a plurality of coupling elements, and a first orifice within the bottom housing portion,
wherein the food waste disposer is configured to support the coupler directly upon the bottom housing portion when the coupler is inserted within the orifice,
wherein first end portions of the first lead wires can be coupled to additional end portions of the additional lead wires at the coupling elements, and
wherein the terminal cover can be attached to the bottom housing assembly so as to enclose a cavity within the bottom housing assembly within which can be positioned the first end portions, the additional end portions, and the coupling elements.

12. The food waste disposer system of claim 10, further comprising an external wire box having a first orifice, and a plurality of coupling elements,
wherein the food waste disposer is configured to support the coupler indirectly upon the bottom housing portion when the coupler is inserted within the orifice and the external wire box is attached to the bottom housing portion,
wherein first end portions of the first lead wires can be coupled to additional end portions of the additional lead wires at the coupling elements, and
wherein the external wire box is attached to the bottom housing assembly so as to enclose a cavity formed by the external wire box and the bottom housing assembly within which can be positioned the first end portions, the additional end portions, and the coupling elements.

13. The food waste disposer system of claim 1, wherein the food waste disposer includes the first lead wires, which extend from the appliance inlet power cord connection structure or from the switch module.

14. The food waste disposer system of claim 13, wherein either the first lead wires extend from the appliance inlet power cord connection structure and the appliance inlet power cord connection structure is coupled to the switch module by way of an assembly, or the first lead wires extend from the appliance inlet power cord connection structure and the appliance inlet power cord connection structure is integrally formed with the switch module.

15. The food waste disposer system of claim 13, further comprising a coupler plate including an adjustable clamp feature, a plurality of coupling elements, and a first orifice within the bottom housing portion,
wherein the food waste disposer is configured to support the coupler plate directly upon the bottom housing portion when the coupler plate is positioned so as to cover the first orifice,
wherein first end portions of the first lead wires can be coupled to additional end portions of the additional lead wires of the Romex/BX cable at the coupling elements when the Romex/BX cable is positioned so that the additional lead wires are at least partly positioned within an interior of the food waste disposer, and
wherein the terminal cover can be attached to the bottom housing assembly so as to enclose a cavity within the bottom housing assembly within which can be positioned the first end portions, the additional end portions, and the coupling elements.

16. The food waste disposer system of claim 13, further comprising a coupler including an adjustable clamp feature, a plurality of coupling elements, an external wire box having a first orifice, and an external wire box cover,
wherein the food waste disposer is configured to support the external wire box and the coupler when the external wire box is attached to the bottom housing portion and the coupler is positioned within the first orifice,
wherein first end portions of the first lead wires can be coupled to additional end portions of the additional lead wires of the Romex/BX cable at the coupling elements when the Romex/BX cable is positioned so that the additional lead wires are at least partly positioned within a cavity within the external wire box, and
wherein the external wire box cover can be attached to the external wire box so as to enclose the cavity within which can be positioned the first end portions, the additional end portions, and the coupling elements.

17. The food waste disposer system of claim 1, wherein the appliance inlet power cord connection structure is supported upon the bottom housing portion or supported upon the first side housing portion, and wherein the first plug is a modified C13 type plug and the second plug is a NEMA 5-15 plug.

18. A method of installing a food waste disposer system, the method comprising:
providing the food waste disposer system to an installation environment, wherein the food waste disposer system includes a housing and a switch module supported at least indirectly upon the housing;
determining whether the installation environment for the food waste disposer includes a wall outlet or a Romex/BX cable;
coupling, at least indirectly to the switch module, a plurality of first wire leads of either the Romex/BX cable or a power cord suitable for engaging the wall outlet,
wherein the food waste disposer system includes one or more system components that, alone or in combination with one or more additional components, enable the food waste disposer system to be installed so as to receive power via the wall outlet when the installation environment is determined to include the wall outlet and, alternatively, via the Romex/BX cable when the installation environment is determined to include the Romex/BX cable, and
wherein the Romex/BX cable includes the plurality of first wire leads and the coupling is achieved by connecting the first wire leads with:
a) a plurality of second wire leads extending from the switch module or a structure integrally formed with the switch module, or from an assembly coupled to the switch module;
b) a plurality of third wire leads of an adapter that includes a first plug that in turn is coupled to an appliance inlet power cord connection structure that is either connected to or integrally formed with the switch module;

c) an adapter that includes a second plug that in turn is copled to the appliance inlet power cord connection structure; or d) a plurality of terminals of an additional module that is supported by the housing and is coupled to the switch module.

19. The method of claim 18, wherein the food waste disposer system includes either the appliance inlet power cord connection structure or the additional module, and wherein the appliance inlet power cord connection structure or the additional module included by the food waste disposer system is configured to receive a modified C13 type plug of the power cord that also includes a NEMA 5-15 plug suitable for connection to the wall outlet.

\* \* \* \* \*